US012215856B2

(12) United States Patent
Oh et al.

(10) Patent No.: US 12,215,856 B2
(45) Date of Patent: Feb. 4, 2025

(54) DISPLAY DEVICE HAVING REFLECTING SHEET WITH PLURALITY OF DOT AREAS REDUCING REFLECTIVITY OF THE REFLECTING SHEET

(71) Applicant: LG ELECTRONICS INC., Seoul (KR)

(72) Inventors: Sewon Oh, Seoul (KR); Eunseok Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 18/650,953

(22) Filed: Apr. 30, 2024

(65) Prior Publication Data

US 2024/0280242 A1 Aug. 22, 2024

Related U.S. Application Data

(63) Continuation of application No. 18/086,935, filed on Dec. 22, 2022, now Pat. No. 12,000,582, which is a
(Continued)

(30) Foreign Application Priority Data

Jul. 31, 2015 (KR) .................. 10-2015-0109155
Jul. 31, 2015 (KR) .................. 10-2015-0109165

(51) Int. Cl.
*F21V 7/00* (2006.01)
*F21Y 105/10* (2016.01)
(Continued)

(52) U.S. Cl.
CPC ...... *F21V 7/0066* (2013.01); *G02F 1/133603* (2013.01); *G02F 1/133605* (2013.01);
(Continued)

(58) Field of Classification Search
CPC ......... G02F 1/133603; G02F 1/133605; G02F 1/133606; G02F 1/133607;
(Continued)

(56) References Cited

U.S. PATENT DOCUMENTS 6,364,505 B1  4/2002  Shoenfeld
7,658,504 B2  2/2010  Moriyasu et al.
(Continued)

FOREIGN PATENT DOCUMENTS

CN  1794063 A  6/2006
CN  1987599 A  6/2007
(Continued)

*Primary Examiner* — Erin Kryukova
(74) *Attorney, Agent, or Firm* — Birch, Stewart, Kolasch & Birch, LLP

(57) ABSTRACT

A display device including a display panel, a frame at a rear of the display panel, a light source on a substrate between the display panel and the frame, the light source providing light for the display panel, and a reflecting sheet between the display panel and the frame, the reflecting sheet having a rectangular shape with a first long side, a second long side opposite the first long side, a first short side adjacent to the first long side and the second long side, and a second short side opposite the first short side, wherein the reflecting sheet includes a first sheet part forming a central area of the reflecting sheet, a second sheet part forming a side area of the reflecting sheet around the first sheet part, the second sheet part including dot areas, and a hole next to a border line between the first sheet part and the second sheet part, wherein at least one of the dot areas in the second sheet part is formed along the first short side or the second short side, wherein the at least one of the dot areas including a first dot area next to the hole in a parallel direction of the first long side or the second long side and a second dot area next to the first dot area in a parallel direction of the first short side or
(Continued)

the second short side, and wherein a density of dots in the first dot area is different from a density of dots in the second dot area.

20 Claims, 66 Drawing Sheets

Related U.S. Application Data continuation of application No. 17/108,206, filed on Dec. 1, 2020, now Pat. No. 11,566,776, which is a continuation of application No. 16/244,751, filed on Jan. 10, 2019, now Pat. No. 10,883,703, which is a continuation of application No. 15/874,682, filed on Jan. 18, 2018, now Pat. No. 10,203,087, which is a continuation of application No. 14/929,828, filed on Nov. 2, 2015, now Pat. No. 10,030,845.

(60) Provisional application No. 62/073,509, filed on Oct. 31, 2014.

(51) Int. Cl.
*F21Y 115/10* (2016.01)
*G02F 1/1335* (2006.01)
*G02F 1/13357* (2006.01)

(52) U.S. Cl.
CPC .. *G02F 1/133607* (2021.01); *G02F 1/133611* (2013.01); *F21Y 2105/10* (2016.08); *F21Y 2115/10* (2016.08); *G02F 1/133606* (2013.01)

(58) Field of Classification Search
CPC ........... G02F 1/133611; F21Y 2105/10; F21Y 2115/10; G02B 6/0061; F21V 7/0066
See application file for complete search history.

(56) References Cited

U.S. PATENT DOCUMENTS

| | | |
|---|---|---|
| 8,651,685 B2 | 2/2014 | Roberts et al. |
| 8,896,767 B2 | 11/2014 | Kuromizu |
| 10,268,074 B2 | 4/2019 | Ha |
| 2006/0104080 A1 | 5/2006 | Kim et al. |
| 2006/0139952 A1 | 6/2006 | Inoue et al. |
| 2007/0121320 A1 | 5/2007 | Arai et al. |
| 2008/0158872 A1 | 7/2008 | Inoue et al. |
| 2009/0067158 A1 | 3/2009 | Hamada |
| 2009/0168399 A1 | 7/2009 | Kim et al. |
| 2009/0213296 A1 | 8/2009 | Park et al. |
| 2010/0027243 A1 | 2/2010 | Nakanishi |
| 2010/0124047 A1 | 5/2010 | Ahn |
| 2010/0245708 A1 | 9/2010 | Baba et al. |
| 2010/0296270 A1 | 11/2010 | Gomi et al. |
| 2011/0013119 A1 | 1/2011 | Ha et al. |
| 2011/0050735 A1 | 3/2011 | Bae et al. |
| 2011/0109814 A1 | 5/2011 | Takemura |
| 2011/0222218 A1 | 9/2011 | Kim et al. |
| 2011/0261286 A1* | 10/2011 | Choi ................ G02F 1/133611 349/61 |
| 2011/0304796 A1 | 12/2011 | Lee et al. |
| 2011/0305004 A1 | 12/2011 | Kim et al. |
| 2012/0069248 A1 | 3/2012 | Yokota |
| 2012/0087122 A1 | 4/2012 | Takeuchi et al. |
| 2012/0106147 A1 | 5/2012 | Kim et al. |
| 2012/0120343 A1 | 5/2012 | Yamamoto |
| 2012/0170253 A1 | 7/2012 | Park et al. |
| 2012/0206940 A1 | 8/2012 | Han et al. |
| 2012/0236204 A1 | 9/2012 | Kasai |
| 2012/0287347 A1* | 11/2012 | Matsumoto ....... G02F 1/133605 362/296.01 |
| 2013/0016524 A1 | 1/2013 | Momose et al. |
| 2013/0050989 A1 | 2/2013 | Shen et al. |
| 2013/0070170 A1 | 3/2013 | Namekata |
| 2013/0188114 A1 | 7/2013 | Sugaya |
| 2013/0329401 A1 | 12/2013 | Yamamoto et al. |
| 2014/0092337 A1 | 4/2014 | Kawada |
| 2014/0184985 A1 | 7/2014 | Liu et al. |
| 2014/0204578 A1 | 7/2014 | Kim et al. |
| 2014/0211121 A1 | 7/2014 | Cho et al. |
| 2014/0218625 A1* | 8/2014 | Kuromizu ......... G02F 1/133605 348/790 |
| 2014/0253845 A1 | 9/2014 | Shibata |
| 2014/0307421 A1 | 10/2014 | Lee et al. |
| 2014/0313424 A1 | 10/2014 | Imajo |
| 2015/0009680 A1 | 1/2015 | Chang et al. |
| 2015/0109559 A1 | 4/2015 | Lee et al. |
| 2015/0146436 A1 | 5/2015 | Heo et al. |
| 2015/0219966 A1 | 8/2015 | Song et al. |
| 2015/0234234 A1 | 8/2015 | Lee et al. |
| 2016/0161089 A1 | 6/2016 | Jeon et al. |
| 2016/0291408 A1 | 10/2016 | Yoon et al. |

FOREIGN PATENT DOCUMENTS

| | | |
|---|---|---|
| CN | 102449376 A | 5/2012 |
| CN | 102466179 A | 5/2012 |
| CN | 102667311 A | 9/2012 |
| CN | 103032777 A | 4/2013 |
| CN | 103728774 A | 4/2014 |
| CN | 203643721 U * | 6/2014 |
| CN | 103969888 A | 8/2014 |
| EP | 2 426 395 A1 | 3/2012 |
| EP | 2 515 027 A1 | 10/2012 |
| JP | 2013-143217 A | 7/2013 |
| JP | 2013-143219 A | 7/2013 |
| JP | 2013-143273 A | 7/2013 |
| JP | 2013-251274 A | 12/2013 |
| KR | 10-2013-0063773 A | 6/2013 |
| KR | 10-2014-0122480 A | 10/2014 |
| TW | 200403502 A | 3/2004 |
| TW | 200825552 A | 6/2008 |
| TW | 200907438 A | 2/2009 |
| TW | 201209489 A1 | 3/2012 |
| WO | WO 2011/074334 A1 | 6/2011 |

\* cited by examiner (a)

(b)

(a)

(b)

(a)

(b)

(a)

(b)

(a)

(b)

(a)

(b)

(a)

(b)

DISPLAY DEVICE HAVING REFLECTING SHEET WITH PLURALITY OF DOT AREAS REDUCING REFLECTIVITY OF THE REFLECTING SHEET

CROSS-REFERENCE TO RELATED APPLICATIONS

This Application is a Continuation of U.S. patent application Ser. No. 18/086,935 filed on Dec. 22, 2022, which is a Continuation of U.S. patent application Ser. No. 17/108,206 filed on Dec. 1, 2020 (now U.S. Pat. No. 11,566,776 issued on Jan. 31, 2023), which is a Continuation of U.S. patent application Ser. No. 16/244,751 filed on Jan. 10, 2019 (now U.S. Pat. No. 10,883,703 issued on Jan. 5, 2021), which is a Continuation of U.S. patent application Ser. No. 15/874,682 filed on Jan. 18, 2018 (now U.S. Pat. No. 10,203,087 issued on Feb. 12, 2019), which is a Continuation of U.S. patent application Ser. No. 14/929,828 filed on Nov. 2, 2015 (now U.S. Pat. No. 10,030,845 issued on Jul. 24, 2018), which claims the priority benefit under 35 U.S.C. § 119(c) to U.S. Provisional Application No. 62/073,509 filed on Oct. 31, 2014, and under 35 U.S.C. § 119(a) to Korean Patent Application Nos. 10-2015-0109155 and 10-2015-0109165, both filed in the Republic of Korea on Jul. 31, 2015, all of which are hereby expressly incorporated by reference into the present application.

BACKGROUND OF THE INVENTION

Field of the Invention

The present disclosure relates to a backlight unit and a display device including the backlight unit.

Discussion of the Related Art

With the development of the information society, various demands for display devices have been increasing. Various display devices, such as liquid crystal displays (LCDs), plasma display panels (PDPs), electroluminescent displays (ELDs), and vacuum fluorescent displays (VFDs), have been recently studied and used to meet various demands for the display devices.

Among the display devices, a liquid crystal display panel of the liquid crystal display includes a liquid crystal layer, and a thin film transistor (TFT) substrate and a color filter substrate which are positioned opposite each other with the liquid crystal layer interposed there between. The liquid crystal display panel displays an image using light provided by a backlight unit of the liquid crystal display.

SUMMARY OF THE INVENTION

The present disclosure provides a backlight unit including a reflecting sheet having a dot area.

In one aspect, there is a backlight unit including a frame including a bottom and a sidewall extending from the bottom; at least one substrate located on the frame, and a plurality of light sources mounted on the at least one substrate; and a reflecting sheet located on the at least one substrate, wherein the reflecting sheet including: a first sheet part located on the bottom, the first sheet part including a plurality of holes corresponding to the plurality of the light sources; a second sheet part extended from the first sheet; and a third sheet part extended from the second sheet part and located on the sidewall; wherein the second sheet part includes a plurality of dot areas positioned sequentially in a direction from the first sheet part to the third sheet part and the plurality of dot areas including a first area and a second dot area, the first dot area including a plurality of dots having the same size and the second dot area including a plurality of dots having the same size, and wherein a size of the plurality of dots in the first dot area is different from a size of the plurality of dots in the second dot area.

The backlight unit may further include at least one of a diffusion plate and an optical sheet positioned on the reflecting sheet.

The backlight unit may further include a plurality of lenses positioned on the plurality of light sources.

The backlight unit may further include a plurality of pins fixing the reflecting sheet to the frame.

The plurality of pins may be arranged outside the plurality of holes.

The plurality of pins may be arranged in a row.

The first sheet part and the second sheet part may be delineated by the plurality of pins.

At least one of the plurality of pins may be positioned between at least two outermost holes among the plurality of holes positioned on a short side of the reflecting sheet.

A distance between a dot area on a long side of the reflecting sheet and an outermost hole of the plurality of holes on the long side may be greater than a distance between a dot area on a short side of the reflecting sheet and an outermost hole of the plurality of holes on the short side.

A bent area may be positioned at a boundary between the first sheet part and the second sheet part and a boundary between the second sheet part and third sheet part.

The second sheet part may be rounded.

A slope of the second sheet part may increase as the slope goes towards the third sheet part.

Sizes of the plurality of dots in the second sheet area may vary depending on an increase in the slope.

The sizes of the plurality of dots in the second sheet area may increase as the slope increases.

In a corner of the reflecting sheet, a shape of a dot area on a long side of the reflecting sheet and a shape of a dot area on a short side of the reflecting sheet may be asymmetric.

The backlight unit may further include a cutting line on a corner of the reflecting sheet. A distance between a specific point on the cutting line and a dot nearest to the cutting line in a direction parallel to a long side of the reflecting sheet may be different from a distance between the specific point and a dot nearest to the cutting line in a direction parallel to a short side of the reflecting sheet.

The second sheet area may include a non-dot area adjacent to the third sheet part.

A width of the non-dot area may be greater than a distance between adjacent dots of the plurality of dots.

The first sheet part and the third sheet part may contact the frame, and the second sheet part may be separated from the frame.

A distance between adjacent dots of the plurality of dots in the first dot area may be different from a distance between adjacent dots of the plurality of dots in the second dot area.

The first dot area may be located closer to the first sheet part than the second dot area.

In another aspect, there is a backlight unit including a frame including a bottom and a sidewall extending from the bottom; at least one substrate located on the frame, and a plurality of light sources mounted on the at least one substrate; and a reflecting sheet located on the at least one substrate, wherein the reflecting sheet including: a first sheet part located on the bottom, the first sheet part including a plurality of holes corresponding to the plurality of the light sources; a second sheet part extended from the first sheet; and a third sheet part extended from the second sheet part and located on the sidewall; wherein the second sheet part includes a plurality of dot areas positioned sequentially in a direction from the first sheet part to the third sheet part and the plurality of dot areas include a first dot area and a second dot area, the first dot area including a plurality of dots having the same size and the second dot area including a plurality of dots having the same size, wherein a distance of adjacent dots of the plurality of dots in the first dot area is different from a distance of adjacent dots of the plurality of dots in the second dot area.

In another aspect, there is a display device including: a frame including a bottom and a sidewall extending from the bottom; at least one substrate located on the frame, and a plurality of light sources mounted on the at least one substrate; a reflecting sheet located on the at least one substrate; an optical sheet located on the reflecting sheet; and a display panel located on the optical sheet, wherein the reflecting sheet including: a first sheet part located on the bottom, the first sheet part including a plurality of holes corresponding to the plurality of the light sources; a second sheet part extended from the first sheet; and a third sheet part extended from the second sheet part and located on the sidewall; wherein the second sheet part includes a plurality of dot areas positioned sequentially in a direction from the first sheet part to the third sheet part and the plurality of dot areas including a first dot area and a second dot area, the first dot area including a plurality of dots having the same size and the second dot area including a plurality of dots having the same size, wherein a size of the plurality of dots in the first dot area is different from a size of the plurality of dots in the second dot area.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
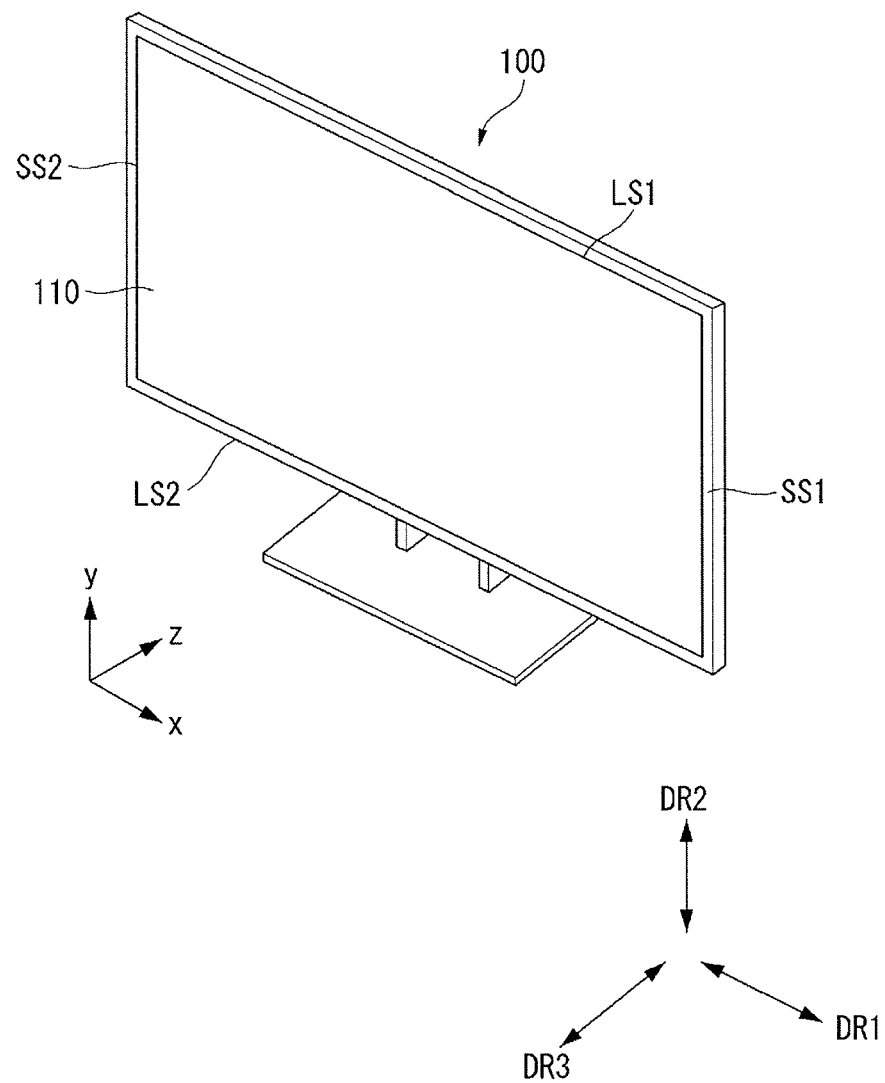
FIGS. 1 and 2 illustrate a display device according to an example embodiment of the invention.

Reference will now be made in detail to embodiments of the invention, examples of which are illustrated in the accompanying drawings. Wherever possible, the same reference numbers will be used throughout the drawings to refer to the same or like parts. A suffix such as "module" and "unit" may be assigned or used interchangeably to refer to elements or components. Use of such a suffix herein is merely intended to facilitate the description of the embodiments of the invention, and the suffix itself is not intended to give any special meaning or function. It will be paid attention that detailed description of known arts will be omitted if it is determined that the detailed description of the know arts can obscure the embodiments of the invention. The accompanying drawings are merely intended to easily describe the embodiments of the invention, and the spirit and technical scope of the present invention is not limited by the accompanying drawings. It should be understood that the present invention is not limited to specific disclosed embodiments, but includes all modifications, equivalents and substitutes included within the spirit and technical scope of the present invention.

Hereinafter, the embodiments of the invention are described using a liquid crystal display panel as an example of a display panel. Other display panels may be used. For example, a plasma display panel (PDP), a field emission display (FED) panel, and an organic light emitting diode (OLED) display panel may be used.

In what follows, a display panel may include a first long side LS1, a second long side LS2 opposite the first long side LS1, a first short side SS1 adjacent to the first long side LS1 and the second long side LS2, and a second short side SS2 opposite the first short side SS1.

In the embodiment disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

The embodiment of the invention describes that lengths of the first and second long sides LS1 and LS2 are longer than lengths of the first and second short sides SS1 and SS2 for the sake of brevity and ease of reading. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display panel, and a second direction DR2 may be a direction parallel to the short sides SS1 and SS2 of the display panel.

Further, a third direction DR3 may be a direction vertical to the first direction DR1 and/or the second direction DR2.

In the embodiment disclosed herein, the first direction DR1 and the second direction DR2 may be commonly referred to as a horizontal direction.

Further, the third direction DR3 may be referred to as a vertical direction.

Figure 2:
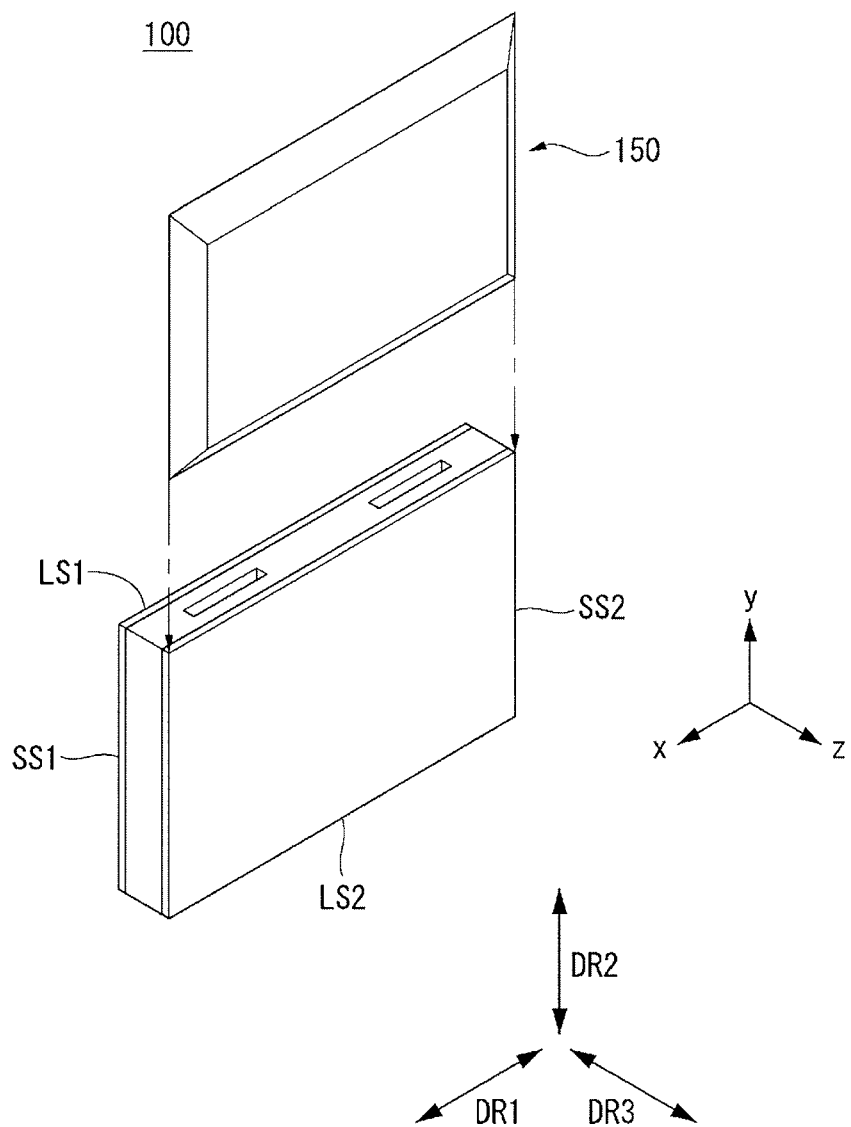

FIGS. 1 and 2 illustrate a display device according to an example embodiment of the invention.

As shown in FIGS. 1 and 2, a display device 100 according to the embodiment of the invention may include a display panel 110 and a back cover 150 positioned in the rear of the display panel 110.

The back cover 150 may be connected to the display panel 110 in a sliding manner in a direction (i.e., the second direction DR2) from the first long side LS1 to the second long side LS2. In other words, the back cover 150 may be inserted into the first short side SS1, the second short side SS2 opposite the first short side SS1, and the first long side LS1 which is adjacent to the first and second short sides SS1 and SS2 and is positioned between the first short side SS1 and the second short side SS2, of the display panel 110 in the sliding manner.

The back cover 150 and/or other components adjacent to the back cover 150 may include a protrusion, a sliding unit, a connection unit, etc., so that the back cover 150 is connected to the display panel 110 in the sliding manner.

FIGS. 3 to 7 illustrate configuration of a display device related to the embodiment of the invention.

Figure 3:
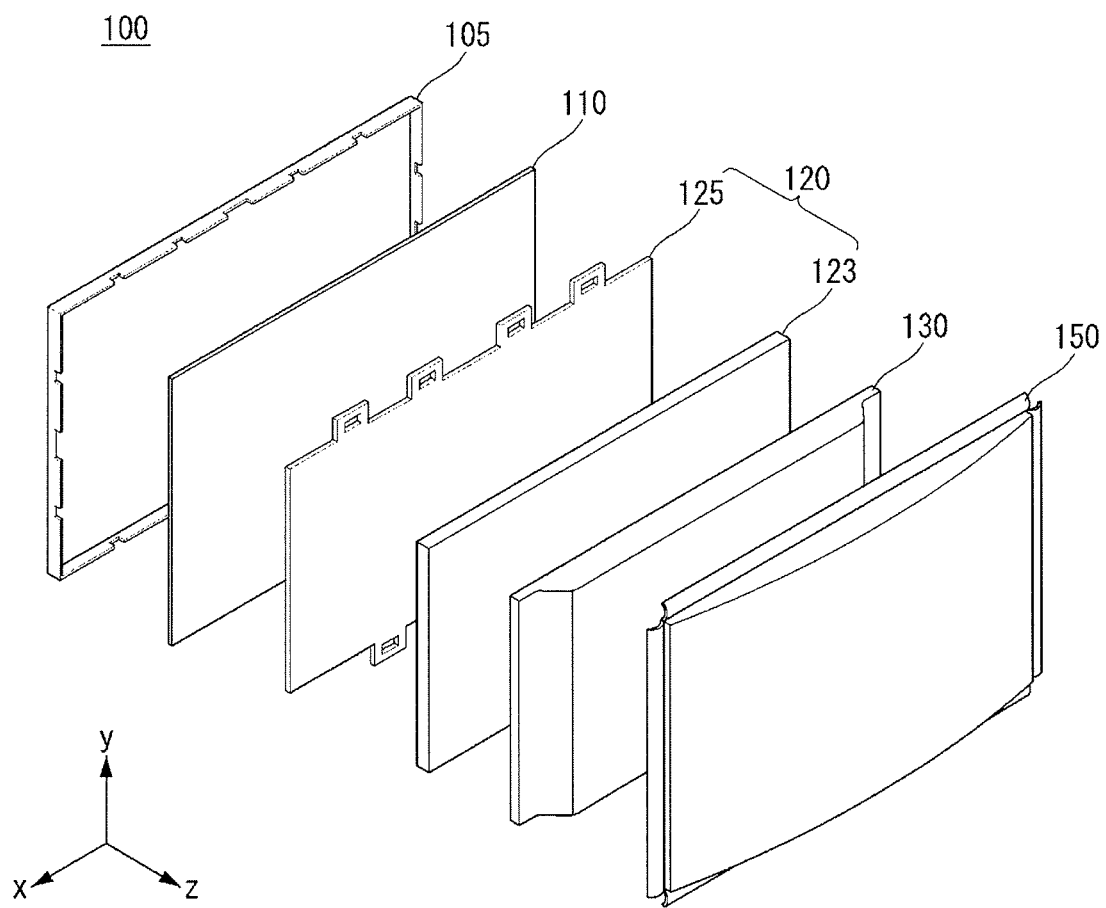
FIGS. 3 to 7 illustrate configuration of a display device related to an example embodiment of the invention.

As shown in FIG. 3, the display device 100 according to the embodiment of the invention may include a front cover 105, the display panel 110, a backlight unit 120, a frame 130, and the back cover 150.

The front cover 105 may cover at least a portion of a front surface and a side surface of the display panel 110. The front cover 105 may have a rectangular fame shape, in which a center portion is empty. Because the center portion of the front cover 105 is empty, an image displayed on the display panel 110 may be seen to the outside.

The front cover 105 may include a front cover and a side cover. Namely, the front cover 105 may include the front cover positioned at the front surface of the display panel 110 and the side cover at the side surface of the display panel 110. The front cover and the side cover may be separately configured. One of the front cover and the side cover may be omitted. For example, the front cover may be omitted, and only the side cover may be absent in terms of a beautiful appearance of the display device 100.

The display panel 110 may be positioned in front of the display device 100 and may display an image. The display panel 110 may divide the image into a plurality of pixels and may output the image while controlling color, brightness, and chroma of each pixel. The display panel 110 may include an active area, on which the image is displayed, and an inactive area, on which the image is not displayed. The display panel 110 may include a front substrate and a back substrate which are positioned opposite each other with a liquid crystal layer interposed there between.

The front substrate may include a plurality of pixels each including red, green, and blue subpixels. The front substrate may generate an image corresponding to the red, green, or blue color in response to a control signal.

The back substrate may include switching elements. The back substrate may turn on pixel electrodes. For example, the pixel electrode may change a molecule arrangement of the liquid crystal layer in response to a control signal received from the outside. The liquid crystal layer may include a plurality of liquid crystal molecules. The arrangement of the liquid crystal molecules may change depending on a voltage difference between the pixel electrode and a common electrode. The liquid crystal layer may transmit light provided by the backlight unit 120 to the front substrate.

The backlight unit 120 may be positioned at a back surface of the display panel 110. The backlight unit 120 may include a plurality of light sources. The light sources of the backlight unit 120 may be arranged in an edge type or a direct type. In the instance of the edge type backlight unit 120, a light guide plate may be added.

The backlight unit 120 may be coupled to a front surface of the frame 130. For example, the plurality of light sources may be disposed at the front surface of the frame 130. In this instance, the backlight unit 120 may be commonly called the direct type backlight unit 120.

The backlight unit 120 may be driven in an entire driving method or a partial driving method such as a local dimming method and an impulsive driving method. The backlight unit 120 may include an optical sheet 125 and an optical layer 123.

The optical sheet 125 can cause light of the light sources to be uniformly transferred to the display panel 110. The optical sheet 125 may include a plurality of layers. For example, the optical sheet 125 may include at least one prism sheet and/or at least one diffusion sheet.

The optical sheet 125 may further include at least one coupling unit 125d. The coupling unit 125d may be coupled to the front cover 105 and/or the back cover 150. Namely, the coupling unit 125d may be directly coupled to the front cover 105 and/or the back cover 150. Alternatively, the coupling unit 125d may be coupled to a structure formed on the front cover 105 and/or the back cover 150. Namely, the coupling unit 125d may be indirectly coupled to the front cover 105 and/or the back cover 150.

The optical layer 123 may include the light source, etc. The detailed configuration of the optical layer 123 will be described in the corresponding paragraphs.

The frame 130 may support components constituting the display device 100. For example, the frame 130 may be coupled to the backlight unit 120. The frame 130 may be formed of a metal material, for example, an aluminum alloy.

The back cover 150 may be positioned at a back surface of the display device 100. The back cover 150 may protect inner configuration of the display device 100 from the outside. At least a portion of the back cover 150 may be coupled to the frame 130 and/or the front cover 105. The back cover 150 may be an injection production (or injection molded) formed of a resin material.

Figure 4:
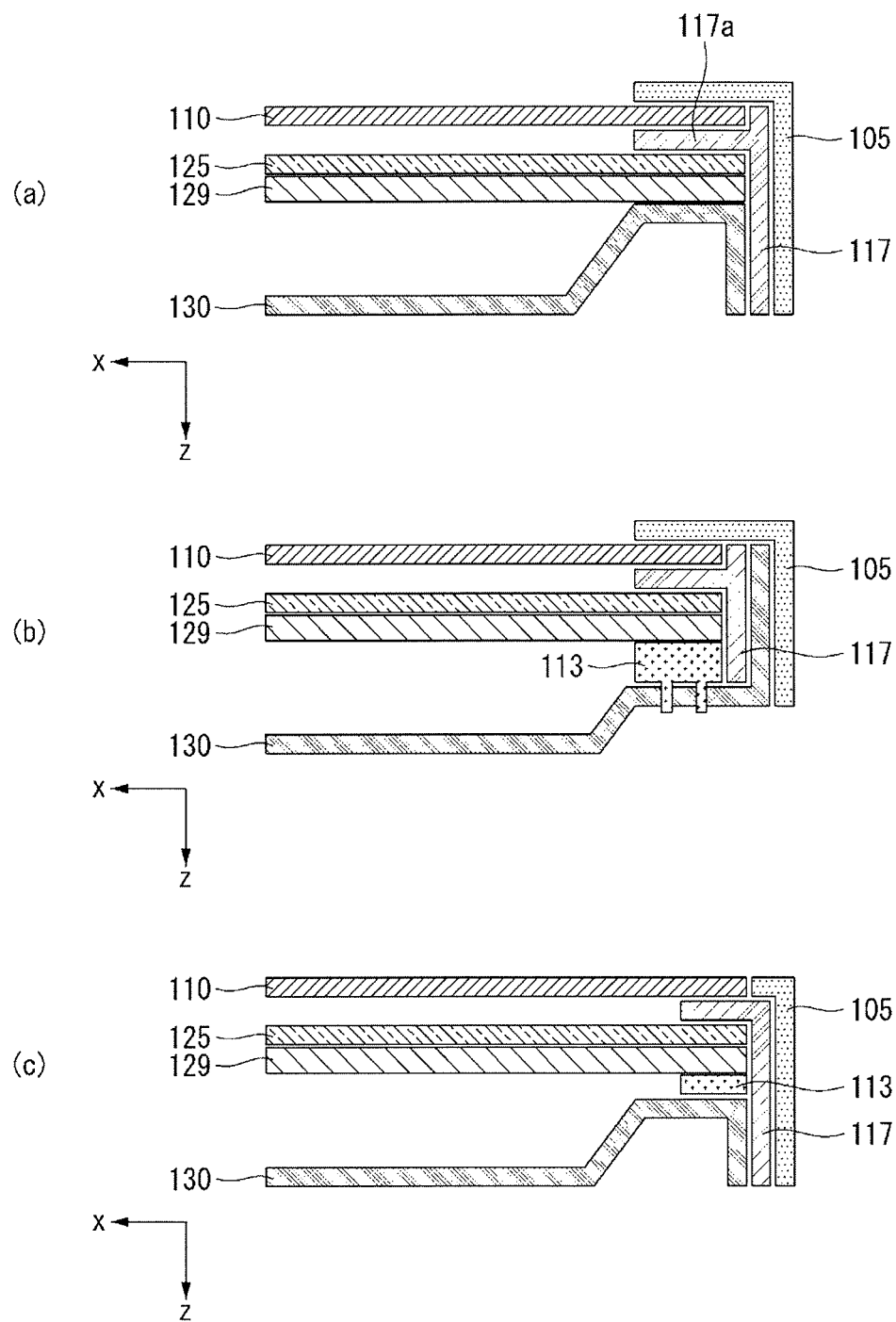

FIG. 4 shows the configuration of the optical sheet 125.

As shown in (a) of FIG. 4, the optical sheet 125 and/or a diffusion plate 129 may be positioned on the frame 130. The optical sheet 125 and/or the diffusion plate 129 may be coupled to the frame 130 at an edge of the frame 130. The optical sheet 125 and/or the diffusion plate 129 may be directly placed at the edge of the frame 130. Namely, an outer perimeter of the optical sheet 125 and/or the diffusion plate 129 may be supported by the frame 130. An upper surface of an edge of the optical sheet 125 and/or the diffusion plate 129 may be surrounded by a first guide panel 117. For example, the optical sheet 125 and/or the diffusion plate 129 may be positioned between the edge of the frame 130 and a flange 117*a* of the first guide panel 117.

The display panel 110 may be positioned at a front surface of the optical sheet 125. An edge of the display panel 110 may be coupled to the first guide panel 117. Namely, the display panel 110 may be supported by the first guide panel 117.

An edge area of the front surface of the display panel 110 may be surrounded by the front cover 105. For example, the display panel 110 may be positioned between the first guide panel 117 and the front cover 105.

As shown in (b) of FIG. 4, the display device 100 according to the embodiment of the invention may further include a second guide panel 113. The optical sheet 125 and/or the diffusion plate 129 may be coupled to the second guide panel 113. Namely, the second guide panel 113 may have a shape, in which the second guide panel 113 is coupled to the frame 130 and the optical sheet 125 and/or the diffusion plate 129 are/is coupled to the second guide panel 113. The second guide panel 113 may be formed of a material different from the frame 130. The frame 130 may have a shape surrounding the first and second guide panels 117 and 113.

As shown in (c) of FIG. 4, in the display device 100 according to the embodiment of the invention, the front cover 105 may not cover the front surface of the display panel 110. Namely, one end of the front cover 105 may be positioned on the side of the display panel 110.

Figure 5:
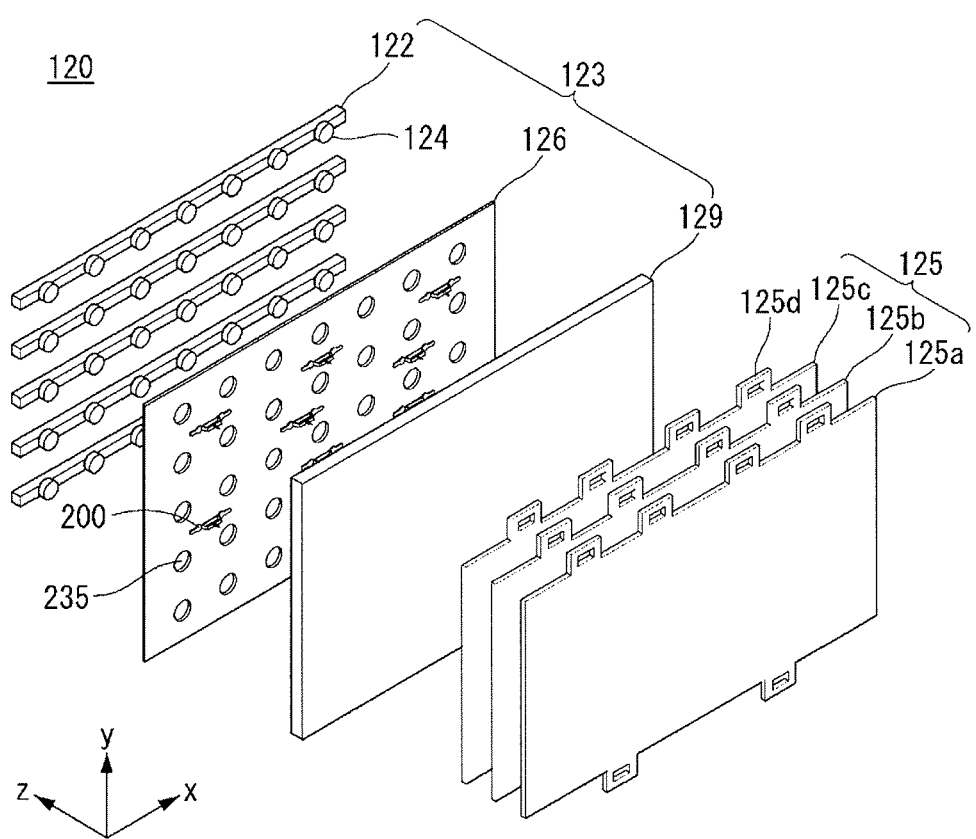
Figure 6:
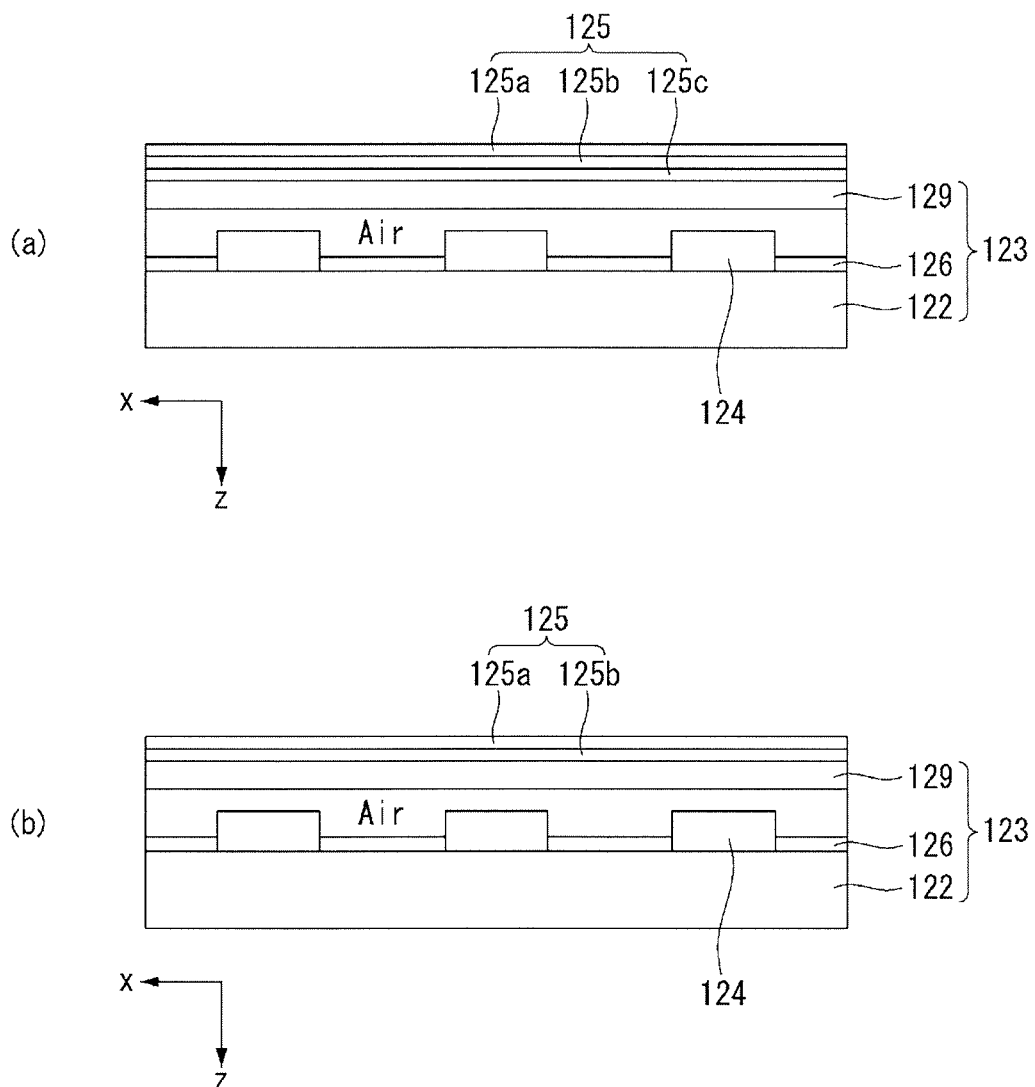

Referring to FIGS. 5 and 6, the backlight unit 120 may include the optical layer 123 including substrates 122, at least one light assembly 124, a reflecting sheet 126 and the diffusion plate 129, and the optical sheet 125 positioned on a front surface of the optical layer 123.

The substrates 122 may include a plurality of straps, which extend in a first direction and are separated from one another by a predetermined distance in a second direction perpendicular to the first direction.

At least one light assembly 124 may be mounted on the substrate 122. The substrate 122 may have an electrode pattern for connecting an adaptor to the light assembly 124. For example, a carbon nanotube electrode pattern for connecting the adaptor to the light assembly 124 may be formed on the substrate 122.

The substrate 122 may be formed of at least one of polyethylene terephthalate (PET), glass, polycarbonate (PC), and silicon. The substrate 122 may be a printed circuit board (PCB), on which at least one light assembly 124 is mounted.

The light assemblies 124 may be disposed on the substrate 122 at predetermined intervals in the first direction. A diameter of the light assembly 124 may be greater than a width of the substrate 122. Namely, the diameter of the light assembly 124 may be greater than a length of the substrate 122 in the second direction.

The light assembly 124 may be one of a light emitting diode (LED) chip and a LED package having at least one LED chip.

The light assembly 124 may be configured as a colored LED emitting at least one of red, green, and blue light or a white LED. The colored LED may include at least one of a red LED, a green LED, and a blue LED.

The light source included in the light assembly 124 may be a COB (Chip-On-Board) type. The COB light source may have a configuration, in which the LED chip as the light source is directly coupled to the substrate 122. Thus, the process may be simplified. Further, a resistance may be reduced, and a loss of energy resulting from heat may be reduced. Namely, power efficiency of the light assembly 124 may increase. The COB light source can provide the brighter lighting and may be implemented to be thinner and lighter than a related art.

The reflecting sheet 126 may be positioned at the front surface of the substrate 122. The reflecting sheet 126 may be positioned in an area excluding a formation area of the light assemblies 124 of the substrates 122. Namely, the reflecting sheet 126 may have a plurality of holes 235.

The reflecting sheet 126 may reflect light emitted from the light assembly 124 to a front surface of the reflecting sheet 126. Further, the reflecting sheet 126 may again reflect light reflected from the diffusion plate 129.

The reflecting sheet 126 may include at least one of metal and metal oxide which are a reflection material. The reflecting sheet 126 may include metal and/or metal oxide having a high reflectance, for example, aluminum (Al), silver (Ag), gold (Au), and titanium dioxide ($TiO_2$).

The reflecting sheet 126 may be formed by depositing and/or coating the metal or the metal oxide on the substrate 122. An ink including the metal material may be printed on the reflecting sheet 126. On the reflecting sheet 126, a deposition layer may be formed using a heat deposition method, an evaporation method, or a vacuum deposition method such as a sputtering method. On the reflecting sheet 126, a coating layer and/or a printing layer may be formed using a printing method, a gravure coating method or a silk screen method.

An air gap may be positioned between the reflecting sheet 126 and the diffusion plate 129. The air gap may serve as a buffer capable of widely spreading light emitted from the light assembly 124. A supporter (or support plate) 200 may be positioned between the reflecting sheet 126 and the diffusion plate 129, so as to maintain the air gap.

A resin may be deposited on the light assembly 124 and/or the reflecting sheet 126. The resin may function to diffuse light emitted from the light assembly 124.

The diffusion plate 129 may upwardly diffuse light emitted from the light assembly 124.

The optical sheet 125 may be positioned at a front surface of the diffusion plate 129. A back surface of the optical sheet 125 may be adhered to the diffusion plate 129, and a front surface of the optical sheet 125 may be adhered to the back surface of the display panel 110.

The optical sheet 125 may include at least one sheet. More specifically, the optical sheet 125 may include one or more prism sheets and/or one or more diffusion sheets. The plurality of sheets included in the optical sheet 125 may be attached and/or adhered to one another.

In other words, the optical sheet 125 may include a plurality of sheets having different functions. For example, the optical sheet 125 may include first to third optical sheets 125*a* to 125*c*. The first optical sheets 125*a* may function as a diffusion sheet, and the second and third optical sheets 125*b* and 125*c* may function as a prism sheet. A number and/or a position of the diffusion sheets and the prism sheets may be changed. For example, the optical sheet 125 may include the first optical sheets 125a as the diffusion sheet and the second optical sheet 125b as the prism sheet.

The diffusion sheet may prevent light coming from the diffusion plate from being partially concentrated and may homogenize a luminance of the light. The prism sheet may concentrate light coming from the diffusion sheet and may make the concentrated light be vertically incident on the display panel 110.

The coupling unit 125d may be formed on at least one of corners of the optical sheet 125. The coupling unit 125d may be formed in at least one of the first to third optical sheets 125a to 125c.

The coupling unit 125d may be formed at the corner on the long side of the optical sheet 125. The coupling unit 125d formed on the first long side and the coupling unit 125d formed on the second long side may be asymmetric. For example, a number and/or a position of the coupling units 125d formed on the first long side may be different from a number and/or a position of the coupling units 125d formed on the second long side.

Figure 7:
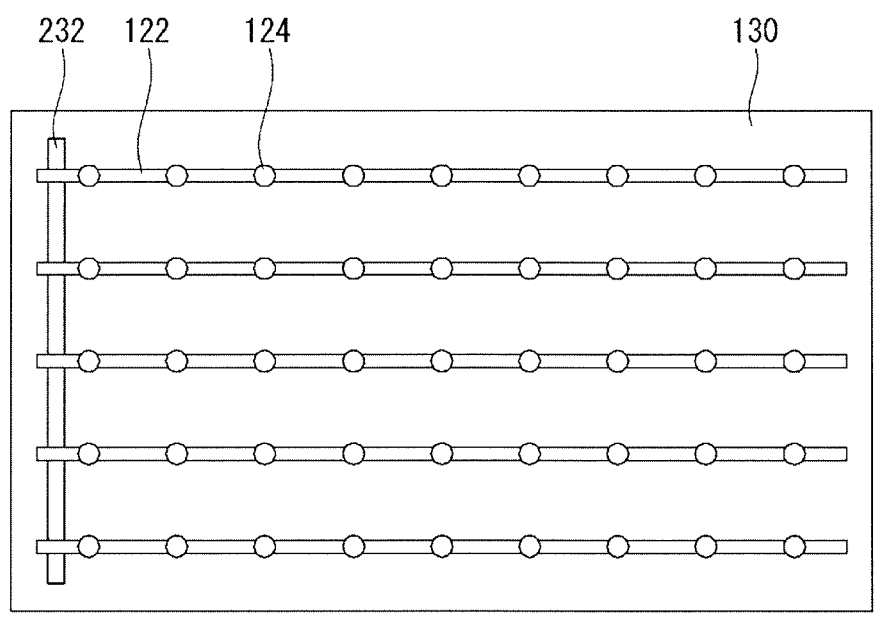

Referring to FIG. 7, the substrates 122 including the plurality of straps, which extend in the first direction and are separated from one another by a predetermined distance in the second direction perpendicular to the first direction, may be provided on the frame 130. One end of each of the plurality of substrates 122 may be connected to a line electrode 232.

The line electrode 232 may extend in the second direction. The line electrode 232 may be connected to the ends of the substrates 122 at predetermined intervals in the second direction. The substrates 122 may be electrically connected to the adaptor through the line electrode 232.

The light assemblies 124 may be mounted on the substrate 122 at predetermined intervals in the first direction. A diameter of the light assembly 124 may be greater than a width of the substrate 122 in the second direction. Hence, an outer area of the light assembly 124 may be positioned beyond a formation area of the substrate 122.

Figure 8:
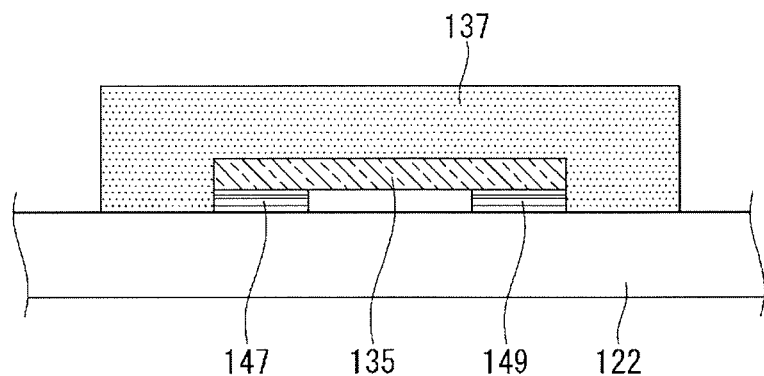
FIGS. 8 and 9 illustrate a light source according to an example embodiment of the invention.
Figure 9:
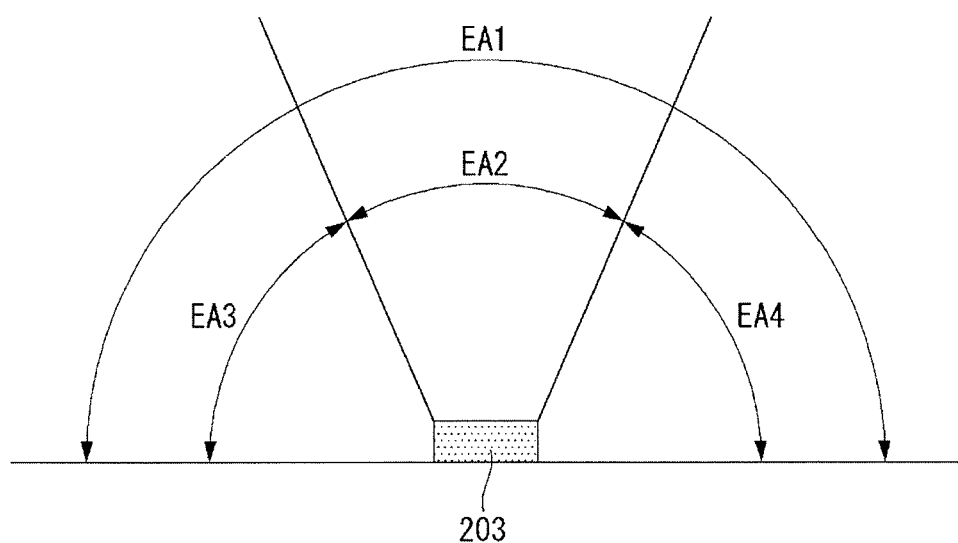

FIGS. 8 and 9 show a light source according to the embodiment of the invention.

As shown in FIG. 8, a light source 203 may be a COB light source. The COB light source 203 may include at least one of an emission layer 135, first and second electrodes 147 and 149, and a fluorescent layer 137.

The emission layer 135 may be positioned on the substrate 122. The emission layer 135 may emit one of red, green, and blue light. The emission layer 135 may include one of Firpic, (CF3ppy) 2Ir(pic), 9,10-di(2-naphthyl)anthracene(AND), perylene, distyrybiphenyl, PVK, OXD-7, UGH-3(Blue), and a combination thereof.

The first and second electrodes 147 and 149 may be positioned on both sides of a lower surface of the emission layer 135. The first and second electrodes 147 and 149 may transmit an external driving signal to the emission layer 135.

The fluorescent layer 137 may cover the emission layer 135 and the first and second electrodes 147 and 149. The fluorescent layer 137 may include a fluorescent material converting light of a spectrum generated from the emission layer 135 into white light. A thickness of the emission layer 135 on the fluorescent layer 137 may be uniform. The fluorescent layer 137 may have a refractive index of 1.4 to 2.0.

The COB light source 203 according to the embodiment of the invention may be directly mounted on the substrate 122. Thus, the size of the light assembly 124 may decrease.

Because heat dissipation of the light sources 203 is excellent by forming the light sources 203 on the substrate 122, the light sources 203 may be driven at a high current. Hence, a number of light sources 203 required to secure the same light quantity may decrease.

Further, because the light sources 203 are mounted on the substrate 122, a wire bonding process may not be necessary. Hence, the manufacturing cost may be reduced due to the simplification of the manufacturing process.

As shown in FIG. 9, the light source 203 according to the embodiment of the invention may emit light in a first emission range EA1. Namely, the light source 203 may emit light in the first emission range EA1 including a second emission range EA2 of the front side and third and fourth emission ranges EA3 and EA4 of both sides. Thus, the light source 203 according to the embodiment of the invention is different from a related art POB light source emitting light in the second emission range EA2. In other words, the light source 203 according to the embodiment of the invention may be the COB light source, and the COB light source 203 may emit light in a wide emission range including the side.

Because the COB light source 203 emits light even in a direction corresponding to the third and fourth emission ranges EA3 and EA4 of the side, the embodiment of the invention needs to efficiently control light of the side direction. The reflecting sheet according to the embodiment of the invention may control a reflectance of light emitted from the light source 203 in the side direction. Thus, the embodiment of the invention may reduce the non-uniformity of brightness resulting from light of the side direction.

Figure 10:
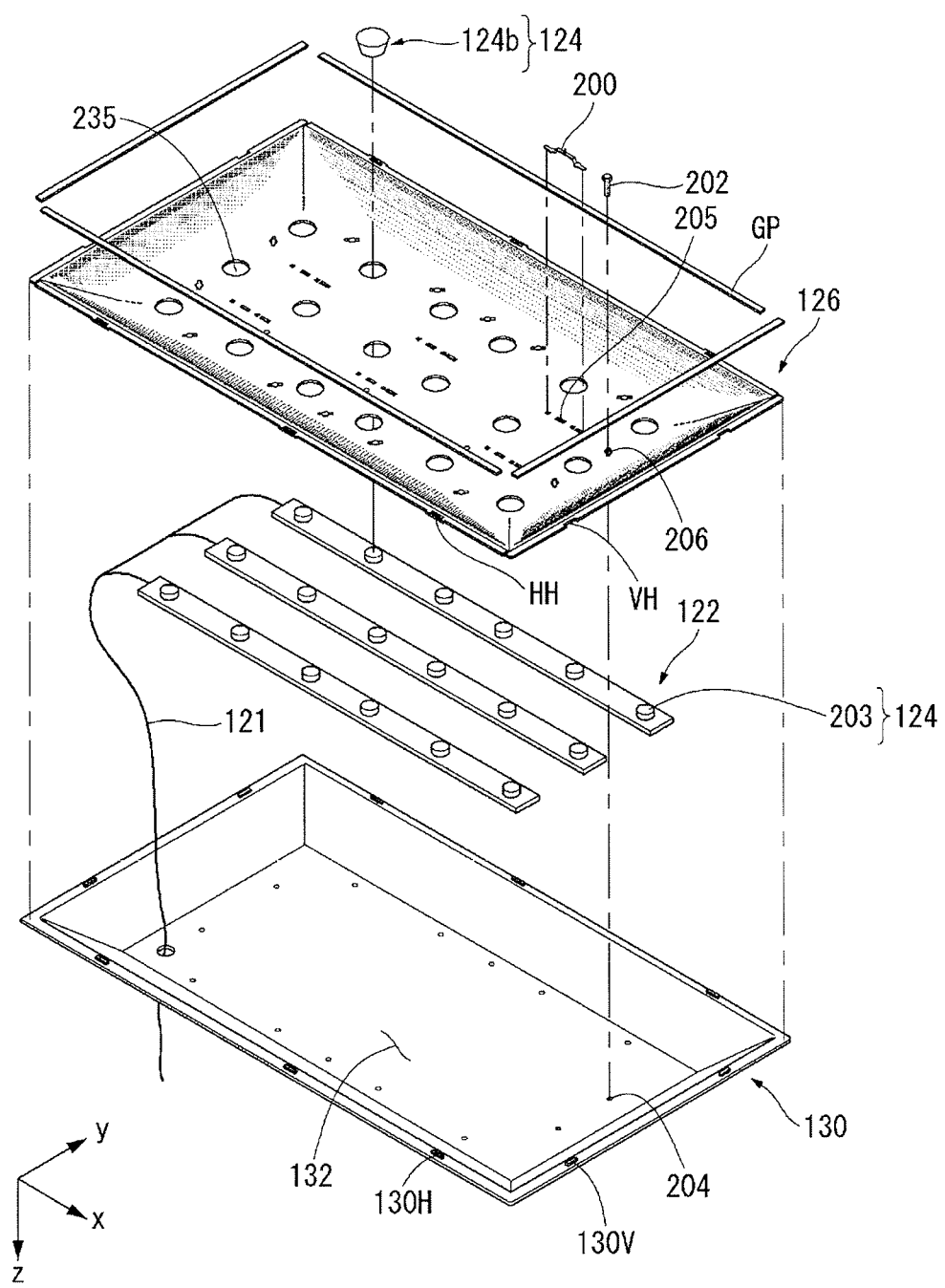
FIG. 10 illustrates a connection relationship between a reflecting sheet and components around the reflecting sheet according to an example embodiment of the invention.

FIG. 10 illustrates a connection relationship between the reflecting sheet and components around the reflecting sheet according to the embodiment of the invention.

As shown in FIG. 10, the reflecting sheet 126 according to the embodiment of the invention may be placed on the frame 130. For example, the reflecting sheet 126 may be coupled to a receiving unit 132 formed inside the frame 130.

The reflecting sheet 126 may include a horizontal coupling unit HH and a vertical coupling unit VH. For example, coupling holes may be formed along a long side and/or a short side of the reflecting sheet 126.

The horizontal coupling unit HH and the vertical coupling unit VH may be inserted into a horizontal protrusion 130H and/or a vertical protrusion 130V formed on the frame 130. A guide panel GP may be formed on the reflecting sheet 126.

The guide panel GP may be formed of plastic material of injection molding or press processed metal material. The guide panel GP may be coupled to the horizontal protrusion 130H and/or the vertical protrusion 130V. When the guide panel GP is coupled to the reflecting sheet 126, the reflecting sheet 126 may be fixed between the frame 30 and the guide panel GP. FIG. 10 shows that the long sides and the short sides of the guide panel GP are separated from one another, as an example. The guide panel GP, which the long sides and the short sides are connected to one another, may be used.

The reflecting sheet 126 placed on the frame 130 may be configured as a three-dimensional shape corresponding to a shape of the receiving unit 132. Even when the reflecting sheet 126 according to the embodiment of the invention has the three-dimensional shape, the reflecting sheet 126 can provide an optimum reflection effect. For example, the reflecting sheet 126 can uniformly reflect light throughout its entire area.

The reflecting sheet 126 may constitute a portion of the backlight unit 120 (refer to FIG. 5). The substrate 122, on which the light sources 203 are mounted, may be positioned between the reflecting sheet 126 and the frame 130.

The plurality of substrates 122 may be arranged in the horizontal direction and/or the vertical direction. The substrates 122 may be connected to signal lines 121 connected to a controller, etc., of the display device 100. The signal lines 121 may be connected to the substrates 122 through holes formed in the frame 130.

The reflecting sheet 126 may include a plurality of lens holes 235. The plurality of lens holes 235 may correspond to the light sources 203 on the substrate 122. For example, the plurality of lens holes 235 may be arranged in the horizontal direction and/or the vertical direction correspondingly to the light sources 203. A lens 124b may be inserted into the lens hole 235. For example, the lens 124b may be coupled to the light source 203 through the lens hole 235.

The reflecting sheet 126 may include a plurality of support holes (or support plate holes) 205. A supporter 200 may be coupled to the support hole 205. The supporter 200 may support the optical sheet 125 and/or the diffusion plate 129 positioned in front of the reflecting sheet 126. Namely, the reflecting sheet 126 may be separated from the optical sheet 125 and/or the diffusion plate 129 at a predetermined distance.

The reflecting sheet 126 may include a plurality of fixing pin holes 206. A fixing pin 202 may be coupled to the fixing pin hole 206. Also, the fixing pin 202 may be coupled to a frame hole 204 formed in the frame 130. Thus, the fixing pin 202 may fix the reflecting sheet 126 to the frame 130.

Figure 11:
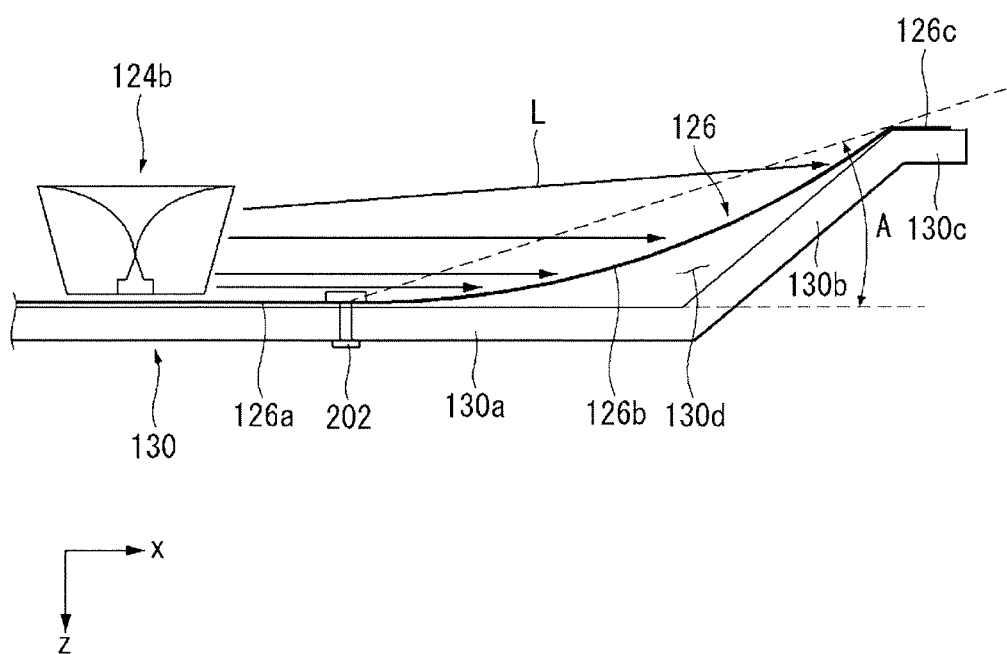
FIGS. 11 to 13 illustrate configuration of a reflecting sheet according to an example embodiment of the invention.
Figure 12:
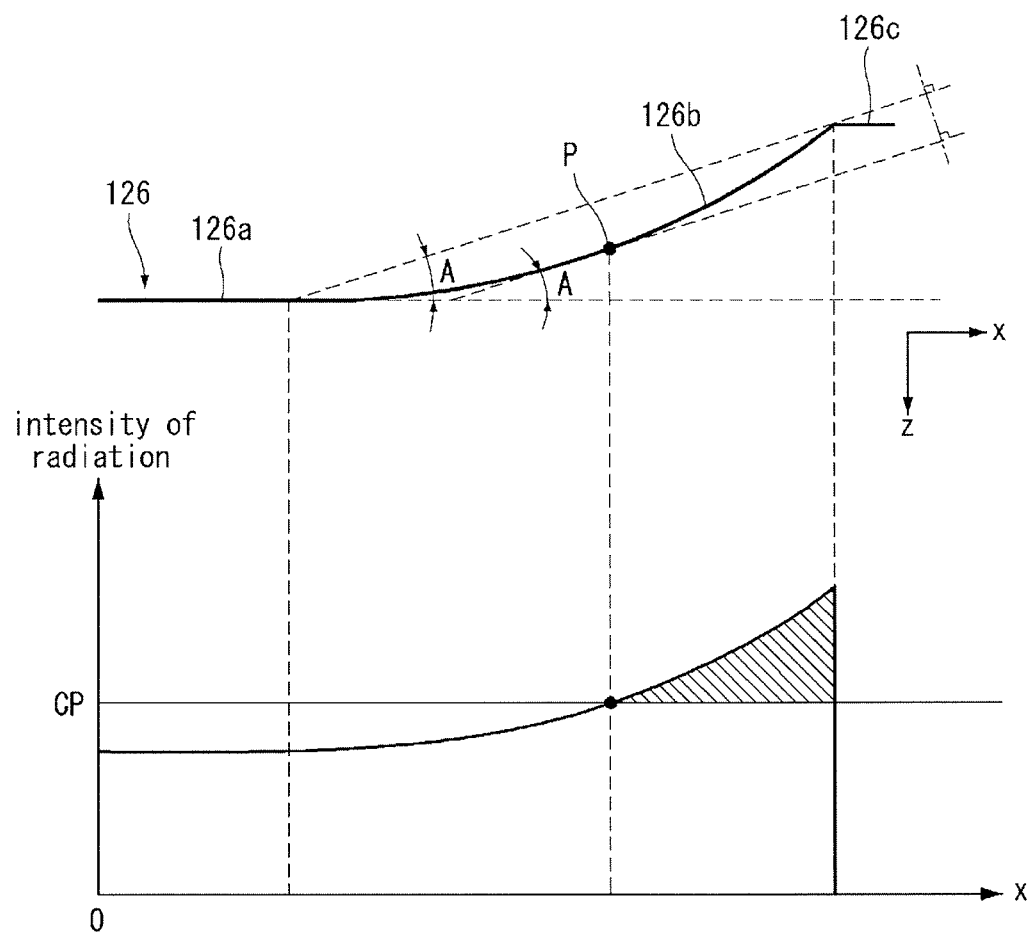
Figure 13:
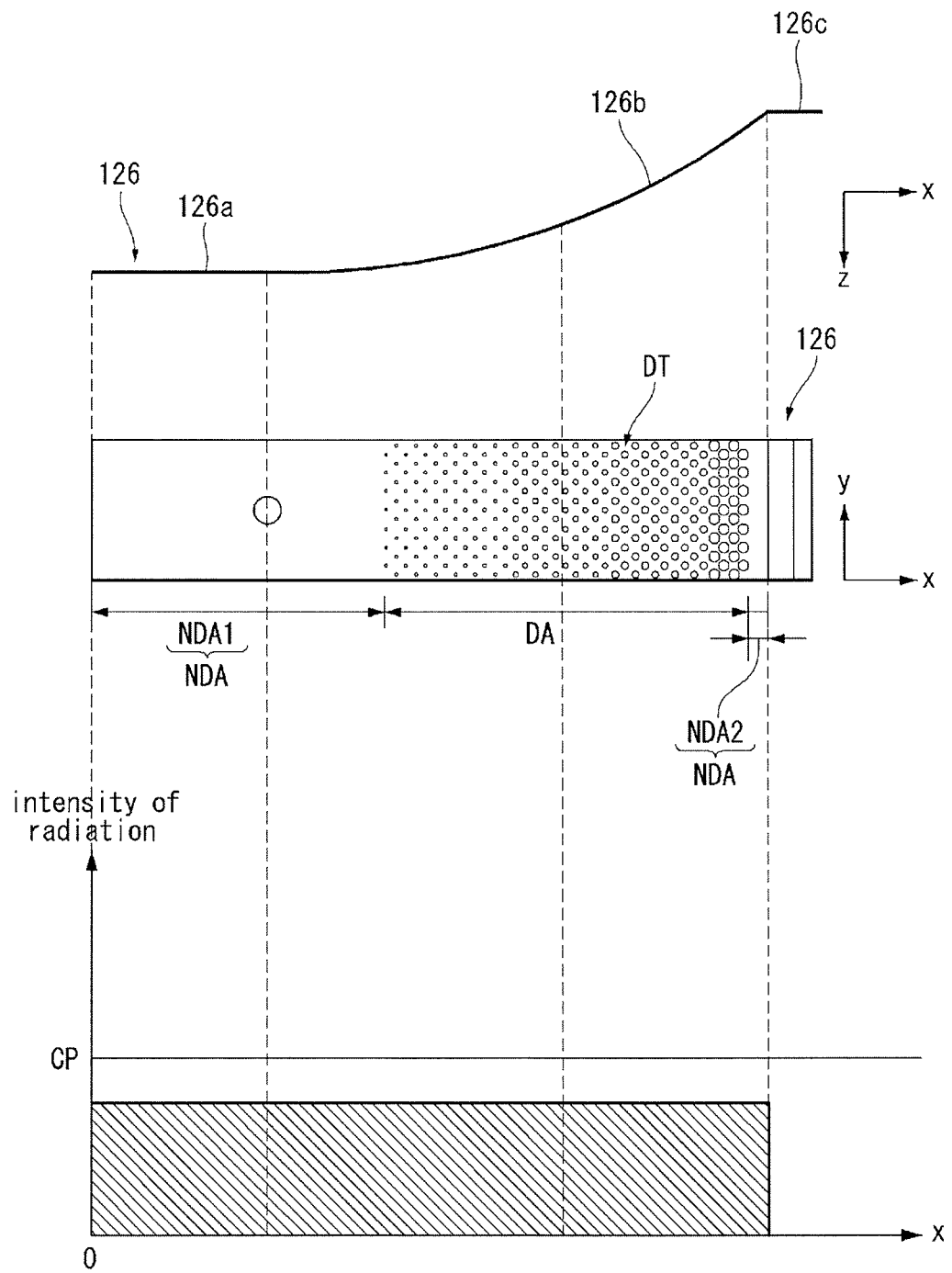

FIGS. 11 to 13 illustrate configuration of the reflecting sheet according to the embodiment of the invention.

As shown in FIGS. 11 to 13, the reflecting sheet 126 according to the embodiment of the invention may be placed in an inner area of the frame 130. The reflecting sheet 126 placed on the frame 130 may have the three-dimensional shape corresponding to a shape of the frame 130.

As shown in FIG. 11, the frame 130 may include first to third frame areas 130a to 130c.

The first frame area 130a may be a bottom surface of the frame 130. The second frame area 130b may be substantially flat. Namely, the second frame area 130b may be a surface positioned on an X-Y plane of the display device 100.

The second frame area 130b may be a sidewall surface extended upwardly from the first frame area 130a. The second frame area 130b may extend in a direction parallel to a Z-axis direction or a direction inclined to the Z-axis direction. The receiving unit 132 (refer to FIG. 10) may be formed inside the frame 130 by the second frame area 130b serving as a sidewall of the frame 130.

The third frame area 130c may be a surface extended from the second frame area 130b in an X-axis direction. The third frame area 130c may be substantially parallel to the first frame area 130a. Namely, the third frame area 130c may be a flat surface in the same manner as the first frame area 130a at a height level different from the first frame area 130a by the second frame area 130b.

The third frame area 130c may include a protruding area. The third frame area 130c may be coupled to a protrusion formed through a separate process. The protruding area and/or the protrusion of the third frame area 130c may be coupled to the reflecting sheet 126. For example, the protruding area and/or the protrusion of the third frame area 130c may be coupled to a third sheet area 126c of the reflecting sheet 126. The protruding area and/or the protrusion of the third frame area 130c may be coupled to the optical sheet 125 (refer to FIG. 5).

The reflecting sheet 126 may be coupled to an area formed by the first to third frame areas 130a to 130c of the frame 130. For example, the reflecting sheet 126 may be coupled to the first frame area 130a through the fixing pin 202. When a portion of the reflecting sheet 126 is coupled to the first frame area 130a through the fixing pin 202, the portion of the reflecting sheet 126 may naturally contact the frame 130.

When the reflecting sheet 126 is coupled to the frame 130 through the fixing pin 202, the shape of the reflecting sheet 126 may be naturally changed depending on the shape of the frame 130. Namely, a naturally rounded second sheet area 126b of the reflecting sheet 126 may be formed. Thus, a separate process for forming a chamfer of the reflecting sheet 126 may not be necessary, and workability may be improved.

The reflecting sheet 126 may include first to third sheet areas 126a to 126c. Namely, an area of the reflecting sheet 126 may be divided depending on whether or not the reflecting sheet 126 and the frame 130 contact each other. For example, the area of the reflecting sheet 126 may be divided into a contact area contacting the frame 130 and a non-contact area not contacting the frame 130.

The area of the reflecting sheet 126 may be divided or delineated into the first sheet area 126a and the second sheet area 126b by the fixing pin 202. In other words, the second sheet area 126b may be an area between the fixing pin 202 and a portion contacting the third frame area 130c, Namely, the first sheet area 126a and the second sheet area 126b may be determined depending on whether or not the reflecting sheet 126 contacts the first frame area 130a of the frame 130. The second sheet area 126b may be naturally separated from the frame 130 by properties and elasticity of the reflecting sheet 126. For example, when the first sheet area 126a is coupled to the frame 130 by the fixing pin 202, the second sheet area 126b may naturally form a curved surface by its own weight and may be separated from the frame 130. A separation space 130d may be formed between the second sheet area 126b and the frame 130. An angle formed by the second sheet area 126b of the reflecting sheet 126 and the bottom surface of the frame 130 may gradually increase. Namely, in the non-contact area of the reflecting sheet 126, the reflecting sheet 126 may have a two-dimensional curve shape. Thus, the second sheet area 126b may be separated from the frame 130 at a predetermined angle.

The third sheet area 126c may be placed in the third frame area 130c. The third sheet area 126c may be coupled to the third frame area 130c. Alternatively, the third sheet area 126c may be naturally positioned on the third frame area 130c. Namely, the third sheet area 126c may contact the third frame area 130c by elastic force of the Z-axis direction resulting from the rounded second sheet area 126b.

Light L may be emitted through the lens 124b. Namely, light generated in the light source 203 may be emitted to the outside through the lens 124b. The light L emitted through the lens 124b may travel through various paths. For example, a portion of the light L may travel through a path of the side direction of the lens 124b.

The portion of the light L in the path of the side direction may travel toward the second sheet area 126b. At least a portion of light generated in the light source 203 may be totally reflected inside the lens 124b and may travel toward the second sheet area 126b. In this instance, an amount of light L upwardly travelling in the second sheet area 126b may be more than an amount of light L downwardly travelling in the second sheet area 126b. In other words, an amount and/or a density of light L transferred to the reflecting sheet 126 may be non-uniform. When the amount and/or the density of the light L is not uniform, a viewer watching the display device 100 may perceive non-uniformity of the amount and/or the density of the light L. For example, when an amount of light L incident on an upper portion of the second sheet area 126b is more than an amount of light L incident on a lower portion of the second sheet area 126b, a corresponding area may be recognized as being brighter than other areas because of the light L reflected from the upper portion of the second sheet area 126b.

As shown in FIG. 12, an angle formed by an extension line from a boundary between the first sheet area 126a and the second sheet area 126b to a boundary between the second sheet area 126b and the third sheet area 126c and two straight lines parallel to the X-axis direction may be called "A". An inclined angle of the second sheet area 126b using an intersection point P between the second sheet area 126b and a straight line of the angle A as a starting point may increase. Namely, an angle of the second sheet area 126b passing the intersection point P in the X-axis direction may sharply increase.

Because the angle of the second sheet area 126b passing the intersection point P increases, a density of the light L emitted from the lens 124b (refer to FIG. 11) per unit area may further increase. Thus, a corresponding portion may be seen as being brighter than other portions. As a result, the viewer may feel that the light is not uniform. The display device 100 according to the embodiment of the invention can make light be uniformly reflected from the reflecting sheet 126. Hence, the viewer cannot feel or can feel less the non-uniformity of the light.

As shown in FIG. 13, in the display device 100 according to the embodiment of the invention, dots DT may be formed in at least a portion of the reflecting sheet 126.

The dot DT may be an area having a pattern different from other areas. The dot DT may be an area of uneven portions (or concave-convex portions) formed on the reflecting sheet 126. The dot DT may be an area, in which at least a portion of the reflecting sheet 126 is colored. For example, the dot DT may be an area of a relatively dark color. For example, the dot DT may be a black or gray area. The dot DT may be an area, in which the uneven portion and the colored portion are mixed with each other. The dot DT may have a geometric shape, in which there is a difference in at least one of a shape, a size, a location, and a color. For example, the dot DT may be one of various shapes including a circle, an oval, a rectangle, a rod, a triangle, etc., formed on the reflecting sheet 126 and/or a combination of the various shapes.

The dots DT may affect a reflectance of a corresponding area. Namely, the dots DT may change a reflectance of light. For example, the reflectance of light may be reduced depending on at least one of a shape, a size, a location, and a color of the dot DT. The plurality of dots DT may gather (or arranged) and form a dot area DA.

The dot area DA may be a gathering (or arranging) of the dots DT. Namely, the dot area DA may be a formation area of the plurality of dots DT, which are the same as or different from one another in at least one of a shape, a size, a location, and a color. For example, the dot area DA may be formed in at least a portion of the second sheet area 126b. As described above, a density of light per unit area in the second sheet area 126b may be high because of the inclined shape of the second sheet area 126b. The dot area DA may change a reflectance of light incident on the second sheet area 126b. In other words, a density of incident light per unit area is high, but a density of reflected light per unit area may decrease. Thus, a phenomenon, in which a contrast of a portion corresponding to the second sheet area 126b is different from a contrast of other portions, may be prevented. Namely, light can be uniformly reflected from the entire reflecting sheet 126 because of the dot area DA. The dots DT constituting the dot area DA may be divided into a plurality of groups having different attributes. For example, a formation area of dots having a first attribute may be called a first area, and a formation area of dots having a second attribute may be called a second area. Hereinafter, the dot area DA may be displayed by changing the color, the density, etc., of the reflecting sheet 126, and areas having the different colors, densities, etc., may be formation areas of dots having different attributes even if a separate explanation is not given. For example, dots having different attributes may be disposed in an area with a first color and an area with a second color. Namely, dots, which are different from one another in at least one of the size, the density, the color, and the interval, may be disposed in different areas.

The reflecting sheet 126 may further include a non-dot area NDA. The non-dot area NDA may be an area, in which there is no dot DT. The non-dot area NDA may be positioned in various areas of the reflecting sheet 126. For example, the non-dot area NDA may include first and second non-dot areas NDA1 and NDA2.

A width of the non-dot area NDA may be greater than a distance between adjacent dots. Namely, the width of the non-dot area NDA in a direction from the first sheet area 126a to the third sheet area 126c may be greater than a distance between two dots adjacent to the non-dot area NDA. The width of the non-dot area NDA may be equal to or greater than 2 mm.

The second non-dot area NDA2 may be positioned at a boundary between the second sheet area 126b and the third sheet area 126c. The second non-dot area NDA2 may be positioned in the second sheet area 126b at the boundary between the second sheet area 126b and the third sheet area 126c.

The second non-dot area NDA2 may be an uppermost area of the second sheet area 126b and thus may be close to the optical sheet 125 and/or the diffusion plate 129 positioned in front of the reflecting sheet 126. Hence, if the dot DT exists in the second non-dot area NDA2, the user of the display device 100 may observe the dot DT. Thus, the dot DT may not exist in the second non-dot area NDA2.

FIGS. 14 to 23 illustrate a dot distribution of the reflecting sheet according to the embodiment of the invention.

As shown in FIGS. 14 to 23, the dots DT of the reflecting sheet 126 according to the embodiment of the invention may be disposed in various shapes.

Figure 14:
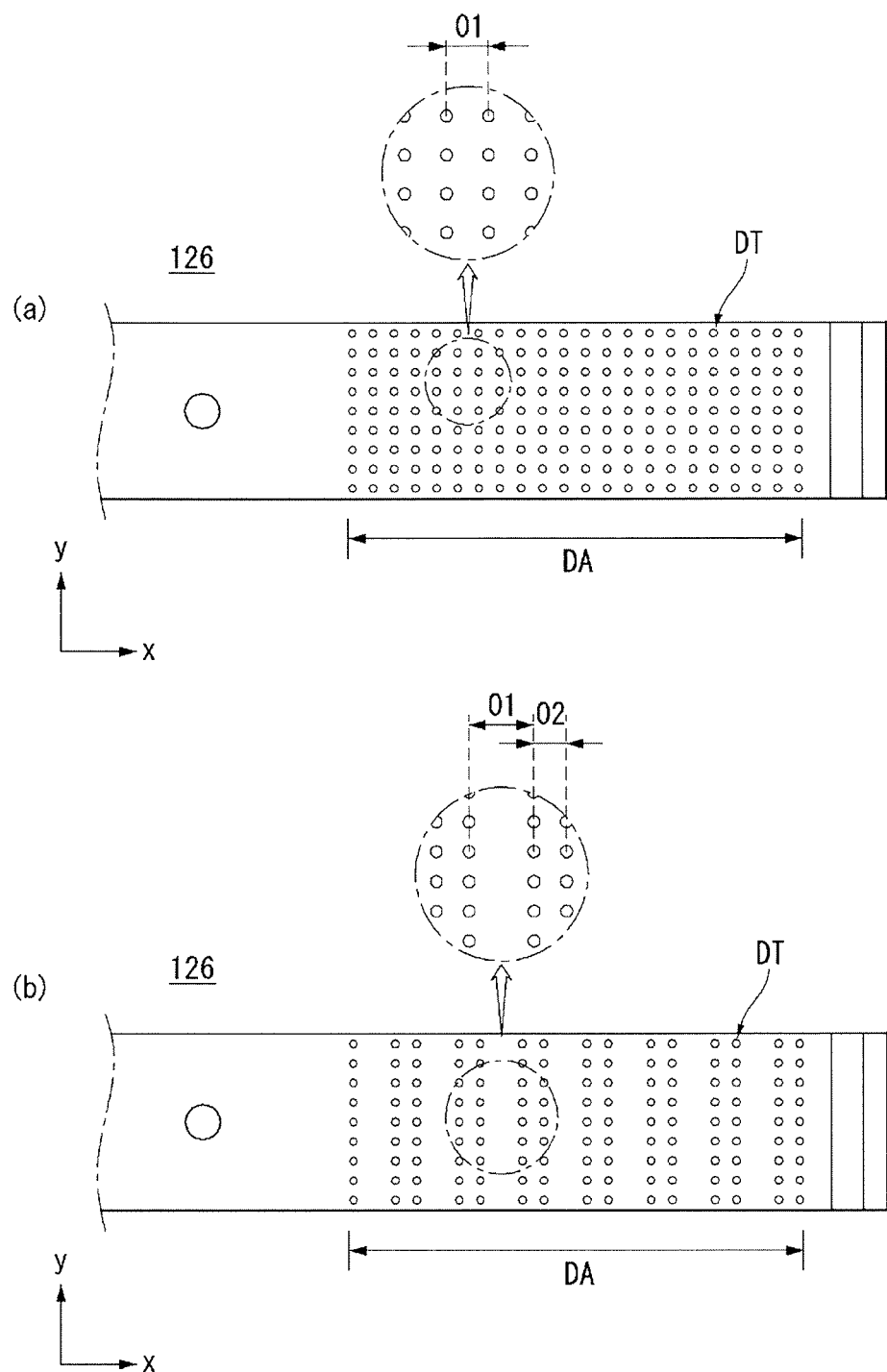
FIGS. 14 to 23B illustrate a dot distribution of a reflecting sheet according to an example embodiment of the invention.

As shown in (a) of FIG. 14, the dots DT may be disposed in the dot area DA. The adjacent dots DT may be separated from each other by a first distance O1. Namely, the dots DT may be disposed at regular intervals of the first distance O1.

The distance between the dots DT may affect the reflectance of the reflecting sheet 126. For example, when the distance between the dots DT decreases, the reflectance may decrease.

As shown in (b) of FIG. 14, the adjacent dots DT may be separated from each other by the first distance O1, and the adjacent dots DT may be separated from each other by a second distance O2. Namely, a distance between the dots DT may not be uniform.

Figure 15:
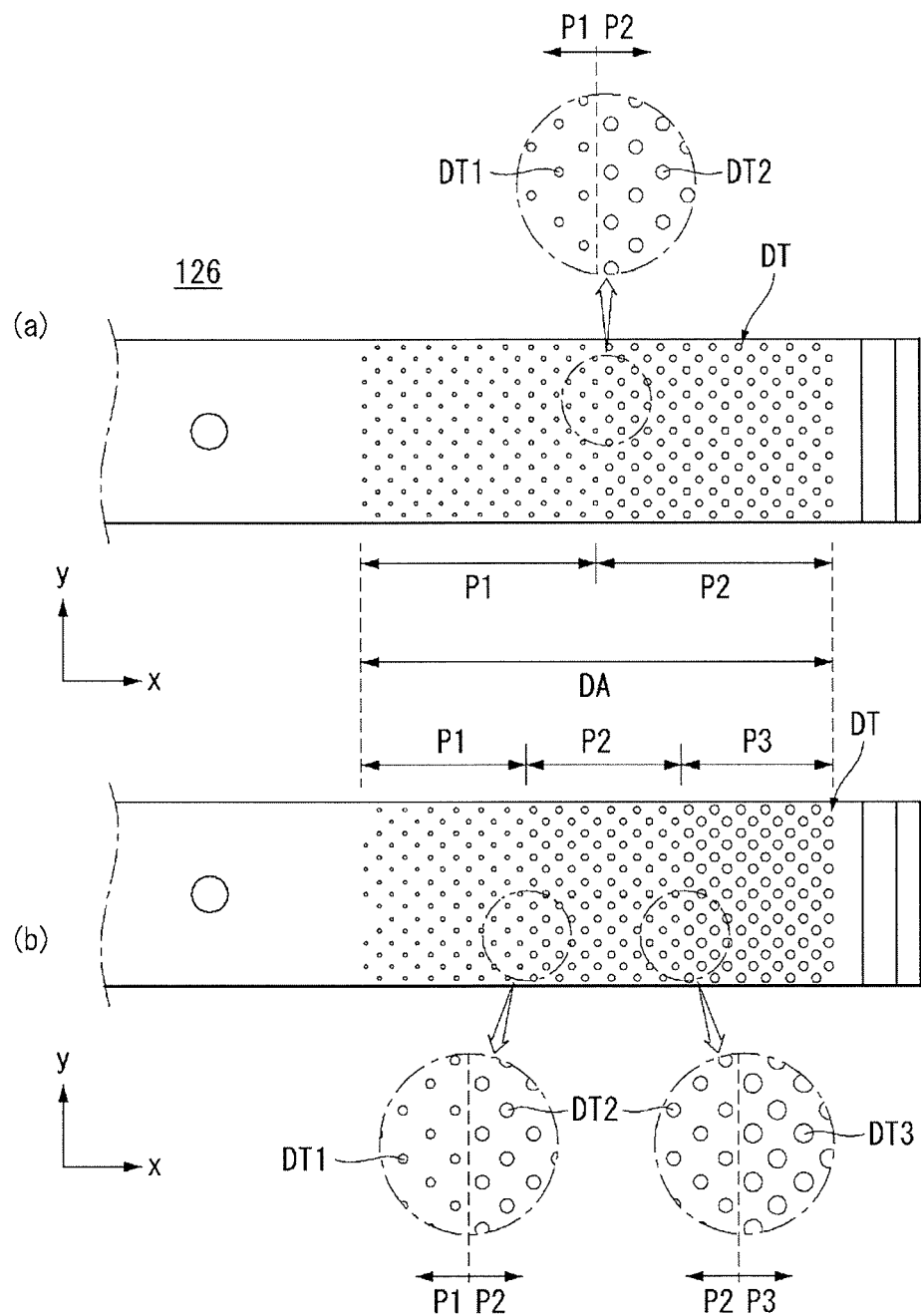

As shown in (a) of FIG. 15, the dot area DA may be divided into a plurality of areas. For example, the dot area DA may be divided into a first area P1 and a second area P2. An attribute of dots DT included in the first area P1 may be different from an attribute of dots DT included in the second area P2. For example, at least one of a size, a density, and a color of a first dot DT1 in the first area P1 may be different from at least one of a size, a density, and a color of a second dot DT2 in the second area P2.

The second area P2 may be positioned further outside than the first area P1. Namely, the second area P2 may be an area close to the third sheet area 126*c*. The second dot DT2 of the second area P2 may be larger than the first dot DT1 of the first area P1. Thus, a reflectance of the second area P2 may be less than a reflectance of the first area P1.

As shown in (b) of FIG. 15, the dot area DA may be divided into a plurality of areas. For example, the dot area DA may be divided into first to third areas P1 to P3. First to third dots DP1 to DP3 of the first to third areas P1 to P3 may have different attributes. For example, the second dot DT2 may be larger than the first dot DT1, and the third dot DT3 may be larger than the second dot DT2. Alternatively, the first to third dots DP1 to DP3 have the same size, but a density of the first area P1 may be different from a density of the second area P2, and a density of the second area P2 may be different from a density of the third area P3. For example, the density of the first area P1 may be less than the density of the second area P2, and the density of the second area P2 may be less than the density of the third area P3.

Figure 16:
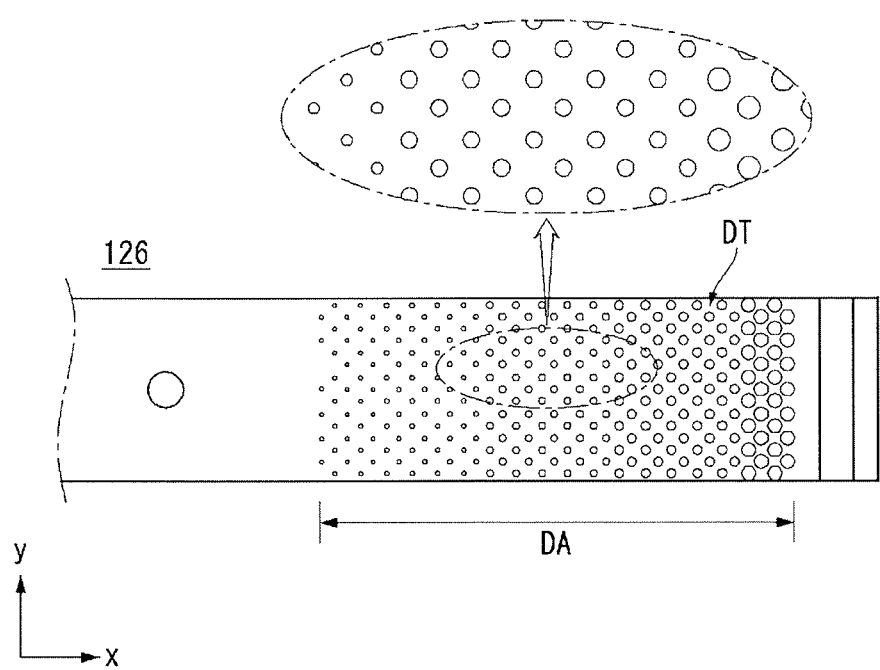

As shown in FIG. 16, the dot area DA may not be divided into a plurality of areas. However, dots DT included in the dot area DA may be different from each other in at least one of a size, a density, and a color. For example, as the dot DT goes along the X-axis direction, the size of the dot DT may gradually increase. Namely, an attribute of the dot DT including at least one of the size, the density, and the color may gradually change.

Figure 17:
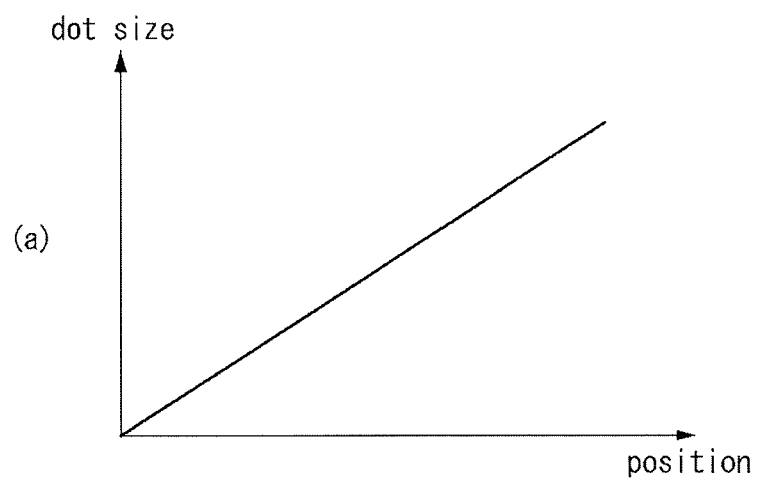
Figure 17:
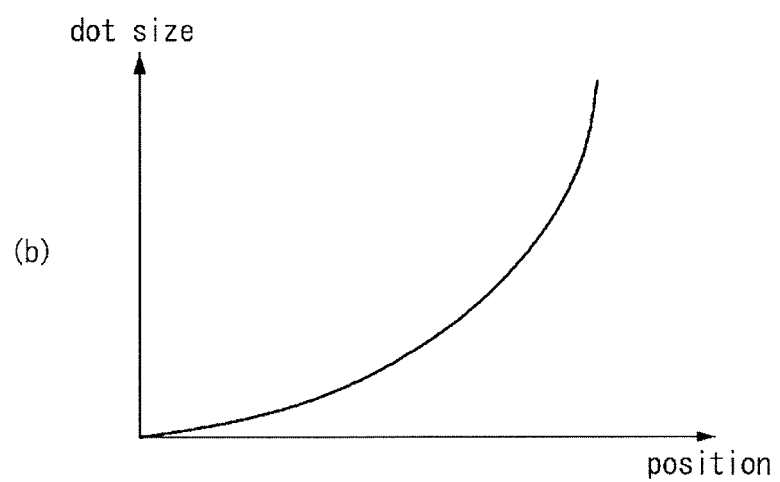

As shown in (a) of FIG. 17, a size of the dot DT may gradually change depending on a location.

As shown in (b) of FIG. 17, a size of the dot DT may sharply change depending on a location. For example, the size of the dot DT may be changed in a curve shape of a quadratic function.

Figure 18:
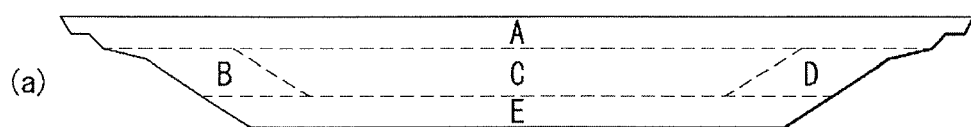
Figure 18:
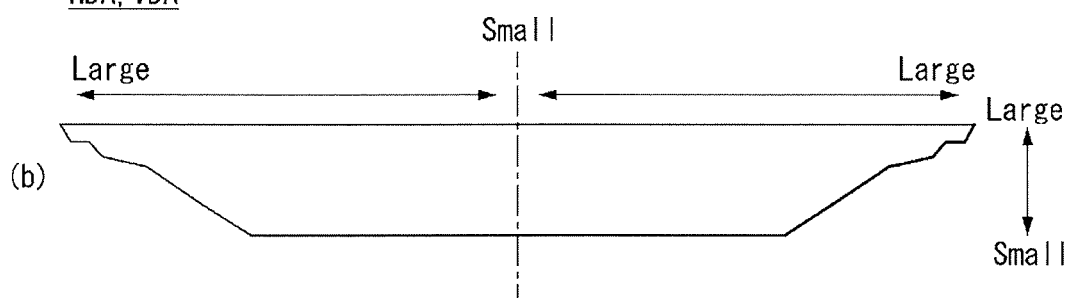
Figure 18:
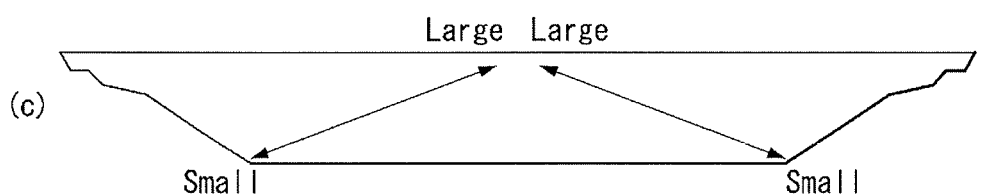

As shown in FIG. 18, dots DT may be disposed in a horizontal dot area HDA and a vertical dot area VDA in various shapes.

The horizontal dot area HDA may be a dot area DA formed on the long side of the reflecting sheet 126, and a vertical dot area VDA may be a dot area DA formed on the short side of the reflecting sheet 126. Detailed locations of the horizontal dot area HDA and the vertical dot area VDA will be described in corresponding paragraphs.

As shown in (a) of FIG. 18, the horizontal dot area HDA and/or the vertical dot area VDA may be divided into a plurality of areas. For example, the horizontal dot area HDA and/or the vertical dot area VDA may be divided into an uppermost area A, a leftmost area B, a rightmost area D, a lowermost area E, and/or a an inner area C. The horizontal dot area HDA and/or the vertical dot area VDA may be divided in different manners.

Dots in the plurality of areas of the horizontal dot area HDA and/or the vertical dot area VDA may have different attributes. For example, a size and/or a density of a dot DT in the uppermost area A may be greater than a size and/or a density of a dot DT in the lowermost area E. A size and/or a density of a dot DT in the inner area C may be greater than a size and/or a density of dots DT in the leftmost area B and the rightmost area D.

As shown in (b) of FIG. 18, the horizontal dot area HDA and/or the vertical dot area VDA may not be divided into a plurality of areas. Namely, the dots DT, of which the attributes gradually change, may be disposed. For example, a size and/or a density of the dot DT may increase as the dot DT goes to the upper side of the horizontal dot area HDA and/or the vertical dot area VDA. The size and/or the density of the dot DT may decrease as the dot DT goes to the inner side of the horizontal dot area HDA and/or the vertical dot area VDA.

As shown in (c) of FIG. 18, attributes of dots DT in an inner area and an outer area of the horizontal dot area HDA and/or the vertical dot area VDA may change. For example, a dot DT having a relatively small size may be disposed at a boundary between the left and right sides and/or the lower side of the horizontal dot area HDA and/or the vertical dot area VDA. A dot DT having a relatively large size may be disposed at a boundary between the inner side and/or the upper side of the horizontal dot area HDA and/or the vertical dot area VDA.

The attribute of the dot DT including the size may change gradually or non-gradually. For example, in an area ranging from the outer area to the inner area of the horizontal dot area HDA and/or the vertical dot area VDA, the size of the dot DT may gradually change or may change depending on a location. For example, the size of the dot DT in a first area including the left and right sides of the horizontal dot area HDA and/or the vertical dot area VDA may be different from the size of the dot DT in a second area including the inner side of the horizontal dot area HDA and/or the vertical dot area VDA. In other words, there may be a difference in at least one of the size, the color, the interval, and the density of the dots DT disposed in a horizontal direction and/or a vertical direction of the horizontal dot area HDA and/or the vertical dot area VDA. For example, in the instance of the horizontal dot area HDA, sizes of two dots DT positioned adjacent to each other in the horizontal direction of the horizontal dot area HDA may be different from each other. The arrangement of the dots DT may be related to the lens hole positioned along the horizontal direction of the horizontal dot area HDA. Namely, a portion, in which the lens hole is positioned, may be brighter, and other areas may be darker. The dots DT having different attributes may be arranged along the horizontal direction of the horizontal dot area HDA, so as to prevent a luminance difference, in which a brighter portion and a darker portion are present.

Figure 19:
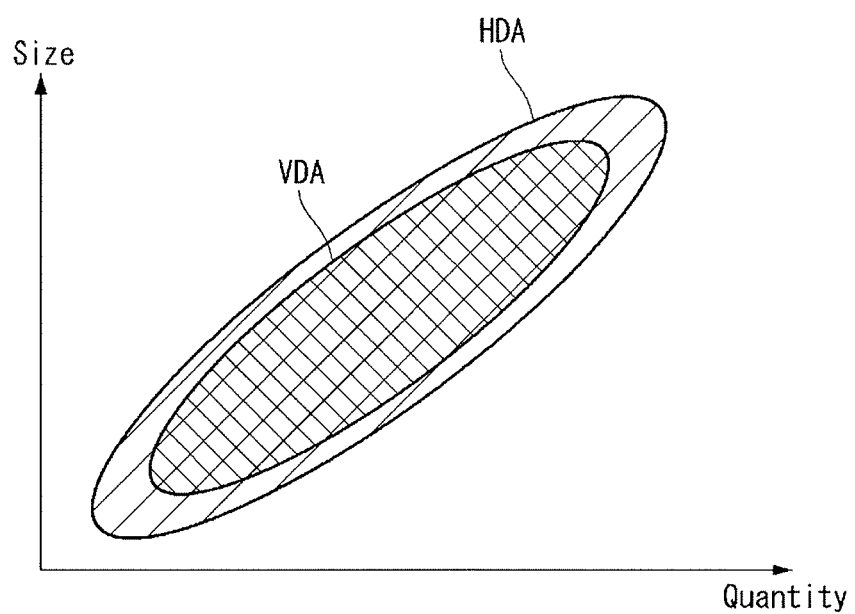

As shown in FIG. 19, dots constituting the horizontal dot area HDA and the vertical dot area VDA may have different attributes. For example, a size range of the dots constituting the horizontal dot area HDA may be greater than a size range of the dots constituting the vertical dot area VDA. Namely, the horizontal dot area HDA may include relatively smaller dots and relatively larger dots than the vertical dot area VDA. In other words, a diversity of the dots constituting the horizontal dot area HDA may be more than a diversity of the dots constituting the vertical dot area VDA. For example, the smallest dot in the horizontal dot area HDA may be smaller than the smallest dot in the vertical dot area VDA, and the largest dot in the horizontal dot area HDA may be larger than the largest dot in the vertical dot area VDA. For example, the smallest dot of the horizontal dot area HDA may have the size equal to or less than 0.5 mm, and the largest dot of the horizontal dot area HDA may have the size equal to or greater than 2 mm. On the other hand, the smallest dot of the vertical dot area VDA may have the size equal to or less than 0.8 mm, and the largest dot of the vertical dot area VDA may have the size equal to or greater than 1.2 mm. For example, when the sizes of the dots included in the horizontal dot area HDA are divided into "A" groups and the sizes of the dots included in the vertical dot area VDA are divided into "B" groups, A is greater than B. In other words, a size diversity of the dots included in the horizontal dot area HDA may be more than a size diversity of the dots included in the vertical dot area VDA.

An amount range of the dots constituting the horizontal dot area HDA may be greater than an amount range of the dots constituting the vertical dot area VDA. For example, when the dots having the same size are used, a number of dots included in the horizontal dot area HDA may be more or less than a number of dots included in the vertical dot area VDA.

Figure 20:
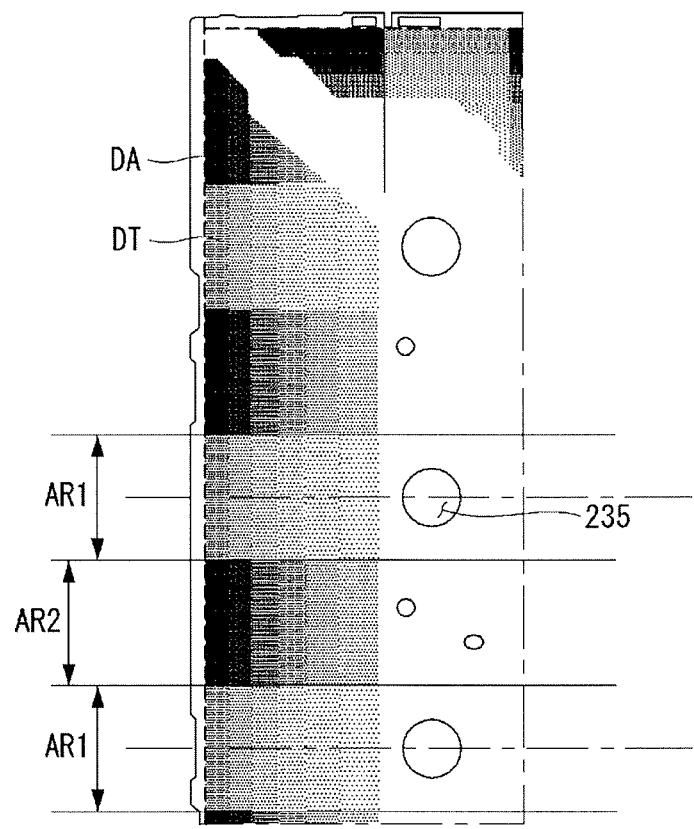

As shown in FIG. 20, the dot area DA may exist on the reflecting sheet 126. For example, the dots may be distributed along the short sides of the display device 100. For example, the dots may be distributed in the second area 126b (refer to FIG. 13) of the reflecting sheet 126. As described above, the dot area DA may include a horizontal dot area HDA and a vertical dot area VDA. A description of one of the horizontal dot area HDA and the vertical dot area VDA is equally applied to the other, except in the instance where the horizontal dot area HDA and the vertical dot area VDA are separately described.

The arrangement of the dots DT in the dot area DA may be related to the arrangement of the lens holes 235. As described above, the lens hole 235 may correspond to the light source 203 (refer to FIG. 10) and the lens 124b (refer to FIG. 10).

The plurality of lens holes 235 may be disposed on the reflecting sheet 126 in accordance with a predetermined rule. Some of the plurality of lens holes 235 may be disposed adjacent to the dot area DA. For example, the lens holes 235 may be separated from the dot area DA by a predetermined distance and may be disposed in parallel with each other.

A first area AR1 and a second area AR2 may be formed based on the lens holes 235. For example, the first area AR1 may be an area including the lens hole 235, and the second area AR2 may be an area between the lens holes 235.

The dots DT disposed in the first area AR1 and the second area AR2 may have different attributes. For example, at least one of a size, a density, and a color of the dot DT in the first area AR1 may be different from at least one of a size, a density, and a color of the dot the second area AR2. The difference is because intensities of light beams reaching the first area AR1 and the second area AR2 may be different from each other depending on a distance between the lens hole 235 and the first area AR1 and the second area AR2.

Figure 21A:
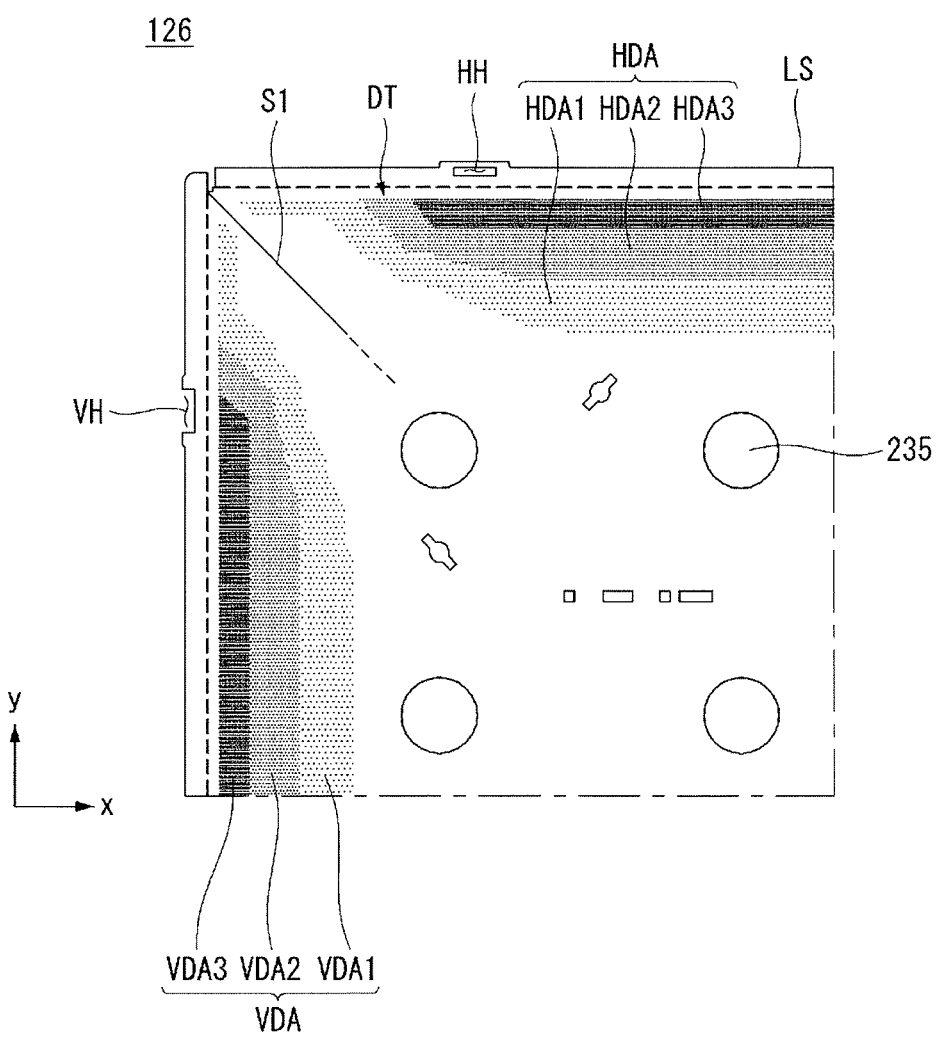

As shown in FIG. 21A, attributes of the dots DT constituting the horizontal dot area HDA and/or the vertical dot area VDA may change depending on the area.

The horizontal dot area HDA may include first to third horizontal dot areas HDA1 to HDA3. Namely, the dot area DA may be divided into a plurality of areas. The first horizontal dot area HDA1 may be an area including both sides of the horizontal dot area HDA and may be a boundary area in an inside direction of the reflecting sheet 126. The second horizontal dot area HDA2 may be an area inside the first horizontal dot area HDA1, and the third horizontal dot area HDA3 may be an area inside the second horizontal dot area HDA2.

The dots DT in the first to third horizontal dot areas HDA1 to HDA3 may have different attributes. Namely, there may be a difference between the dots DT of the first to third horizontal dot areas HDA1 to HDA3 in at least one of a size, a density, and a color of the dot DT. For example, the dots DT included in the first horizontal dot area HDA1 may be the same as one another in at least one of the size, the distance, the density, and the color. However, the dot DT of the first horizontal dot area HDA1 may be different from the dot DT of the second horizontal dot area HDA2 in at least one of the size, the distance, the density, and the color. Considering the above description, each of the first to third horizontal dot areas HDA1 to HDA3 may be regarded as the gathering (or arranging) of the dots DT having the same attribute.

The vertical dot area VDA may include first to third vertical dot areas VDA1 to VDA3. The dots DT constituting the first to third vertical dot areas VDA1 to VDA3 may have different attributes. The above description of the first to third horizontal dot areas HDA1 to HDA3 of the horizontal dot area HDA may be equally applied to the first to third vertical dot areas VDA1 to VDA3 of the vertical dot area VDA.

The horizontal dot area HDA and the vertical dot area VDA may be adjacent to four corner areas of the reflecting sheet 126. For example, the horizontal dot area HDA may be disposed on one side of a cutting portion S1, and the vertical dot area VDA may be disposed on the other side of the cutting portion S1. The first horizontal dot area HDA1 and the first vertical dot area VDA1 may be positioned in an area including the corner area close to the horizontal dot area HDA and the vertical dot area VDA Because the corner area is relatively far away from the lens hole 235, the corner area may be relatively dark. Thus, the dot DT may not be disposed in the middle of the corner area. The dots DT having a relatively high reflectance may be disposed in the first horizontal dot area HDA1 and the first vertical dot area VDA1 close to the corner area. For example, the relatively small dots DT may be disposed. For example, the dots DT having the relatively low density may be disposed.

Figure 21B:
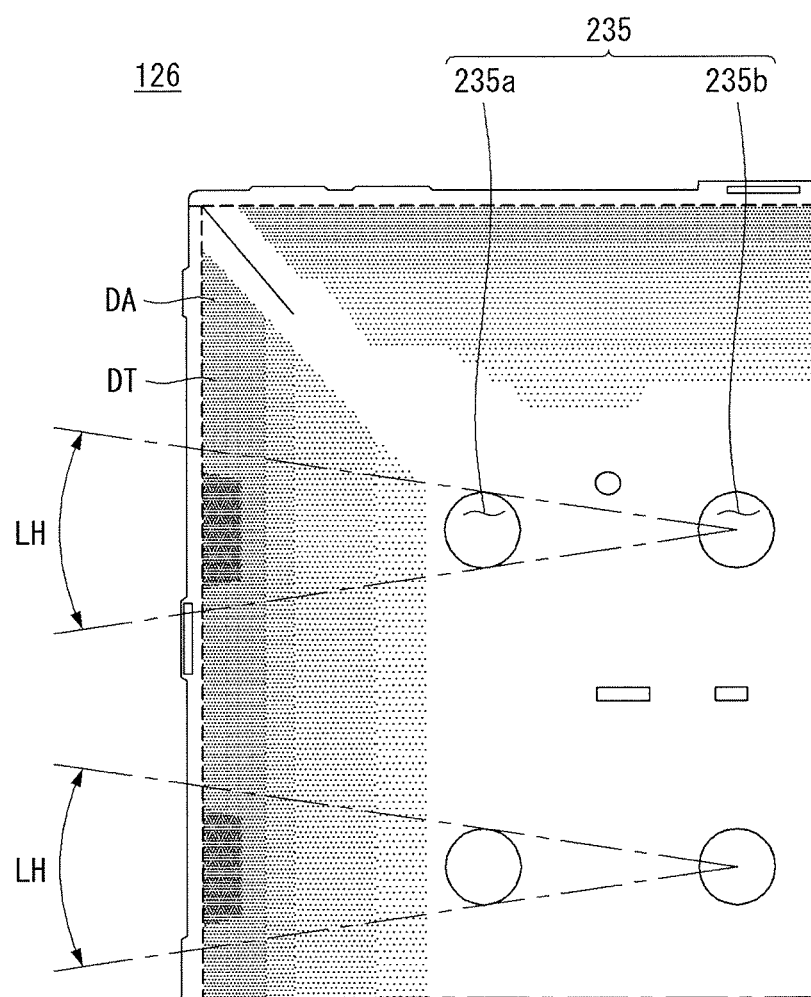

As shown in FIG. 21B, the plurality of lens holes 235 may be divided into a first lens hole group 235a and a second lens hole group 235b depending on a distance between the lens holes 235 and the dot area DA. For example, the first lens hole group 235a may include the lens holes 235 adjacent to the dot area DA, and the second lens hole group 235b may include the lens holes 235 in the rear of the first lens hole group 235a.

A portion of light emitted from the second lens hole group 235b may be shielded by the first lens hole group 235a. For example, a shielding area LH may be formed. The brightness of a corresponding area may be less than the brightness of other area because of the shielding area LH. Thus, the dots DT of the shielding area LH and the dots DT of other area may be differently configured. For example, a size of the dot DT in at least a portion of the shielding area LH may be different from that in the other area.

Figure 22:
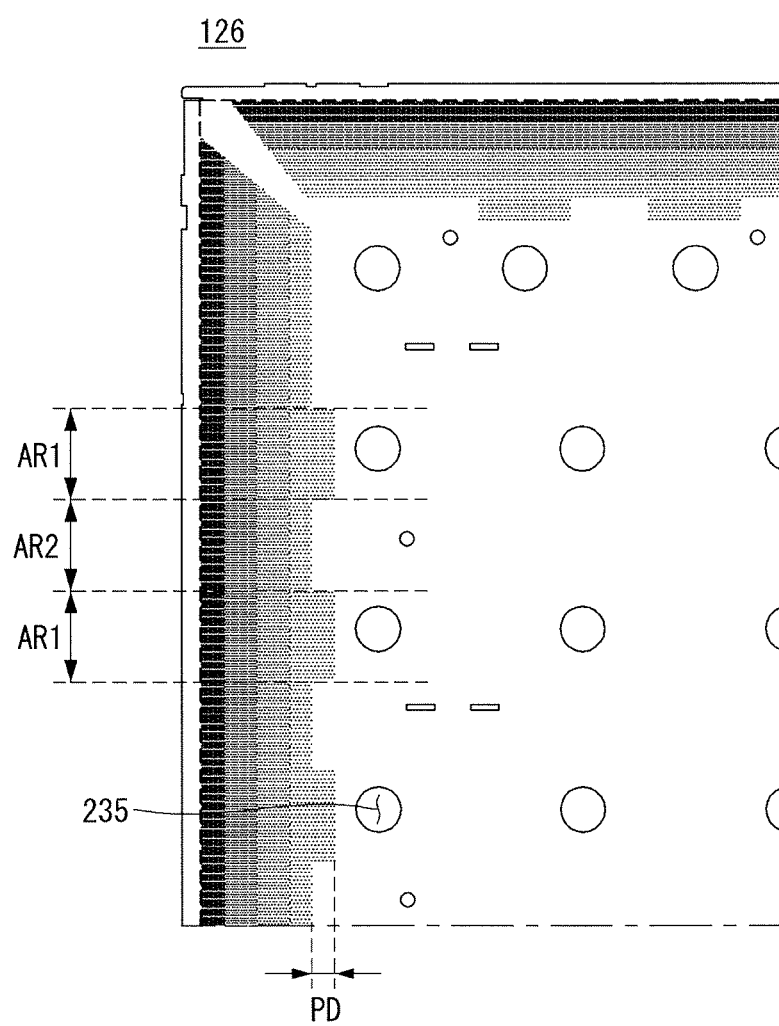

As shown in FIG. 22, a shape of the dot area DA may be changed depending on a location of the lens hole 235. For example, the dot area DA may include a first area AR1 including the lens hole 235 and a second area AR2 except the first area AR1 from the dot area DA. The first area AR1 may protrude to the lens hole 235 further than the second area AR2. For example, a protrusion area PD may be added to the dot area DA. A luminance of an area close to the lens hole 235 may be reduced by the protrusion area PD. The dots DT constituting the protrusion area PD may be different from the dots DT of other area.

Figure 23A:
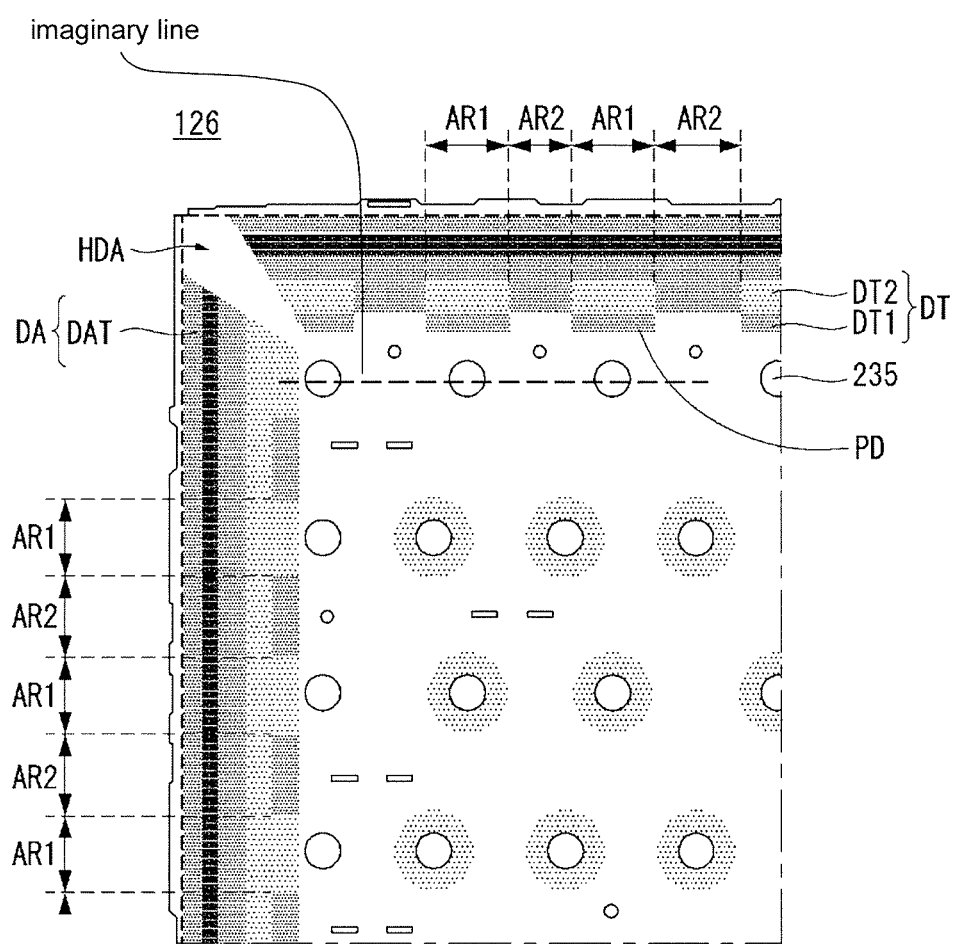

As shown in FIG. 23A, the shape of the dot area DA may be changed depending on a relative location between the dot area DA and the lens hole 235. For example, as described above, the first area AR1 corresponding to the lens hole 235 may include the protrusion area PD protruding to the lens hole 235.

A first dot DT1 constituting the protrusion area PD may be different from a second dot DT2 in the rear of the first dot DT1.

A shape of the horizontal dot area HDA may be different from a shape of the vertical dot area VDA. For example, the protrusion area PD may be included only in one of the horizontal dot area HDA and the vertical dot area VDA. This may be related to the fact that a number of lens holes 235 in the horizontal dot area HDA is more than a number of lens holes 235 in the vertical dot area VDA.

Figure 23B:
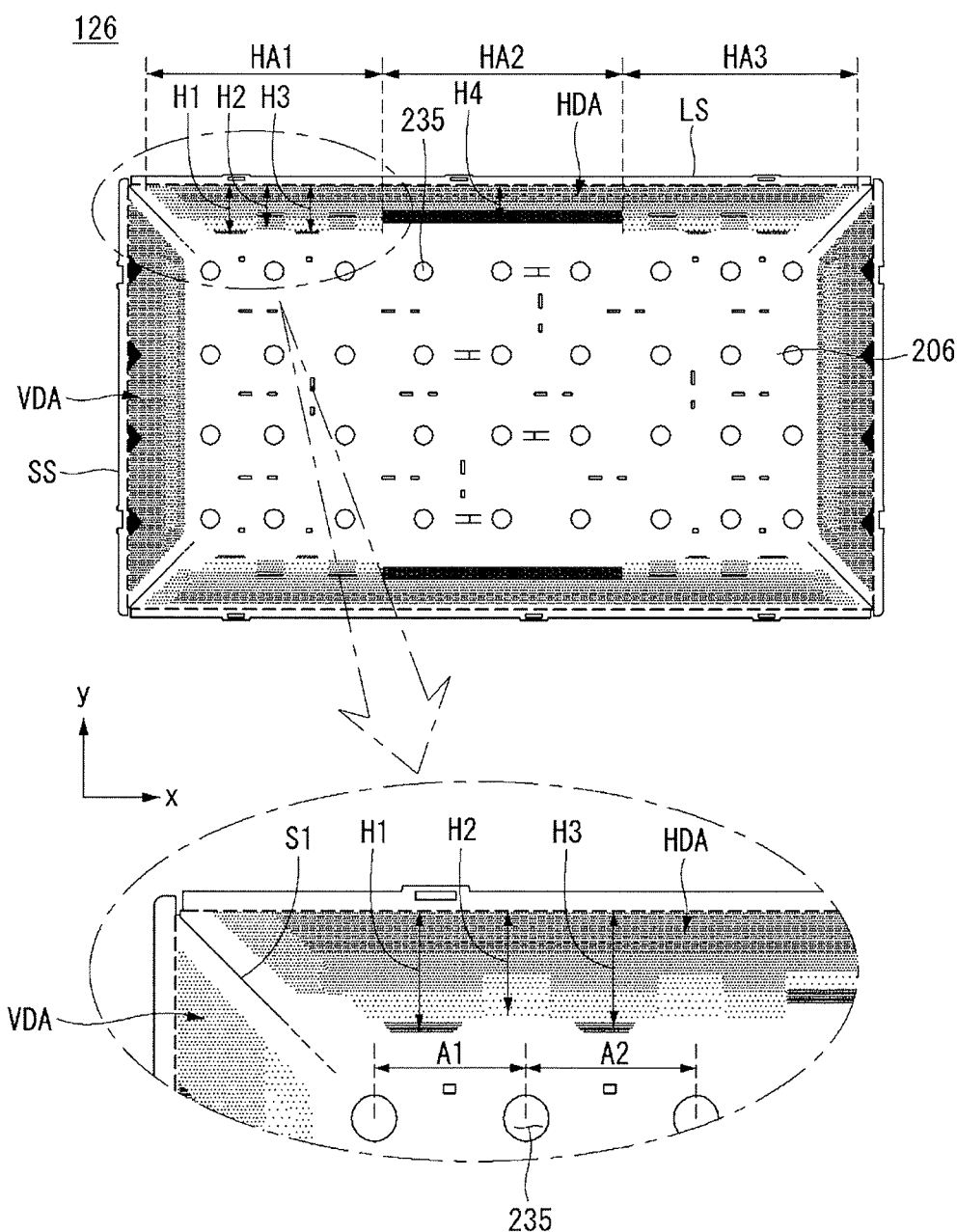

As shown in FIG. 23B, each of the horizontal dot area HDA and the vertical dot area VDA disposed on the reflecting sheet 126 may have a specific shape. For example, a height and/or a width of the horizontal dot area HDA and/or the vertical dot area VDA may be differently set depending on a location.

The horizontal dot area HDA may be divided. For example, the horizontal dot area HDA may be divided into first to third horizontal areas HA1 to HA3. The second horizontal area HA2 may be a center area of the horizontal dot area HDA. The first and third horizontal areas HA1 and HA3 may correspond to both sides of the second horizontal area HA2.

The first and third horizontal areas HA1 and HA3 may have a shape different from the second horizontal area HA2. For example, the first and third horizontal areas HA1 and HA3 may have a shape protruding to the inside of the reflecting sheet 126 further than the second horizontal area HA2. For example, the second horizontal area HA2 may have a fourth height H4. The fourth height H4 may be less than at least one of first to third heights H1 to H3. The shape difference may be because the first and third horizontal areas HA1 and HA3 are closer to the corner of the reflecting sheet 126 than the second horizontal area HA2. Namely, because the reflecting sheet 126 has the rounded shape in the horizontal and vertical directions at the corner of the reflecting sheet 126, the luminance needs to be more precisely controlled.

In the first and third horizontal areas HA1 and HA3, the horizontal dot area HDA may have the shape protruding in a predetermined pattern along the inside direction of the reflecting sheet 126. For example, the horizontal dot area HDA may have the shape protruding by the first height H1 and the second height H2 and then protruding by the third height H3. The first and third heights H1 and H3 may be greater than the second height H2. The first and third heights H1 and H3 may be different from each other. For example, the first heights H1 may be greater than the third height H3. The horizontal dot area HDA of the first height H1 and the horizontal dot area HDA of the third height H3 may be formed between the lens holes 235. For example, the horizontal dot area HDA of the first and third heights H1 and H3 may be formed in first and second areas A1 and A2 between the lens holes 235. Because light beams emitted from the plurality of lens holes 235 overlap each other through the above-described shape of the horizontal dot area HDA, the brightness of the first and second areas A1 and A2 may be efficiently controlled.

FIG. 23B shows that the horizontal dot area HDA has the first to fourth heights H1 to H4, as an example. The vertical dot area VDA having the height/the width different from the horizontal dot area HDA may be configured, so as to achieve the same or similar configuration and effect.

Figure 24:
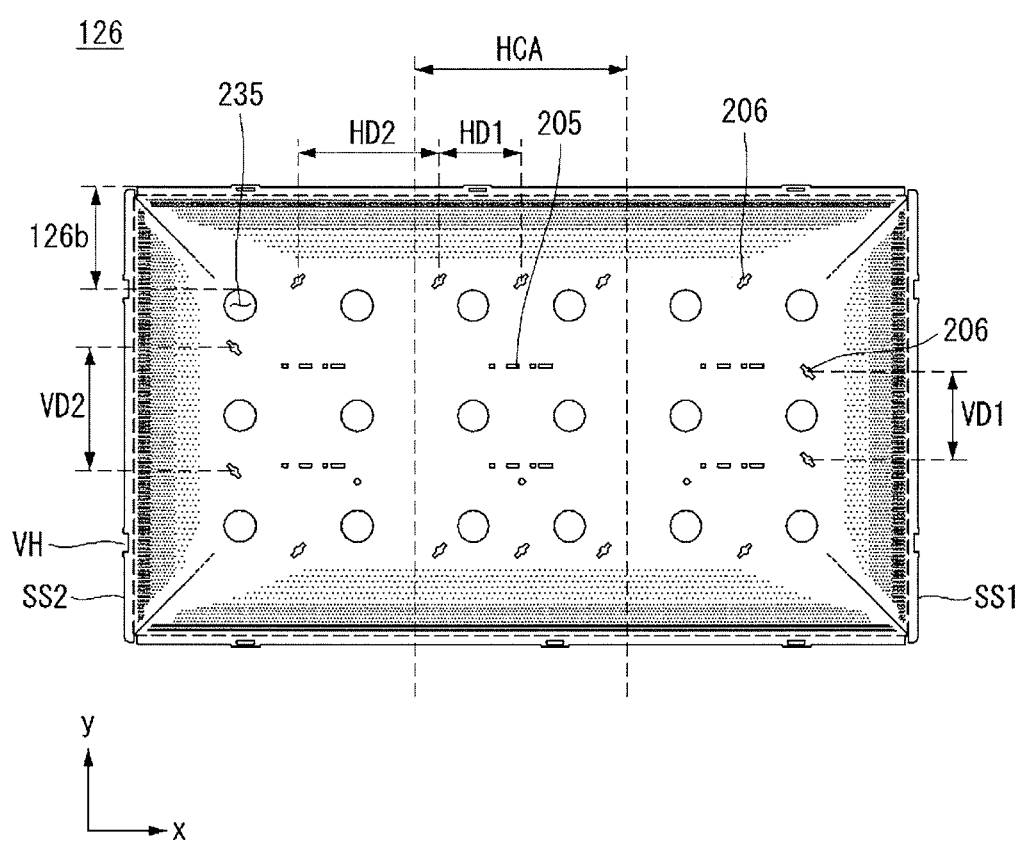
FIGS. 24 and 25 illustrate a reflecting sheet according to an example embodiment of the invention.
Figure 25:
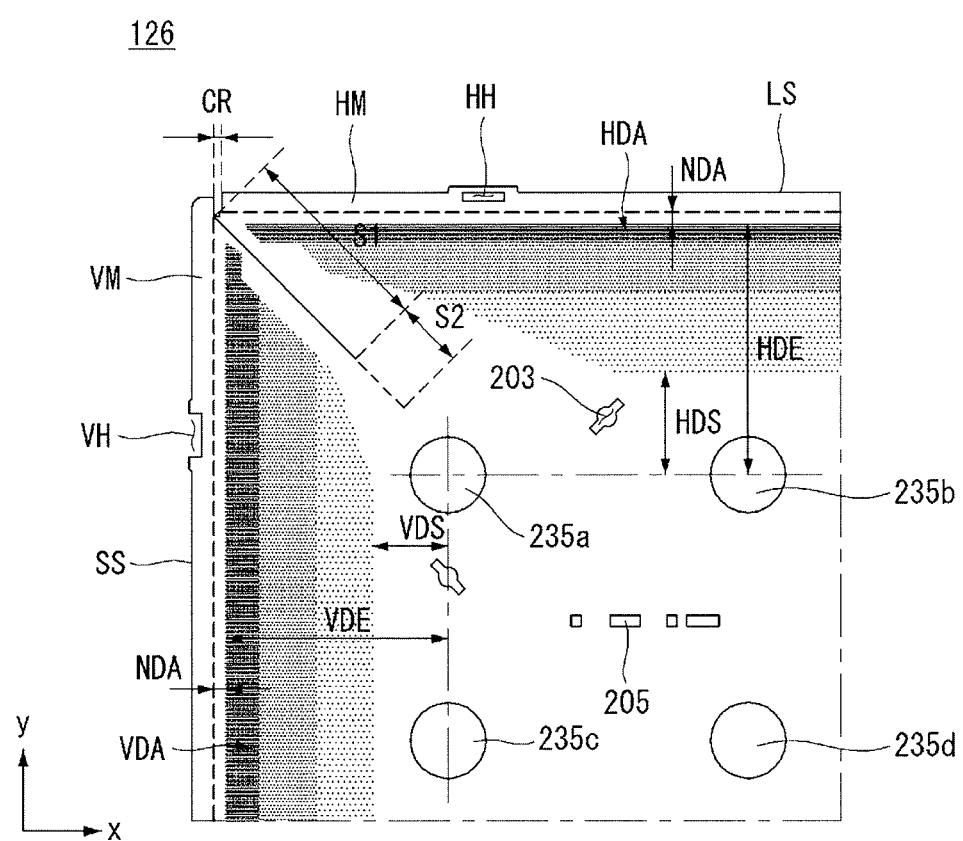

FIGS. 24 and 25 illustrate the reflecting sheet according to the embodiment of the invention.

As shown in FIGS. 24 and 25, the reflecting sheet 126 according to the embodiment of the invention may include the dot area DA.

The dot area DA may be formed along the long side and/or the short side of the reflecting sheet 126. Namely, the dot area DA may be formed in the corner area of the reflecting sheet 126. In other words, the dot area DA may be formed in the second sheet area 126b (refer to FIG. 11) of the reflecting sheet 126 placed in the receiving unit 132 (refer to FIG. 10) of the frame 130 (refer to FIG. 10). The dot area DA may include first and second horizontal dot areas HDA1 and HDA2 and first and second vertical dot areas VDA1 and VDA2. The first and second horizontal dot areas HDA1 and HDA2 are represented as the horizontal dot area HDA, and the first and second vertical dot areas VDA1 and VDA2 are represented as the vertical dot area VDA, except in the instance where they need to be distinguished from each other.

A shape of the horizontal dot area HDA may be different from a shape of the vertical dot area VDA. For example, the shape of the horizontal dot area HDA may not be symmetric to the shape of the vertical dot area VDA based on a cutting portion S1 positioned at the corner of the reflecting sheet 126.

The reflecting sheet 126 may include lens holes 235 for coupling the lenses 124b (refer to FIG. 11), fixing pin holes 206, supporter holes 205, a horizontal coupling unit HH, and a vertical coupling unit VH.

The lens holes 235 may be disposed in parallel with one another along the horizontal and vertical directions based on the size of the display device 100.

The fixing pin hole 206 may be coupled to the fixing pin 202 (refer to FIG. 10) for fixing the reflecting sheet 126 to the frame 130 (refer to FIG. 10). The fixing pin hole 206 may be positioned adjacent to the outermost lens hole 235. For example, the fixing pin hole 206 may be positioned between the adjacent lens holes 235 or between the lens hole 235 and the dot area DA.

The fixing pin hole 206 may be positioned adjacent to the lens hole 235 disposed on the outermost side. For example, the fixing pin hole 206 may be positioned closer to the outermost side than the outermost lens hole 235. For example, the fixing pin hole 206 may be positioned at a location overlapping the outermost lens hole 235.

When the fixing pin 202 (refer to FIG. 10) is coupled to the frame 130 (refer to FIG. 10) through the fixing pin hole 206, the second sheet area 126b may be naturally formed. Namely, when the fixing pin 202 (refer to FIG. 10) is coupled to the frame 130 (refer to FIG. 10) through the fixing pin hole 206 formed in the horizontal and vertical directions, a round chamfer may be formed in the outer area of the reflecting sheet 126.

A distance between the fixing pin holes 206 may be differently set. For example, a number of fixing pin holes 206 positioned in a horizontal center area HCA may be more than a number of fixing pin holes 206 positioned in other areas based on the horizontal direction of the reflecting sheet 126.

A distance between the fixing pin holes 206 positioned in the horizontal center area HCA may be called a first horizontal distance HD1, and a distance between the fixing pin holes 206 positioned in areas other than the horizontal center area HCA may be called a second horizontal distance HD2. The first horizontal distance HD1 may be less than the second horizontal distance HD2. Namely, the fixing pin holes 206 in the horizontal center area HCA may be more densely disposed. Thus, a round chamfer may be naturally formed at the four upper, lower, left, and right corners of the reflecting sheet 126 while the reflecting sheet 126 is efficiently fixed.

The fixing pin holes 206 disposed in the vertical direction may exist. For example, the fixing pin holes 206 may be disposed along the left and right short sides of the reflecting sheet 126.

The fixing pin holes 206 on the first short side SS1 may be disposed at predetermined intervals of a first vertical distance VD1. The fixing pin holes 206 on the second short side SS2 may be disposed at predetermined intervals of a second vertical distance VD2. The first vertical distance VD1 and the second vertical distance VD2 may be different from each other. The second vertical distance VD2 may be greater than the first vertical distance VD1.

A difference between the first vertical distance VD1 and the second vertical distance VD2 may be generated by a shape of the frame 130 coupled to the reflecting sheet 126. For example, the difference between the first vertical distance VD1 and the second vertical distance VD2 may be generated by a coupling space of a rib for assisting rigidity of the frame 130 and/or various electronic parts coupled to the frame 130. The supporter holes 205 may be coupled to the supporters 200. The supporter holes 205 may support the diffusion plate 129 (refer to FIG. 5) and/or the optical sheet 125 (refer to FIG. 5) on the reflecting sheet 126. The supporter holes 205 may be positioned in the middle of the reflecting sheet 126 for the efficient support. Namely, the supporter hole 205 may be positioned further inside than the outermost lens hole 235.

The horizontal coupling unit HH and the vertical coupling unit VH may be disposed along the corner area of the reflecting sheet 126. The horizontal coupling unit HH and the vertical coupling unit VH may be inserted into the protrusions of the frame 130 (refer to FIG. 10).

FIG. 25 shows one edge area of the reflecting sheet 126.

Outermost lens holes 235a to 235c may mean the lens hole 235 positioned on the outermost side. Among the outermost lens holes 235a to 235c, the first and second outermost lens holes 235a and 235b positioned on the upper side may be separated from the lower side of the horizontal dot area HDA by a first distance HDS and may be separated from the upper side of the horizontal dot area HDA by a second distance HDE. Among the outermost lens holes 235a to 235c, the first and third lens holes 235a and 235c positioned on the side may be separated from the lower side of the vertical dot area VDA by a third distance VDS and may be separated from the upper side of the vertical dot area VDA by a fourth distance VDE.

The first distance HDS may be different from the third distance VDS, and the second distance HDE may be different from the fourth distance VDE. This means that a width, a length, etc., of the horizontal dot area HDA may be different from a width, a length, etc., of the vertical dot area VDA.

The first distance HDS may be greater than the third distance VDS. Namely, a distance between the horizontal dot area HDA and the lens hole 235 is greater than a distance between the vertical dot area VDA and the lens hole 235.

The second sheet area 126b (refer to FIG. 11) corresponding to the horizontal dot area HDA may be shorter than the second sheet area 126b (refer to FIG. 11) corresponding to the vertical dot area VDA. Because lengths of the long side and the short side of the second sheet area 126b are different from each other, a slope of the round chamfer of the vertical dot area VDA on the short side may be greater than a slope of the round chamfer of the horizontal dot area HDA on the long side. An increase in the slope may increase a reflectance. When the reflectance increases, a corresponding portion may look brighter. In the reflecting sheet 126 according to the embodiment of the invention, because the vertical dot area VDA is positioned closer to the lens hole 235 than the horizontal dot area HDA, the reflectance may be controlled in spite of the high slope of the vertical dot area VDA on the short side of the reflecting sheet 126.

The non-dot area NDA may be positioned between the horizontal/vertical dot area HDA or VDA and a horizontal/vertical margin area HM or VM. Namely, the non-dot area NDA not including the dot DT may be positioned on the horizontal/vertical dot area HDA or VDA, so that the user watching the display device 100 cannot recognize the dots DT. The non-dot area NDA is formed considering that the dots DT may be recognized from the outside when the dots DT exist in a corresponding area.

The horizontal and vertical margin areas HM and VM may correspond to the third sheet area 126c. Namely, the horizontal and vertical margin areas HM and VM may be an outermost area of the reflecting sheet 126. In other words, the horizontal and vertical margin areas HM and VM may be an area of the reflecting sheet 126 contacting the third frame area 130c of the frame 130 (refer to FIG. 11). The dots DT may not exist in the horizontal/vertical margin area HM or VM.

A gap CR may exist between the horizontal margin area HM and the vertical margin area VM. The reflecting sheet 126 may be a plane. Namely, the reflecting sheet 126 may be a two-dimensional plane. When the reflecting sheet 126 of the two-dimensional shape is coupled to the receiving unit 132 (refer to FIG. 10) of the three-dimensional shape, the reflecting sheet 126 may be changed into the three-dimensional shape. The shape of the reflecting sheet 126 may be changed by overlapping at least a portion of the reflecting sheet 126 along the cutting portion S1. A shadow may be generated by the overlap of the reflecting sheet 126. The gap CR may prevent the overlap of the reflecting sheet 126 and thus suppress the generation of the shadow.

A folded portion S2 may extend from an end of the cutting portion S1. The folded portion S2 may not be cut, unlike the cutting portion S1. The folded portion S2 may be formed by previously folding a corresponding area along the cutting portion S1. Thus, when the reflecting sheet 126 is changed into the three-dimensional shape in the receiving unit 132 (refer to FIG. 10), the reflecting sheet 126 may be guided by the folded portion S2 and may be changed into a previously designed shape.

Figure 26:
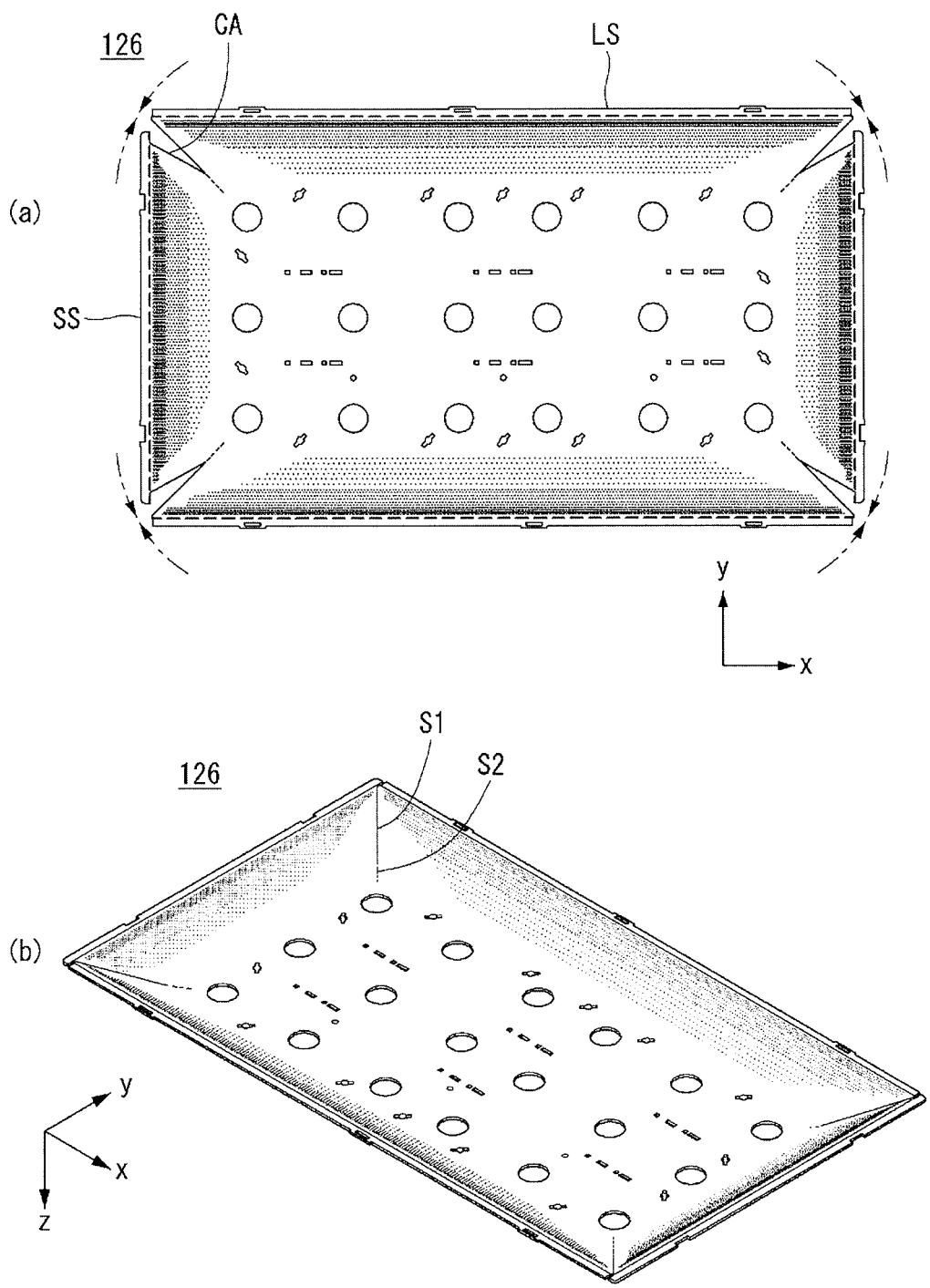
FIGS. 26 to 28 illustrate configuration of a cutting portion of a reflecting sheet according to an example embodiment of the invention.
Figure 27A:
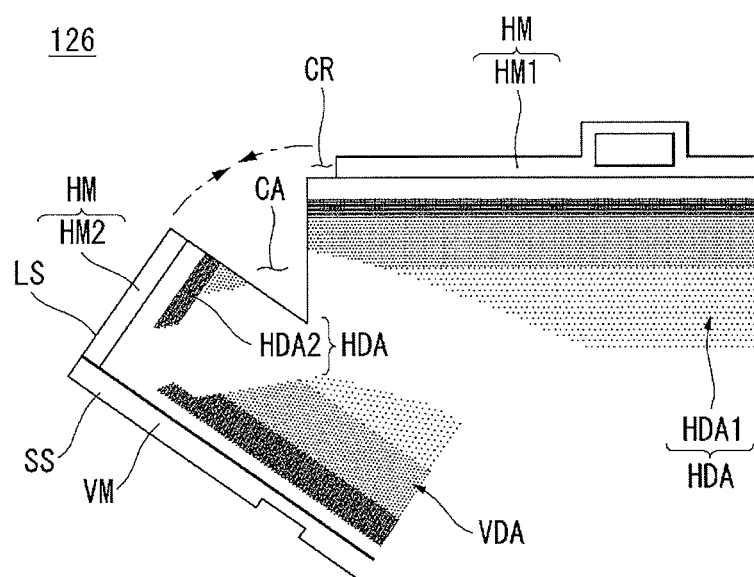
Figure 27B:
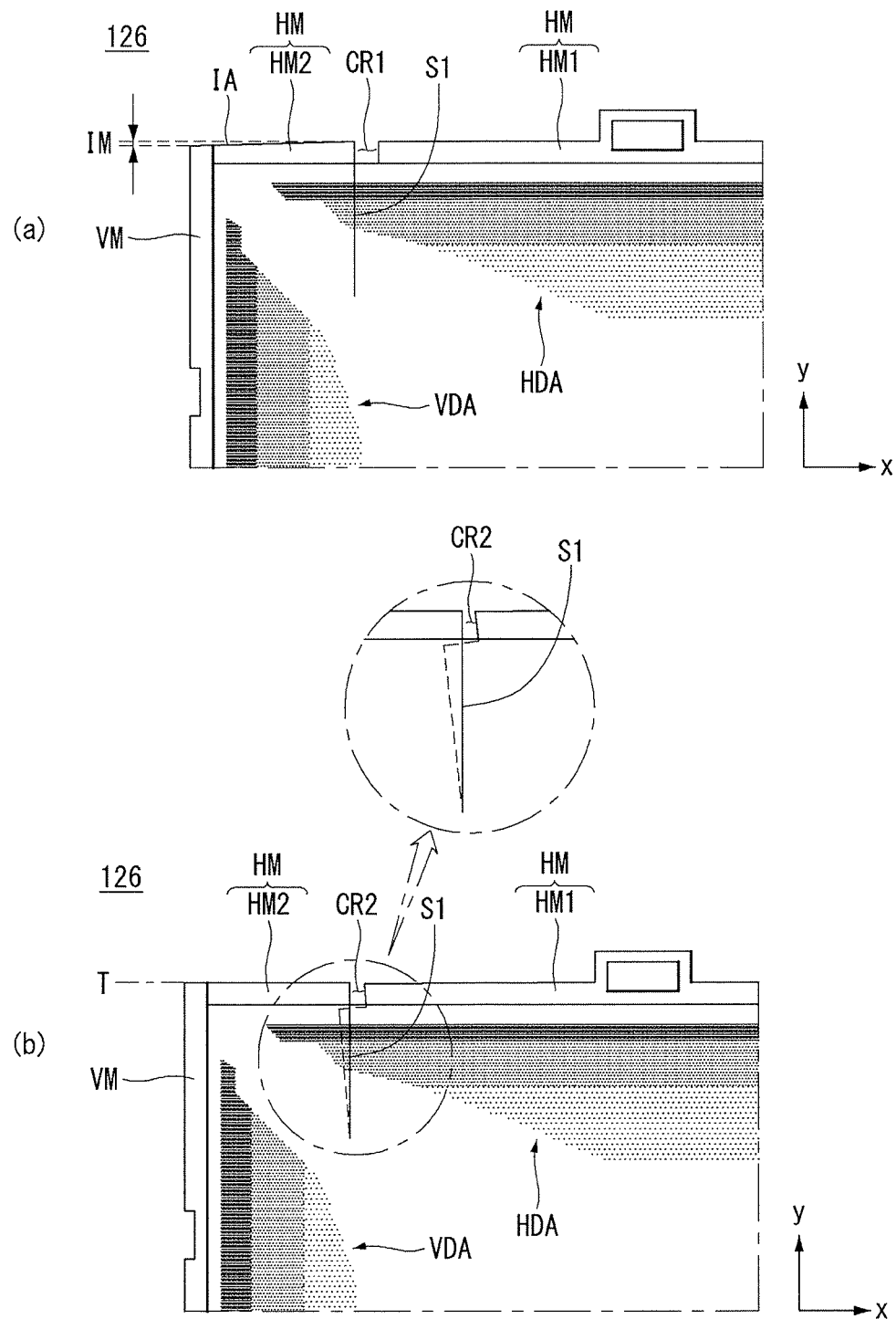
Figure 27C:
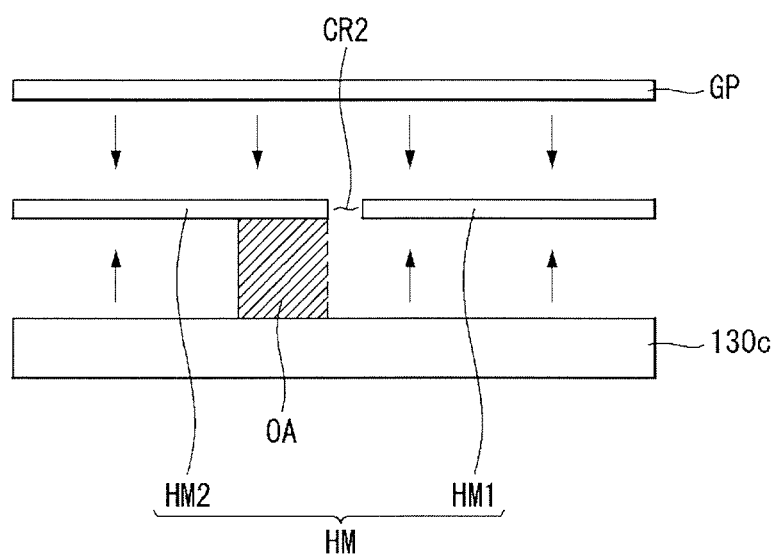
Figure 28:
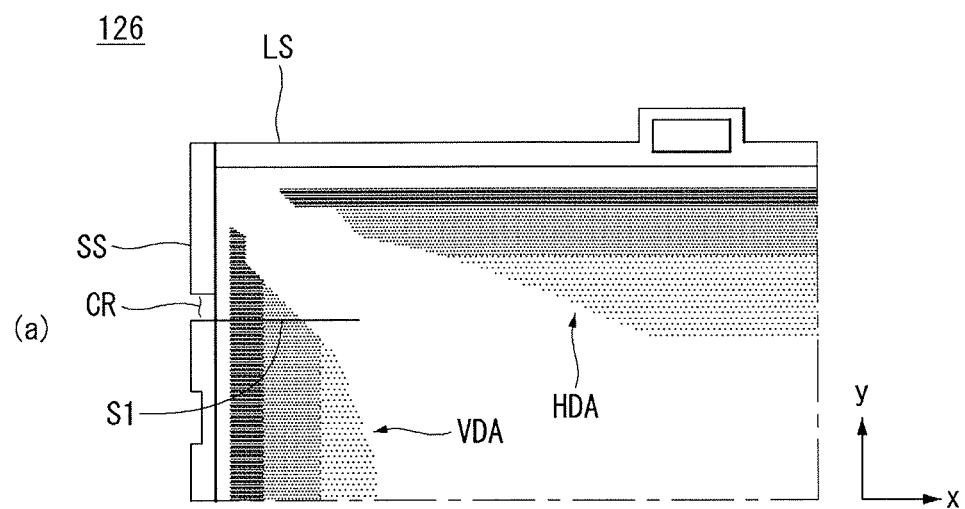
Figure 28:
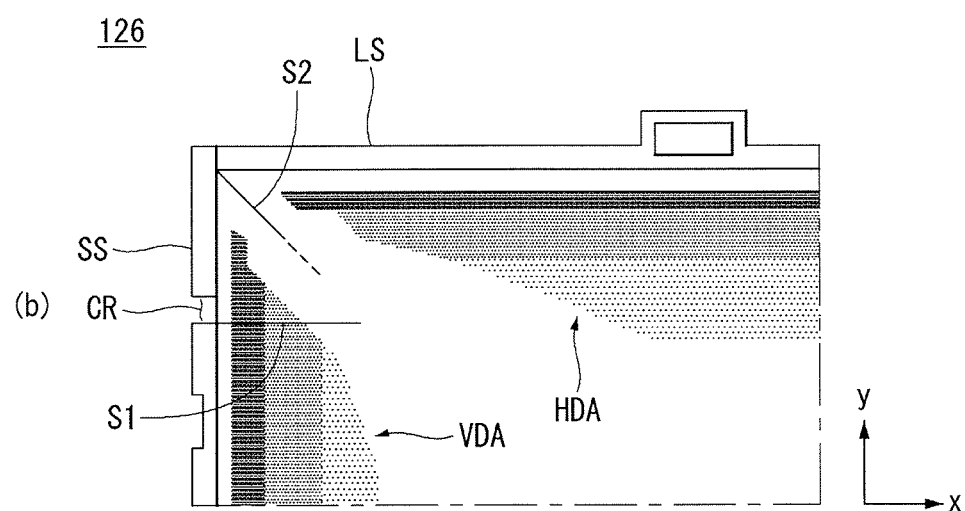

FIGS. 26 to 28 illustrate configuration of the cutting portion of the reflecting sheet according to the embodiment of the invention.

As shown in FIGS. 26 to 28, the reflecting sheet 126 according to the embodiment of the invention may be naturally changed into the three-dimensional shape by the cutting portion S1.

As shown in (a) of FIG. 26, the reflecting sheet 126 may have originally the two-dimensional shape. Namely, the reflecting sheet 126 may be configured as a thin sheet. The thin sheet may be processed into the shape of the reflecting sheet 126. A cutting surface CA may be formed on the reflecting sheet 126.

The cutting surface CA may be a triangular surface. For example, the triangular cutting surface CA may exist at each corner of the reflecting sheet 126. Namely, the cutting surface CA may be positioned between the long side LS and the short side SS of the reflecting sheet 126. The folded portion S2 may be provided in an end portion of the cutting surface CA.

The reflecting sheet 126 having the cutting surface CA may be folded in a direction, in which both sides of the triangular cutting surface CA approach each other. The reflecting sheet 126 may be naturally folded by the folded portion S2.

As shown in (b) of FIG. 26, the cutting portion S1 may be formed as both sides of the triangular cutting surface CA approach each other. The folded portion S2 may be formed at an end of the cutting portion S1. The reflecting sheet 126 may be naturally changed into the three-dimensional shape by the cutting portion S1 and the folded portion S2. The cutting portion S1 may be formed at a vertex of the reflecting sheet 126 in a diagonal direction.

As shown in FIG. 27A, the cutting surface CA may be positioned on the long side LS of the reflecting sheet 126. This is different from the above description, in which the cutting surface CA is positioned between the long side LS and the short side SS of the reflecting sheet 126. The horizontal dot area HDA positioned on the long side LS may be regarded as being divided into a first horizontal dot area HDA1 and a second horizontal dot area HDA2 because of the cutting surface CA on the long side LS.

When the reflecting sheet 126 is placed on the frame 130 (refer to FIG. 10), both sides of the triangular cutting surface CA may naturally approach each other. When both sides of the triangular cutting surface CA approach each other, the reflecting sheet 126 may be naturally changed into the three-dimensional shape. Thus, a separate process for forming the chamfer may not be necessary. In other words, workability may be improved.

The gap CR may be formed so that a first horizontal margin area HM1 and a second horizontal margin area HM2 do not overlap each other. Namely, when both sides of the triangular cutting surface CA approach each other, the first and second horizontal margin areas HM1 and HM2 may not overlap each other by the gap CR even if a portion of the reflecting sheet 126 overlaps. Thus, even when the guide panel GP (refer to FIG. 10) is coupled on the horizontal margin area HM, a floating problem resulting from the overlap of the horizontal margin area HM can be prevented.

When both sides of the triangular cutting surface CA approach each other, the first and second horizontal margin areas HM1 and HM2 may be close to each other within the range where they do not overlap each other. Thus, the gap CR may be observed as being very small in the reflecting sheet 126 placed on the frame 130 (refer to FIG. 10).

As shown in (a) of FIG. 27B, a first gap CR1 may exist in the reflecting sheet 126 of the two-dimensional shape. The reflecting sheet 126 of the two-dimensional shape may indicate the reflecting sheet 126 before being coupled to the frame 130 (refer to FIG. 10). In this instance, the second horizontal margin area HM2 may not be parallel. Namely, a slope area IA may be formed in at least a portion of the second horizontal margin area HM2. The slope area IA may be inclined downwardly by an inclined distance IM.

As shown in (b) of FIG. 27B, when the reflecting sheet 126 is placed on the frame 130 (refer to FIG. 10), a portion of the reflecting sheet 126 may overlap. For example, a portion of the first horizontal margin area HM1 may be overlappingly positioned under the second horizontal margin area HM2 based on the cutting portion S1.

When the reflecting sheet 126 is changed into the three-dimensional shape by overlapping a portion of the reflecting sheet 126, the slope area IA may rotate counterclockwise by the inclined distance IM. Hence, the first and second horizontal margin areas HM1 and HM2 may be positioned on the same line T. A second gap CR2 of the reflecting sheet 126 changed into the three-dimensional shape may be smaller than the first gap CR1 of the reflecting sheet 126 of the two-dimensional shape. The second gap CR2 may be very small and may be similar to a width of the cutting portion S1. Even if portions of the reflecting sheet 126 overlap each other based on the cutting portion S1, the first and second horizontal margin areas HM1 and HM2 may not overlap each other.

The cutting portion S1 may have the shape extending downwardly from the long side LS due to a location of the cutting surface CA. The shape of the cutting portion S1 may be advantageous in causing light to reach the end of the reflecting sheet 126. When the cutting surface CA is changed into the shape of the cutting portion S1, the first and second horizontal margin areas HM1 and HM2 may form one horizontal dot area HDA.

FIG. 27C shows the reflecting sheet 126 placed in the third frame area 130c of the frame 130 (refer to FIG. 10) when viewed from the side. Even if an overlap area OA is generated in a portion of the reflecting sheet 126, the first and second horizontal margin areas HM1 and HM2 may not overlap each other. Thus, even if the guide panel GP is coupled on the first and second horizontal margin areas HM1 and HM2, it may be prevented from an arm portion from being formed due to the overlap of the first and second horizontal margin areas HM1 and HM2.

As shown in (a) of FIG. 28, the cutting portion S1 may start from the short side SS. The gap CR may exist at a starting position of the cutting portion S1.

As shown in (b) of FIG. 28, even when the cutting portion S1 exists on the short side SS and/or the long side LS, the folded portion S2 may be formed. The folded portion S2 may be formed in the diagonal direction, unlike the cutting portion S1. Thus, the folded portion S2 may guide the folding of the reflecting sheet 126.

Figure 29:
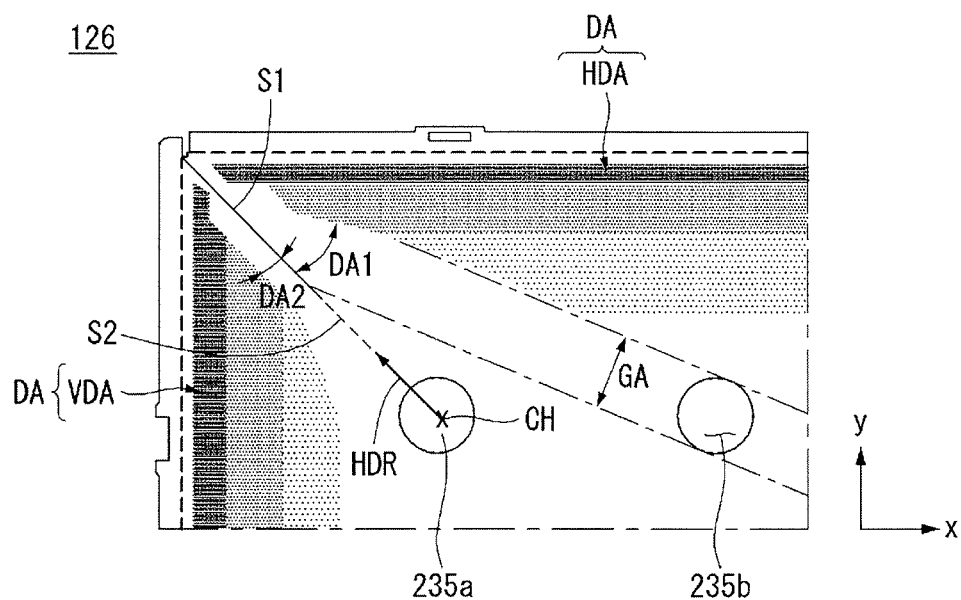
FIGS. 29 and 30 illustrate a dot area according to an example embodiment of the invention.
Figure 29:
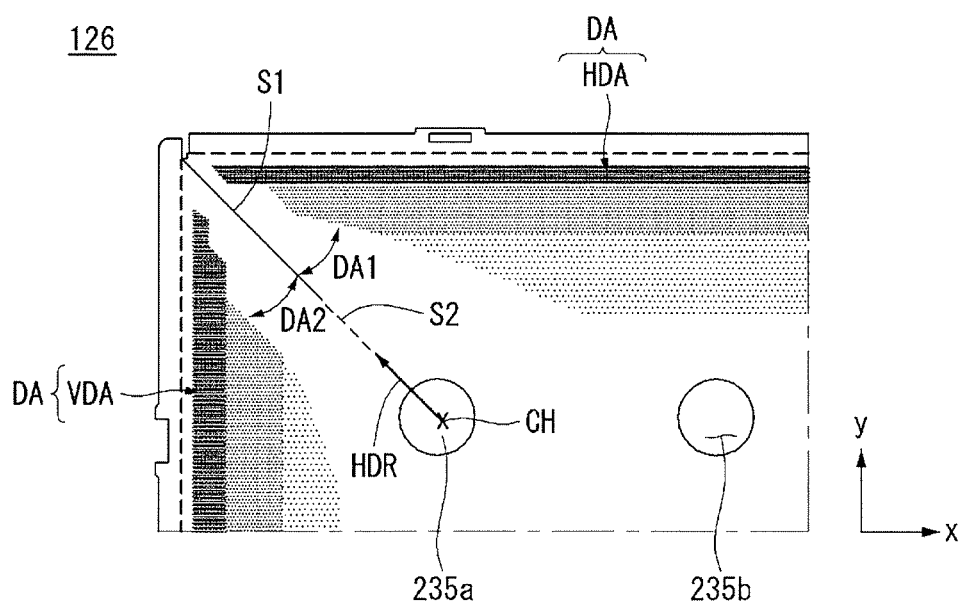
Figure 30:
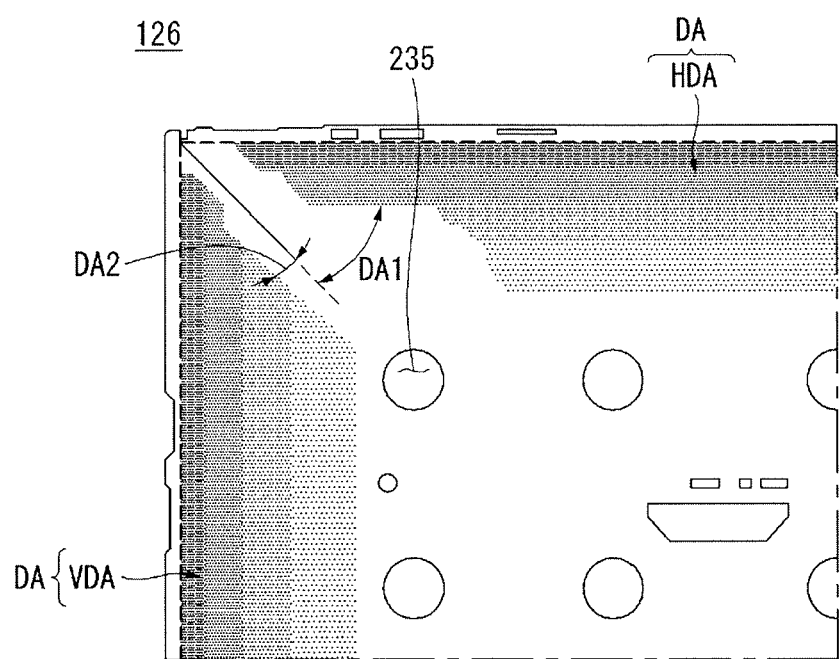

FIGS. 29 and 30 illustrate a dot area according to the embodiment of the invention.

As shown in FIGS. 29 and 30, the dot area DA according to the embodiment of the invention may have various shapes so as to optimally reflect light.

As shown in (a) of FIG. 29, the horizontal dot area HDA and the vertical dot area VDA may have different shapes. For example, the horizontal dot area HDA may be separated from the cutting portion S1 and/or the folded portion S2 by a first angle DA1, and the vertical dot area VDA may be separated from the cutting portion S1 and/or the folded portion S2 by a second angle DA2. The first angle DA1 may be different from the second angle DA2. For example, the first angle DA1 may be greater than the second angle DA2.

A difference between the location and/or the shape of the horizontal dot area HDA and the location and/or the shape of the vertical dot area VDA may be related to an amount of incident light. For example, the lens coupled to the second lens hole 235b may shield light emitted from other lens. Namely, a shade area GA may be formed by the lens coupled to the second lens hole 235b. Thus, the horizontal dot area HDA may be separated from the cutting portion S1 and/or the folded portion S2 by the first angle DA1, so that the horizontal dot area HDA does not overlap the shade area GA. Also, the location and/or the width of the vertical dot area VDA may be determined in consideration of the shade between the lens holes 235.

The cutting portion S1 and/or the folded portion S2 may be a direction toward a center point CH of the first lens hole 235a. Namely, the cutting portion S1 and/or the folded portion S2 may be positioned on an imaginary extension line HDR connecting the center point CH to the cutting portion S1 and/or the folded portion S2 and may be positioned on the line parallel to and/or the same line as the cutting portion S1 and/or the folded portion S2. Thus, light emitted from the lens 124b (refer to FIG. 11) coupled to the first lens hole 235a may be efficiently transferred up to end of the corner area of the reflecting sheet 126.

As shown in (b) of FIG. 29, the first and second angles DA1 and DA2 between the cutting portion S1 and/or the folded portion S2 and the horizontal dot area HDA and the vertical dot area VDA may be the same as each other. For example, when the shade is not generated or slightly generated by the size of the display device 100 and/or the location of the lens hole 235, the first and second angles DA1 and DA2 may be substantially equally configured.

As shown in FIG. 30, the first and second angles DA1 and DA2 may be asymmetric. The shape of the horizontal dot area HDA at the first angle DA1 may be different from the shape of the vertical dot area VDA at the second angle DA2. As described above, the shape of the horizontal dot area HDA and/or the vertical dot area VDA may be determined depending on the generation of the shade based on the disposition of the lens hole 235 and the lens 124b (refer to FIG. 11) coupled to the lens hole 235.

The horizontal dot area HDA and/or the vertical dot area VDA may have a bending shape. For example, a distance between the horizontal dot area HDA and the cutting portion S1 and a distance between the vertical dot area VDA and the cutting portion S1 may be changed.

FIGS. 31 to 38 illustrate configuration related to the lens hole of the reflecting sheet according to the embodiment of the invention.

As shown in FIGS. 31 to 38, the reflecting sheet 126 according to the embodiment of the invention may include the lens hole 235 of various shapes and/or various dispositions capable of controlling a reflection amount of light.

Figure 31:
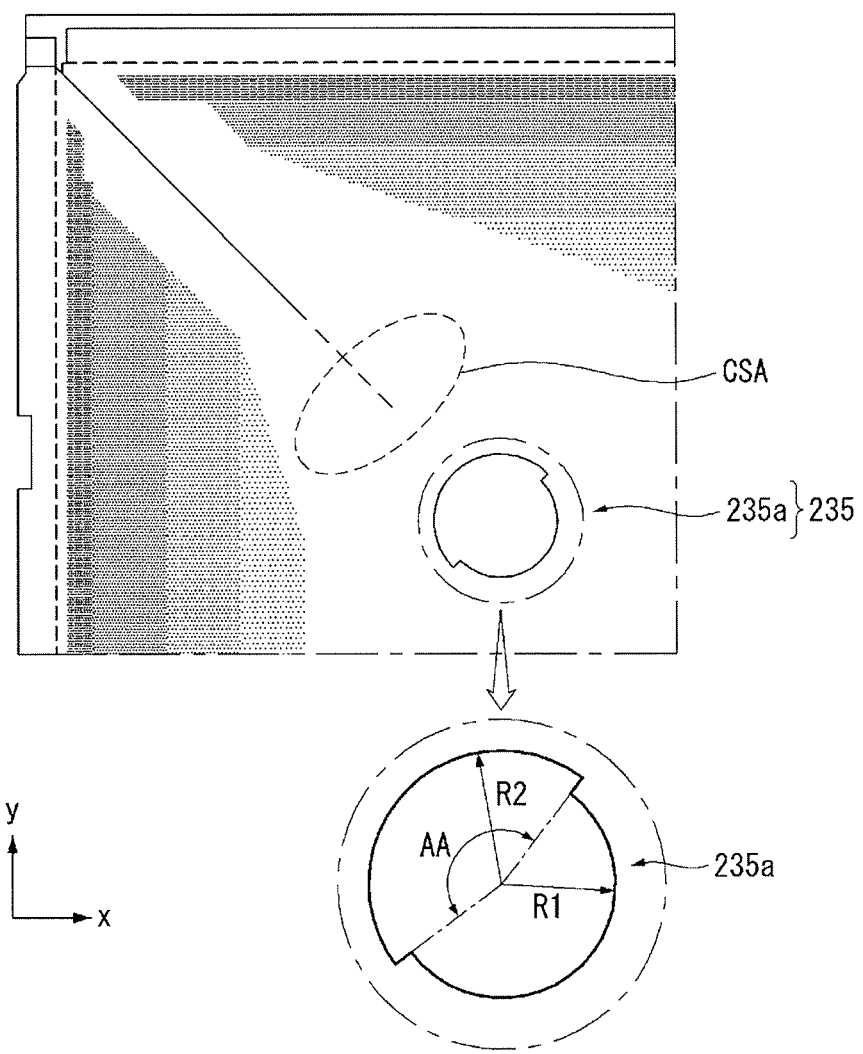
FIGS. 31 to 38 illustrate configuration related to a lens hole of a reflecting sheet according to an example embodiment of the invention.

As shown in FIG. 31, at least one of the lens holes 235 may include a first lens hole 235a.

The first lens hole 235a may not have a circular shape (or a perfectly circular shape). The first lens hole 235a may have a shape, in which a radius is changed. The first lens hole 235a may have a shape, in which a radius is successively changed. For example, the first lens hole 235a of an oval shape may be used. The first lens hole 235a may have a shape, in which a radius is non-successively changed. For example, the first lens hole 235a may have a combination shape of a circle of a first radius R1 and a circle of a second radius R2. The second radius R2 may be an area corresponding to an angle AA. The angle AA may be less than 180 degrees. Namely, the area corresponding to the angle AA may have a fan shape of the second radius R2. In other words, a width of the area corresponding to the angle AA may be less than widths of other areas.

As described above, the second radius R2 may be greater than the first radius R1. Thus, a portion of light emitted through the first lens hole 235a may be emitted from the area corresponding to the angle AA to the rear of the reflecting sheet 126. A total amount of light reflected onto the front of the reflecting sheet 126 by the reflecting sheet 126 may decrease by an amount of light emitted to the rear of the reflecting sheet 126.

An area corresponding to the second radius R2 of the first lens hole 235a may face a chamber area CSA. Namely, the area corresponding to the second radius R2 of the first lens hole 235a may face an outer peripheral of the reflecting sheet 126. In other words, the area corresponding to the second radius R2 of the first lens hole 235a may face the second sheet area 126b (refer to FIG. 13). As described above, because a portion of light is emitted to the rear of the reflecting sheet 126 by the second radius R2, an influence of the first lens hole 235a on the chamber area CSA may be less than an influence of the general lens hole 235. Thus, the chamber area CSA may be prevented from being brighter than other area.

Figure 32:
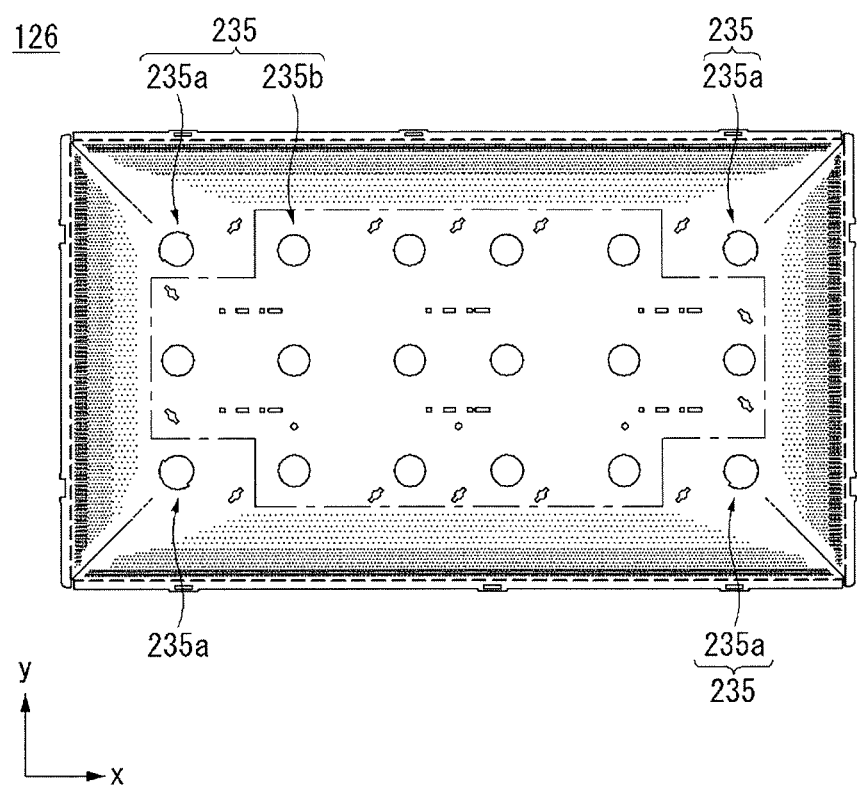

As shown in FIG. 32, the lens hole 235 may include a first lens hole 235a, of which a radius is changed, and a circular second lens hole 235b.

The first lens hole 235a may be positioned on the upper, left, right, and lower sides of the disposed lens holes 235. As described above, the disposition of the first lens hole 235a may prevent the upper, left, right, and lower sides of the lens hole 235 from being brighter than other area.

Figure 33:
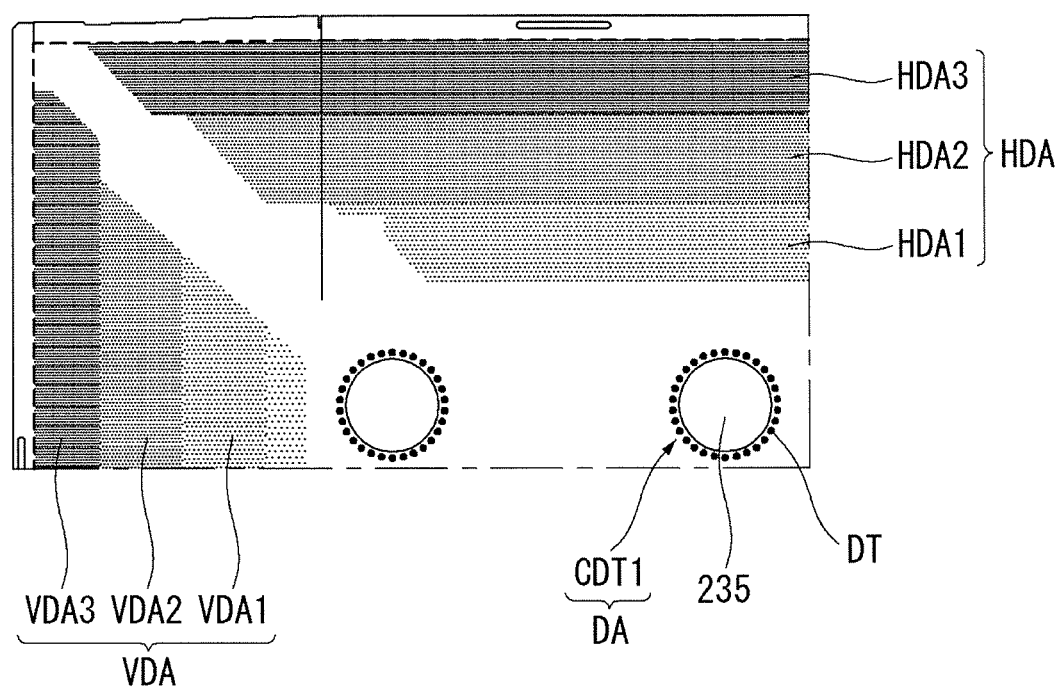

As shown in FIG. 33, the dot area DA may be formed in various shapes. Namely, the dot area DA of the various shapes may be configured so that the reflecting sheet 126 uniformly reflects light. For example, the dot area DA may be formed around the lens hole 235. For example, the dot area DA may be formed in at least a partial area around the lens hole 235. For example, the dot area DA may have the shape surrounding the lens hole 235. Namely, a first circular dot area CDT1 may be formed.

The first ring-shaped dot area CDT1 may have the shape surrounding the lens hole 235. For example, the first ring-shaped dot area CDT1 may have the shape, in which the dots DT of the same size and/or the same shape surround the lens hole 235. For example, the first ring-shaped dot area CDT1 may have the shape, in which the dots DT, of which at least a partial size and/or shape is different, surround the lens hole 235.

A reflectance of a corresponding area may be changed by the first ring-shaped dot area CDT1. For example, a reflectance of a formation area of the first ring-shaped dot area CDT1 may be reduced. Thus, the first ring-shaped dot area CDT1 may be formed around a specific lens hole 235, which needs to reduce the reflectance.

The horizontal dot area HDA and/or the vertical dot area VDA may include a plurality of areas, in which attributes of the dots are different from one another. For example, the horizontal dot area HDA may include first to third horizontal dot areas HDA1 to HDA3, and the vertical dot area VDA may include first to third vertical dot areas VDA1 to VDA3. There may be a difference between the dots of the areas in at least one of a size, an interval, a density, and a color of the dot. For example, the size of the dot in the first horizontal dot area HDA1 may be less than the size of the dot in the second horizontal dot area HDA2, and the size of the dot in the second horizontal dot area HDA2 may be less than the size of the dot in the third horizontal dot area HDA3, or vice versa. The configuration of the first to third horizontal dot areas HDA1 to HDA3 may be equally applied to the first to third vertical dot areas VDA1 to VDA3.

Figure 34:
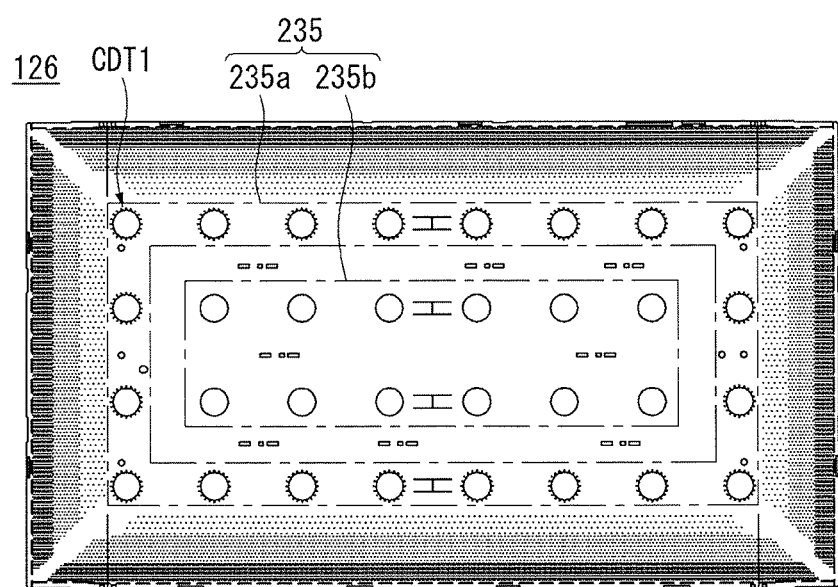

As shown in FIG. 34, the reflecting sheet 126 may include a plurality of lens holes 235. The first ring-shaped dot area CDT1 may be formed in a specific lens hole 235 among the plurality of lens holes 235. For example, the plurality of lens holes 235 may include a first lens hole 235a, in which the first ring-shaped dot area CDT1 is formed, and a second lens hole 235b, in which the first ring-shaped dot area CDT1 is not formed. The first lens hole 235a having the first ring-shaped dot area CDT1 may be the lens hole 235 positioned on the outside among the plurality of lens holes 235a. Namely, the first ring-shaped dot area CDT1 may be formed in the outermost lens hole 235. This may be because the first lens hole 235a positioned on the outside is close to the bending second sheet area 126b (refer to FIG. 13) of the reflecting sheet 126. Namely, the first ring-shaped dot area CDT1 may be formed in the first lens hole 235a, so as to prevent an excessively large amount of light from being reflected from the second sheet area 126b.

Figure 35A:
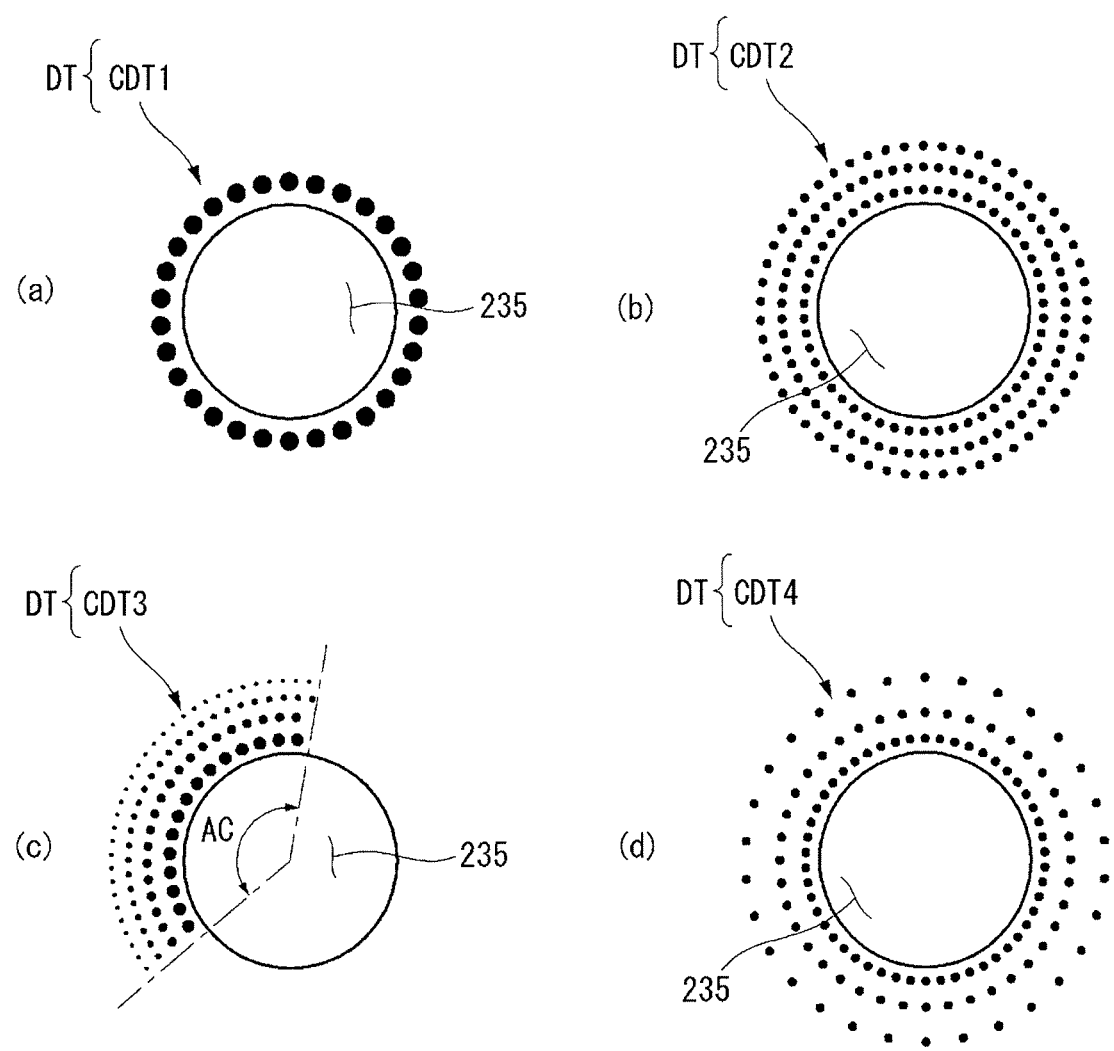

As shown in (a) of FIG. 35A, a first ring-shaped dot area CDT1 may be formed around the lens hole 235. The first ring-shaped dot area CDT1 may be dots DT surrounding the lens hole 235. The first ring-shaped dot area CDT1 may be dots DT surrounding the lens hole 235 one time. The dots DT constituting the first ring-shaped dot area CDT1 may have the same size and/or the same shape. Alternatively, at least a portion of the dots DT constituting the first ring-shaped dot area CDT1 may have different sizes and different shapes. For example, a size of the dot DT positioned in the outside direction of the reflecting sheet 126 may be greater than a size of the dot DT positioned in the inside direction of the reflecting sheet 126.

As shown in (b) of FIG. 35A, a second ring-shaped dot area CDT2 may be formed around the lens hole 235. The second ring-shaped dot area CDT2 may be dots DT surrounding the lens hole 235 several times (several loops or nested). This is a difference between the first ring-shaped dot area CDT1 surrounding the lens hole 235 one time and the second ring-shaped dot area CDT2.

As shown in (c) of FIG. 35A, a third ring-shaped dot area CDT3 may be formed around the lens hole 235. The third ring-shaped dot area CDT3 may be formed around a predetermined portion of the lens hole 235. For example, the third ring-shaped dot area CDT3 may be formed in a portion corresponding to an angle AC in the lens hole 235. The third ring-shaped dot area CDT3 may surround the portion corresponding to the angle AC one time or several times.

As shown in (d) of FIG. 35A, a fourth ring-shaped dot area CDT4 may be formed around the lens hole 235. A density of dots of the fourth ring-shaped dot area CDT4 may vary depending on a location. For example, the dots may have the same size, but a distance between the dots may be changed. For example, a distance between the dots positioned close to the lens hole 235 may be relatively short, and a distance between the dots positioned far away from the lens hole 235 may be relatively long.

Figure 35B:
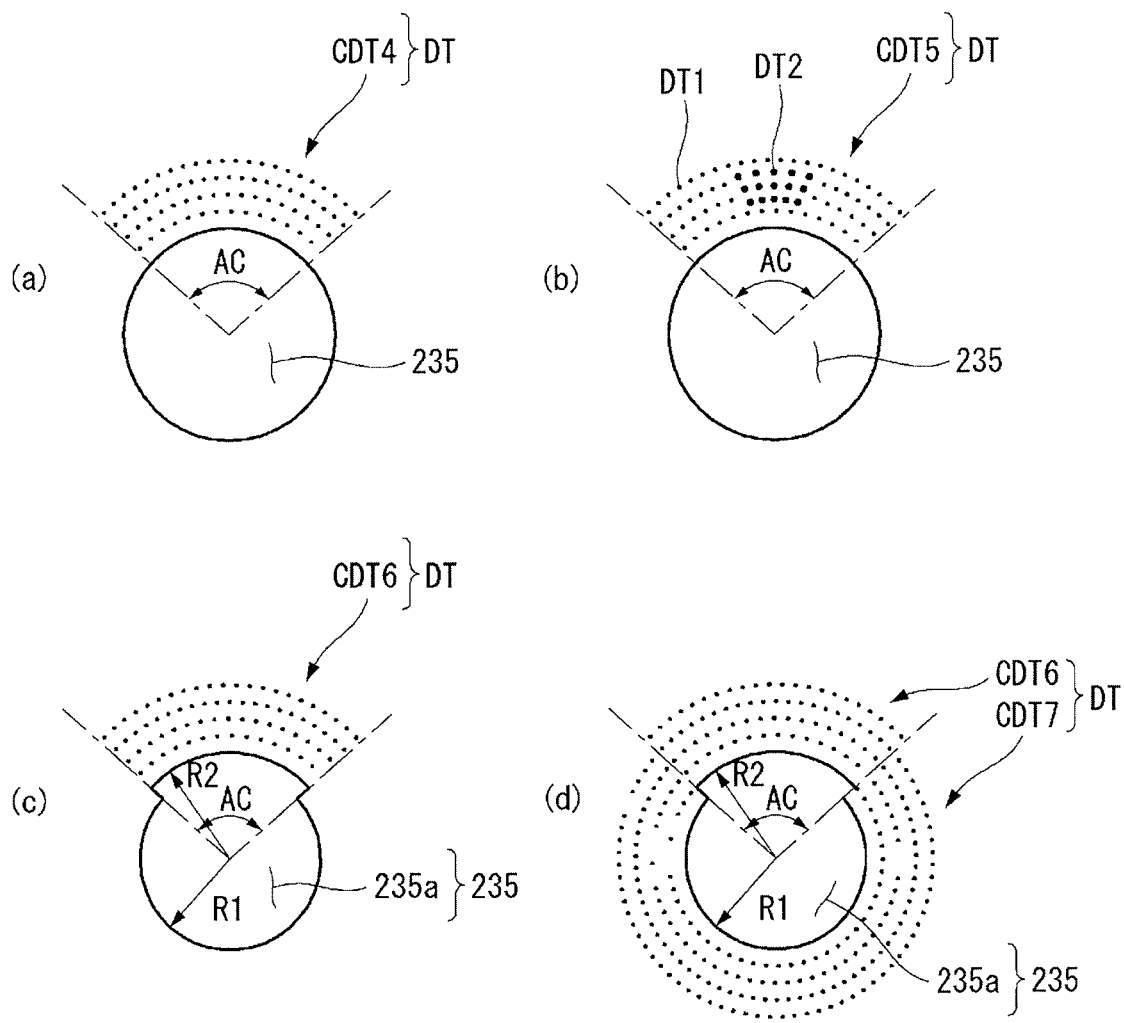

As shown in (a) of FIG. 35B, a fourth ring-shaped dot area CDT4 may be formed around at least a portion of the lens hole 235. The fourth ring-shaped dot area CDT4 may be dots DT positioned in a portion corresponding to an angle AC in the lens hole 235. The fourth ring-shaped dot area CDT4 may be separated from the lens hole 235. Namely, the fourth ring-shaped dot area CDT4 may be formed at a location which is separated from a boundary of the lens hole 235 by a predetermined distance.

As shown in (b) of FIG. 35B, a fifth ring-shaped dot area CDT5 may be formed around at least a portion of the lens hole 235. The fifth ring-shaped dot area CDT5 may include a first dot area DT1 and a second dot area DT2. An attribute of a dot constituting the first dot area DT1 may be different from an attribute of a dot constituting the second dot area DT2. For example, sizes of the dots constituting the first and second dot areas DT1 and DT2 may be different from each other. For example, a size of the dot constituting the second dot area DT2 may be greater than a size of the dot constituting the first dot area DT1. An area corresponding to the second dot area DT2 may be an area which can emit a larger amount of light than the lens positioned in the lens hole 235. Thus, the second dot area DT2 may be formed, so as to further reduce a reflectance of the fifth ring-shaped dot area CDT5 than other areas.

As shown in (c) of FIG. 35B, the lens hole 235 may be a first lens hole 235a, which is not circular. As described above, a radius of at least a portion of the first lens hole 235a may be different from a radius of at least another portion of the first lens hole 235a. The first lens hole 235a may cause a portion of light to be emitted downwardly from the reflecting sheet 126, thereby controlling an amount of the light.

A sixth ring-shaped dot area CDT6 may be formed in an area AC. The area AC may be an area having a relatively large radius in the first lens hole 235a. For example, the sixth ring-shaped dot area CDT6 may be formed in an area having a radius R2. An amount of light emitted and/or reflected in a specific direction may be efficiently controlled by the area having the radius R2 and the sixth ring-shaped dot area CDT6.

As shown in (d) of FIG. 35B, the lens hole 235 may be a first lens hole 235a, which is not circular. A sixth ring-shaped dot area CDT6 and a seventh ring-shaped dot area CDT7 may be formed around the first lens hole 235a. The sixth ring-shaped dot area CDT6 and the seventh ring-shaped dot area CDT7 may surround the first lens hole 235a.

Figure 36:
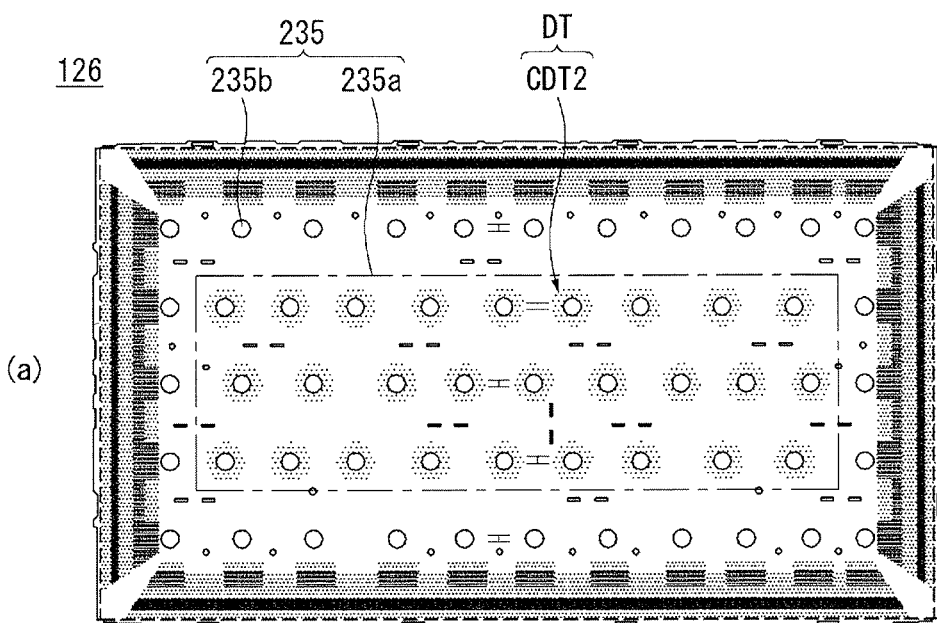
Figure 36:
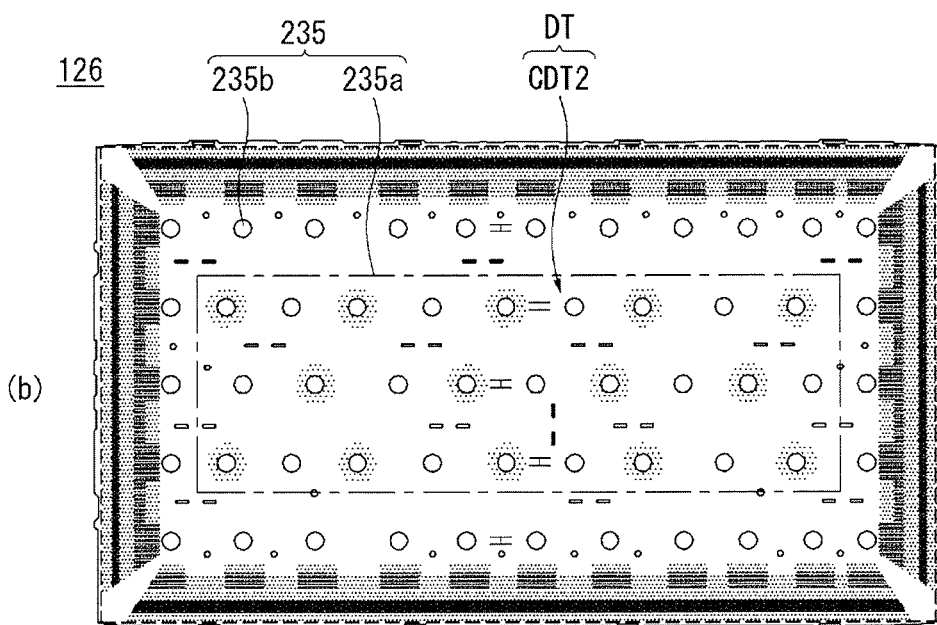

As shown in FIG. 36, the lens hole 235 may include first lens holes 235a and second lens holes 235b.

As shown in (a) of FIG. 36, the first lens hole 235a may be a lens hole 235 having a ring-shaped dot area. A location of the first lens hole 235a having the ring-shaped dot area may be different from a location of the second lens hole 235b not having the ring-shaped dot area. For example, the first lens holes 235a may be positioned in the inner area of the reflecting sheet 126, and the second lens holes 235b may be positioned in the outer area of the reflecting sheet 126. The locations of the first and second lens holes 235a and 235b may be changed.

The lens holes 235 may be arranged in the horizontal direction and/or the vertical direction. The lens holes 235 arranged in the horizontal direction and/or the vertical direction may be disposed in parallel with one another. Such a disposition or arrangement can achieve the common design and the common manufacturing process and can obtain an effect capable of reducing the cost.

The lens holes 235 arranged in the horizontal direction and/or the vertical direction may not be disposed in parallel with one another. For example, the lens holes 235 may be disposed in a zigzag pattern in the vertical direction. Such a disposition or arrangement can obtain an effect reducing a light overlap and/or a light shade between the lens holes 235.

Because the first lens hole 235a is positioned in the inner area of the reflecting sheet 126, a luminance of the first sheet area 126a (refer to FIG. 11) of the reflecting sheet 126 may be more uniformly controlled. This can be clearly understood considering that light emitted from the lens holes 235 is relatively bright around the lens holes 235 and becomes darker as it is far away from the lens holes 235. The first lens hole 235a, in which dots are formed, may control a brightness and/or a reflectance around the lens hole 235 and may homogenize an entire luminance.

As shown in (b) of FIG. 36, the first lens holes 235a may be disposed in accordance with a predetermined rule. For example, the lens hole positioned in one of the left and right directions or one of the plurality of lens holes 235 may be the first lens hole 235a. The first lens holes 235a may be disposed in the zigzag pattern in the vertical direction. Namely, the first lens holes 235a may not be in parallel with one another in the vertical direction. Such a disposition may minimize a reduction in the entire brightness by the first lens hole 235a and may homogenize the luminance.

Figure 37:
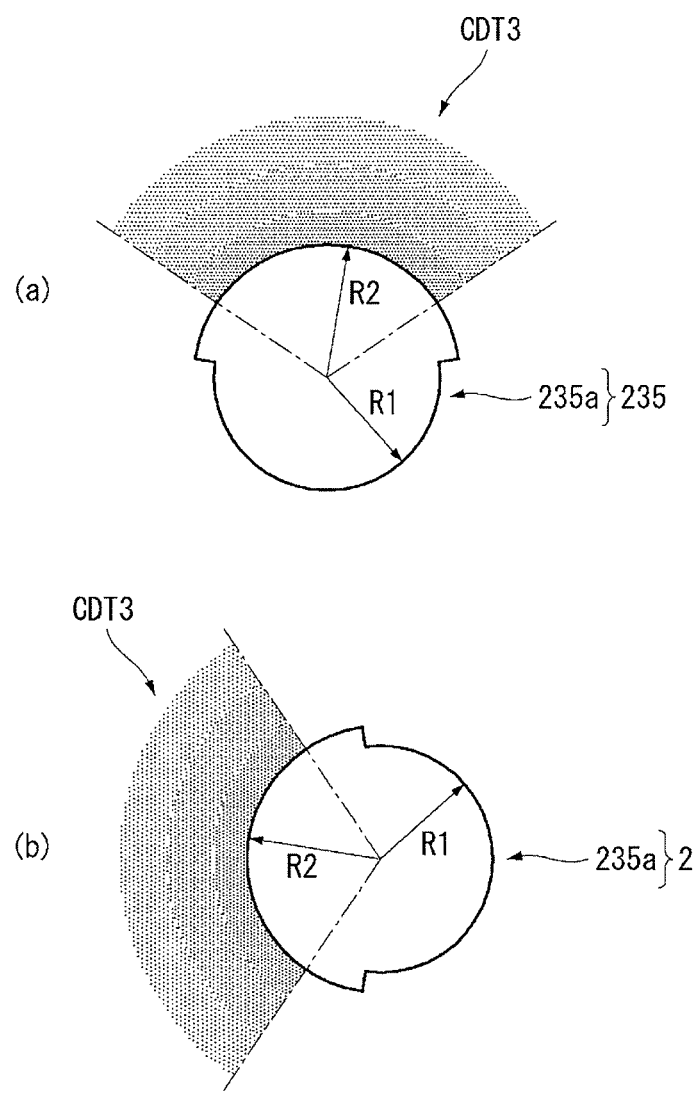

As shown in (a) of FIG. 37, a third ring-shaped dot area CDT3 may be formed in a first lens hole 235 having an overlap shape of circles each having a different radius. For example, the third ring-shaped dot area CDT3 may be formed in a circle having a large second radius R2. For example, the third ring-shaped dot area CDT3 may be formed in at least a portion of the circle having the second radius R2.

As shown in (b) of FIG. 37, when the shape of the first lens hole 235 is changed, a location of the third ring-shaped dot area CDT3 may be changed in accordance with the first lens hole 235.

Figure 38:
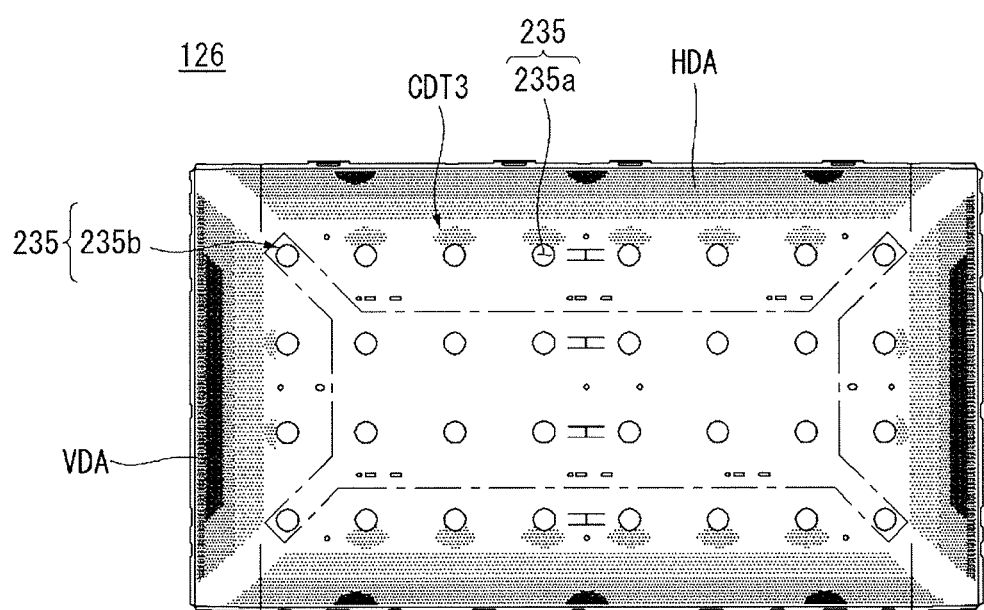

As shown in FIG. 38, the plurality of lens holes 235 may include first lens holes 235a and second lens holes 235b. A third ring-shaped dot area CDT3 may be formed in the first lens hole 235a. A radius of the first lens hole 235a may be changed. The first lens hole 235a may be positioned on the outside of the plurality of lens holes 235. For example, the first lens hole 235a may be a lens hole 235 positioned in an area close to the long side and/or the short side. For example, the first lens hole 235a may be a lens hole 235 positioned adjacent to a horizontal dot area HDA and/or a vertical dot area VDA. Namely, the third ring-shaped dot area CDT3 may be positioned between the first lens hole 235a and the horizontal dot area HDA and/or the vertical dot area VDA. Thus, an excessively large amount of light may be prevented from being reflected from the second sheet area 126b (refer to FIG. 11) of the reflecting sheet 126.

FIGS. 39 to 43 illustrate configuration related to a lens hole reflecting sheet according to the embodiment of the invention.

As shown in FIGS. 39 to 43, the display device 100 according to the embodiment of the invention may further include a lens hole reflecting sheet 126d.

Figure 39:
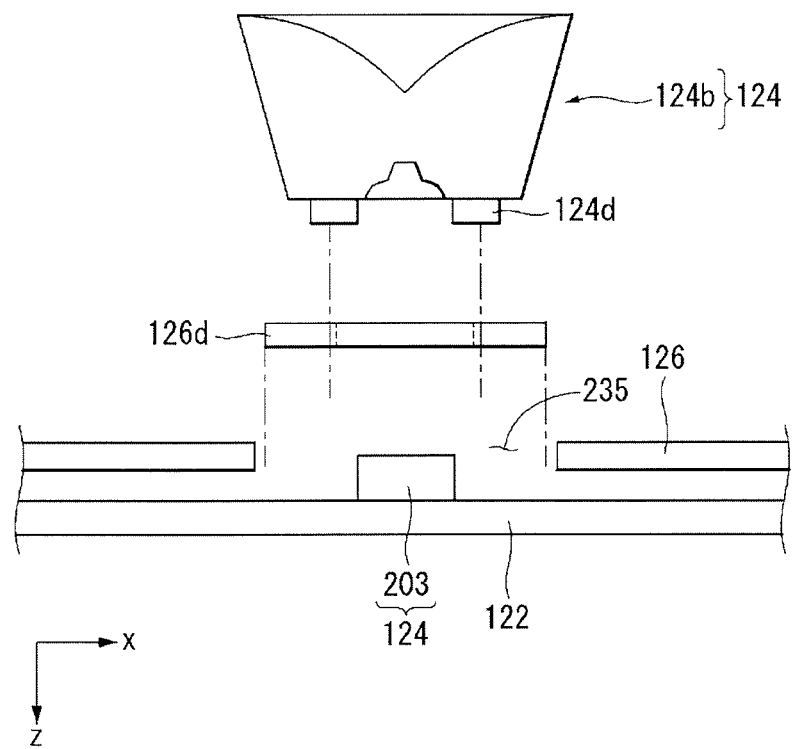
FIGS. 39 to 43 illustrate configuration related to a lens hole reflecting sheet according to an example embodiment of the invention.

As shown in FIG. 39, the lens hole reflecting sheet 126d may be inserted into a lens hole 235 of the reflecting sheet 126. The lens hole reflecting sheet 126d may be positioned between the lens 124b and the light source 203. The lens 124b may be a refractive lens or a reflective lens. The refractive or reflective lens 124b may emit light provided by the light source 203 at various angles. The lens hole reflecting sheet 126d may reflect light emitted downwardly from the lens 124b to the upward side of the lens 124b, thereby increasing light efficiency.

Figure 40:
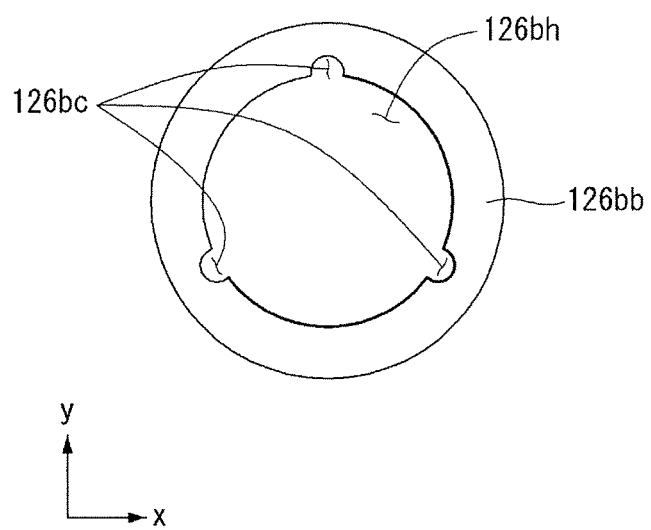

As shown in FIG. 40, the lens hole reflecting sheet 126d may include a hole 126bh and a ring unit 126bb.

The hole 126bh may be positioned in the middle of the lens hole reflecting sheet 126d. The light source 203 may be inserted into the hole 126bh.

The ring unit 126bb may be an outer peripheral area of the hole 126bh. The ring unit 126bb may include at least one lens coupling unit 126bc. For example, at least one lens leg 124d formed on the lower side of the lens 124b (refer to FIG. 39) may pass through the lens coupling unit 126bc.

Figure 41:
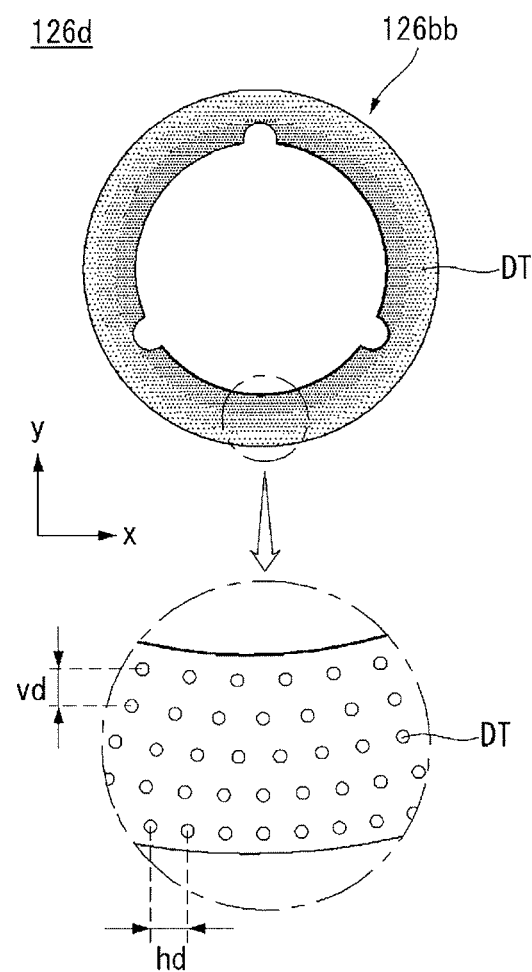

As shown in FIG. 41, dots DT may be formed in at least a portion of the ring unit 126bb. The dots DT may be separated from one another by a vertical distance vd and/or a horizontal distance hd. The vertical distance vd and/or the horizontal may be uniform. For example, the dots DT may be formed on the ring unit 126bb at regular intervals. The vertical distance vd and/or the horizontal may not be uniform. For example, the dots DT may be non-uniformly distributed on the ring unit 126bb.

Figure 42:
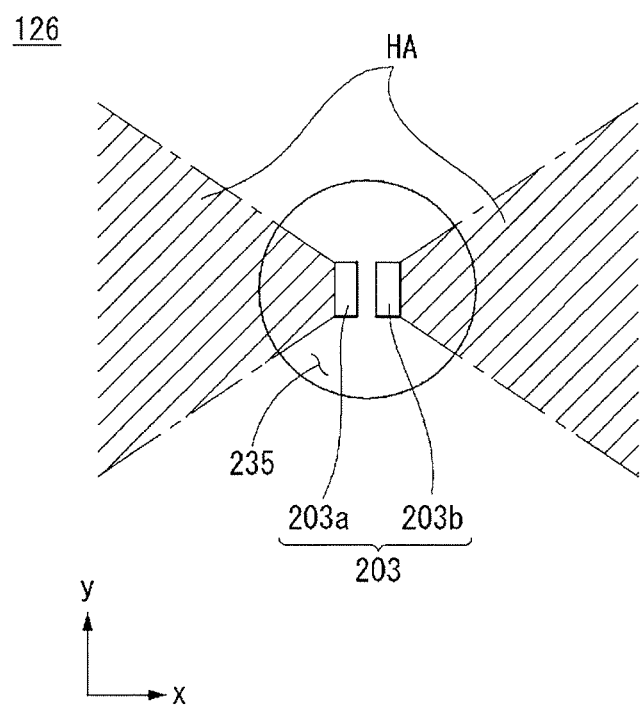

FIG. 42 shows that the lens 124b (refer to FIG. 39) and the lens hole reflecting sheet 126d (refer to FIG. 39) are not coupled. As shown in FIG. 42, one light source 203 may be configured as a plurality of LEDS. Namely, a plurality of LED chips may be used in one light package, and thus an intensity of light with respect to one light package may increase. The light source 203 may include first and second light sources 203a and 203b.

The first and second light sources 203a and 203b may be positioned adjacent to each other. For example, the rectangular first and second light sources 203a and 203b may be positioned in parallel with each other. The first and second light sources 203a and 203b may emit light having a predetermined directivity. For example, each of the first and second light sources 203a and 203b may mainly emit light in a radial direction HA of the outside direction.

Figure 43:
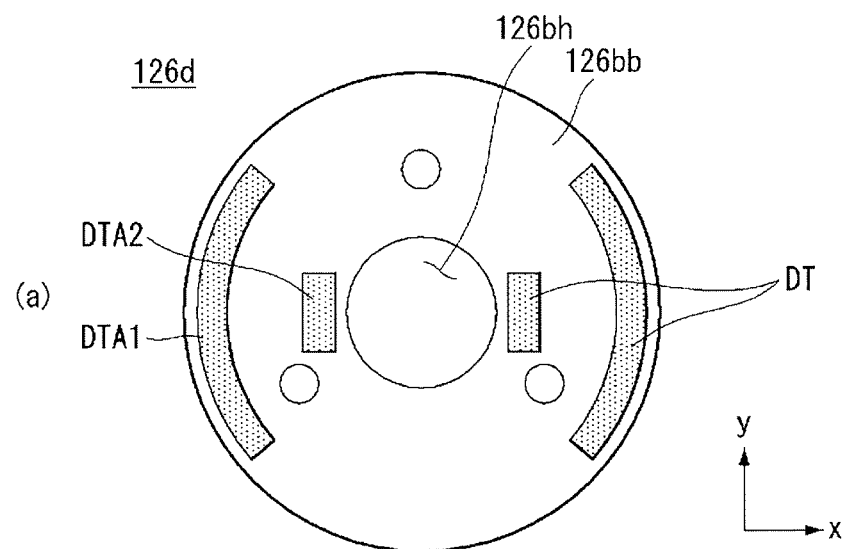
Figure 43:
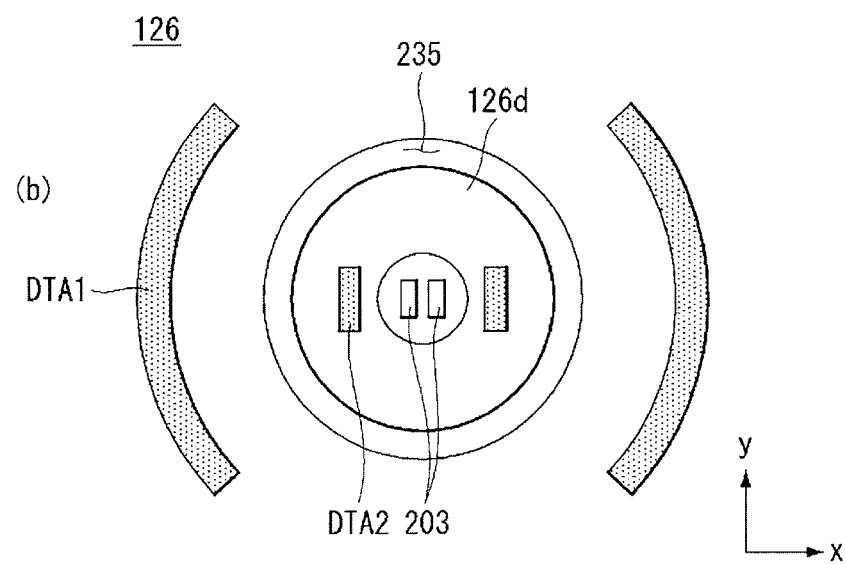

As shown in (a) of FIG. 43, dots DT may be formed in a predetermined area of the lens hole reflecting sheet 126d. The dots DT may have a configuration corresponding to radial characteristics of the first and second light sources 203a and 203b (refer to FIG. 42). For example, first and second dot areas DTA1 and DTA2 corresponding to the radial direction HA (refer to FIG. 42) may be formed.

The first and second dot areas DTA1 and DTA2 may be dots positioned on a path of the radial direction HA (refer to FIG. 42). For example, the first and second dot areas DTA1 and DTA2 may be formed at a predetermined width. The first and second dot areas DTA1 and DTA2 may be separated from each other. The second dot area DTA2 may be positioned further inside than the first dot area DTA1. A size of the first dot area DTA1 may be greater than a size of the second dot area DTA2 considering that light emitted from the first and second light sources 203a and 203b (refer to FIG. 42) is radiated in a fan shape. Only one of the first and second dot areas DTA1 and DTA2 may be formed, if necessary or desired.

As shown in (b) of FIG. 43, at least one of the first and second dot areas DTA1 and DTA2 may be formed in the reflecting sheet 126. For example, the first dot area DTA1 may be formed in the reflecting sheet 126, and the second dot area DTA2 may be formed in the lens hole reflecting sheet 126d. The first dot area DTA1 formed in the reflecting sheet 126 may be advantageous to control a reflection amount of light than when the first dot area DTA1 is formed in the lens hole reflecting sheet 126d having the relatively small area.

Figure 44:
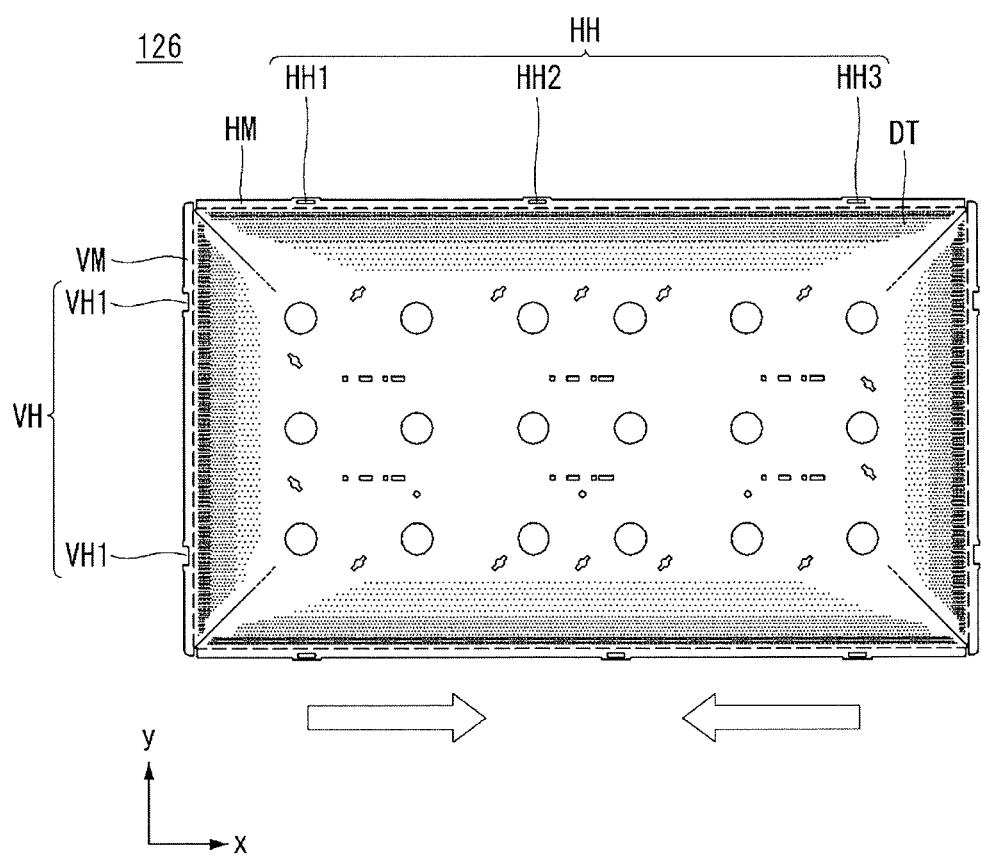
FIGS. 44 and 45 illustrate configuration related to horizontal and vertical coupling units of a reflecting sheet according to an example embodiment of the invention.
Figure 45:
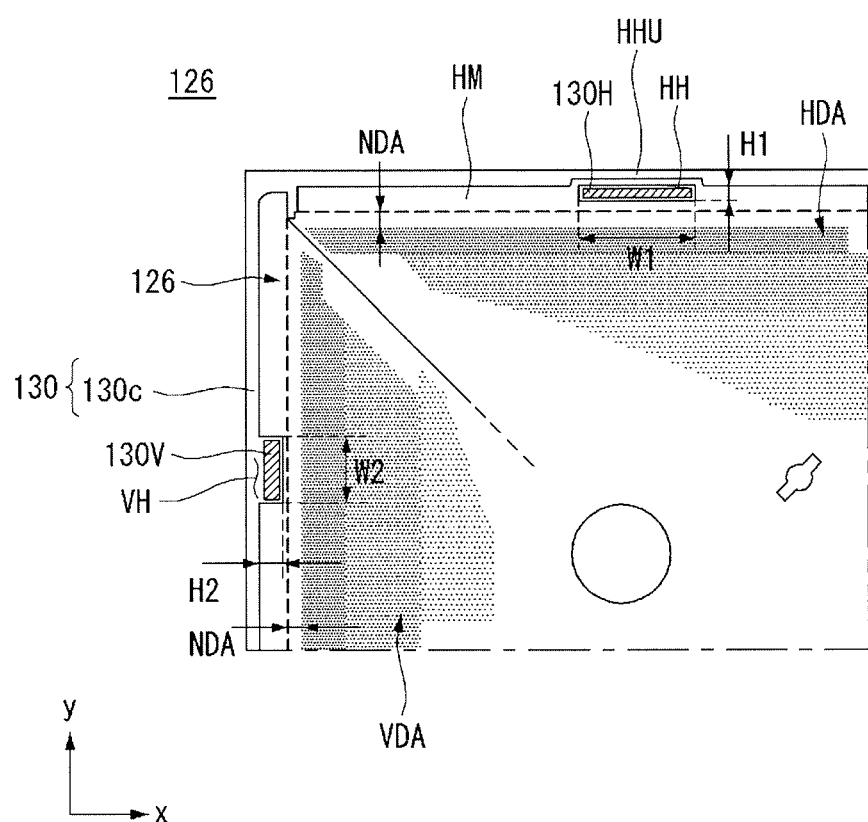

FIGS. 44 and 45 illustrate configuration related to horizontal and vertical coupling units of the reflecting sheet according to the embodiment of the invention.

As shown in FIGS. 44 and 45, the reflecting sheet 126 of the display device 100 according to the embodiment of the invention may include a horizontal coupling unit HH and a vertical coupling unit VH.

As shown in FIG. 44, the horizontal coupling unit HH and/or the vertical coupling unit VH may be formed in a corner area of the reflecting sheet 126. The horizontal coupling unit HH and/or the vertical coupling unit VH may be formed in a horizontal margin area HM and/or a vertical margin area VM of the reflecting sheet 126. The dots DT may not be formed in the horizontal margin area/or the vertical margin area VM.

The reflecting sheet 126 may be coupled to the frame 130 (refer to FIG. 10). For example, the reflecting sheet 126 may be coupled to the frame 130 in such a manner that the horizontal coupling unit HH and/or the vertical coupling unit VH are inserted into a structure of the frame 130.

The reflecting sheet 126 may be modified. For example, the reflecting sheet 126 may contract or expand because of heat generated by an operation of the display device 100.

The reflecting sheet 126 may be modified in the horizontal direction and/or the vertical direction. A modification amount of the reflecting sheet 126 in the horizontal direction may be greater than a modification amount of the reflecting sheet 126 in the vertical direction. Namely, because the horizontal direction corresponds to the long side and the vertical direction corresponds to the short side, a total modification amount in the horizontal direction may be greater than a total modification amount in the vertical direction although a modification amount per unit distance in the horizontal direction and the vertical direction is similar.

The horizontal coupling unit HH and/or the vertical coupling unit VH may be configured in consideration of the coupling and/or the modification of the reflecting sheet 126. For example, the plurality of horizontal coupling units HH and/or the plurality of vertical coupling units VH may be formed for the coupling of the reflecting sheet 126. For example, first to third horizontal coupling units HH1 to HH3 may be separated from one another by a predetermined distance and may be formed in the horizontal margin area HM. First and second vertical coupling units VH1 and VH2 may be separated from one another by a predetermined distance and may be formed in the vertical margin area VM.

As shown in FIG. 45, the horizontal coupling unit HH and/or the vertical coupling unit VH may have a shape in consideration of the modification of the reflecting sheet 126.

The horizontal coupling unit HH may be inserted into a horizontal protrusion 130H formed in and/or coupled to the third frame area 130c of the frame 130. A first width W1 of the horizontal coupling unit HH may be greater than a width of the horizontal protrusion 130H. The first width W1 of the horizontal coupling unit HH may be greater than a second width W2 of the vertical coupling unit VH. Namely, the first width W1 of the reflecting sheet 126 may be greater than the width of the horizontal protrusion 130H in consideration of the modification of the reflecting sheet 126 in the horizontal direction.

The vertical coupling unit VH may be inserted into a vertical protrusion 130V formed in and/or coupled to the third frame area 130c of the frame 130. A second height H2 of the vertical coupling unit VH may be greater than a first height H1 of the horizontal protrusion 130H. Namely, the second height H2 of the vertical coupling unit VH may be relatively large in consideration of the modification of the reflecting sheet 126 in the horizontal direction.

The vertical coupling unit VH may not include a detachment prevention unit HHU positioned on the horizontal coupling unit HH. This may be because the modification of the reflecting sheet 126 in the horizontal direction is greater than the modification of the reflecting sheet 126 in the vertical direction. Namely, if the vertical coupling unit VH includes the detachment prevention unit HHU, the detachment prevention unit HHU may contact the vertical protrusion 130V in the modification of the horizontal direction (i.e., the X-axis direction). Hence, a wrinkle may be generated in the reflecting sheet 126.

Anon-dot area NDA may exist between horizontal and vertical dot areas HDA and VDA and horizontal and vertical margin areas HM and VM. Namely, the non-dot area NDA not including the dot may be formed in a strap shape along the horizontal and vertical directions. If the dots are formed in the non-dot area NDA, a corresponding area may be observed from the outside of the display device 100. Hence, the dots may not be formed in the non-dot area NDA. Further, the non-dot area NDA may serve as a buffer when the reflecting sheet 126 contracts or expands.

Figure 46:
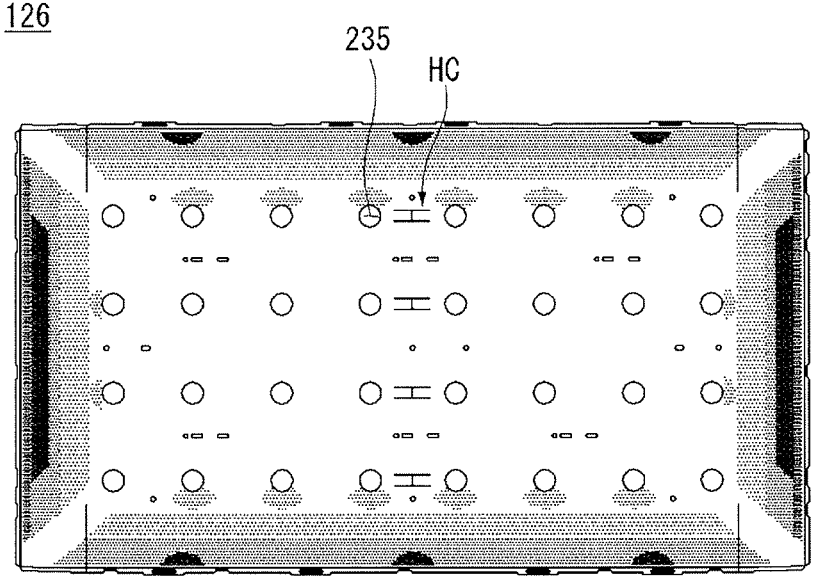
FIGS. 46 to 48B illustrate configuration related to a cutting portion of a reflecting sheet according to an example embodiment of the invention.
Figure 46:
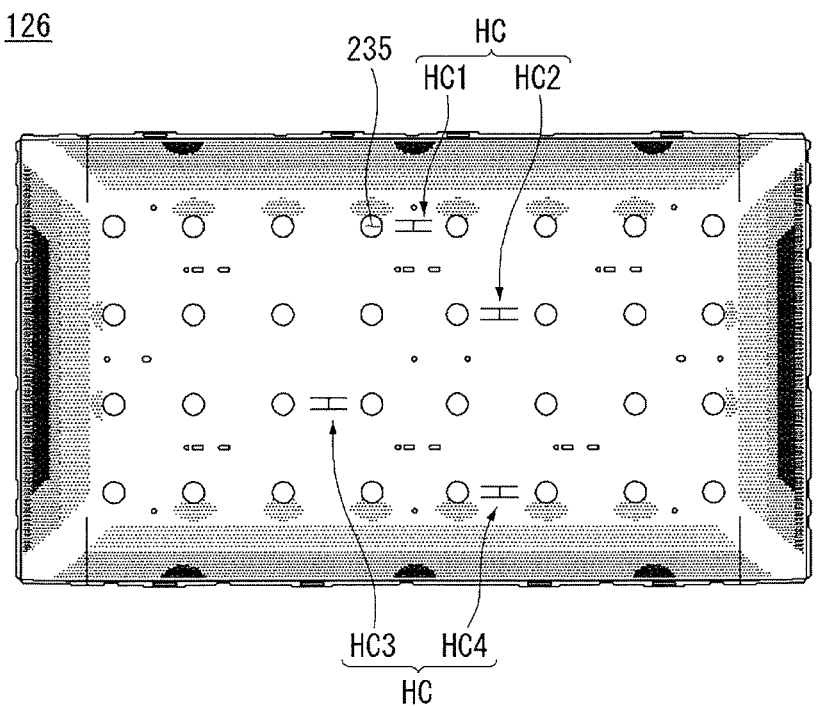
Figure 47:
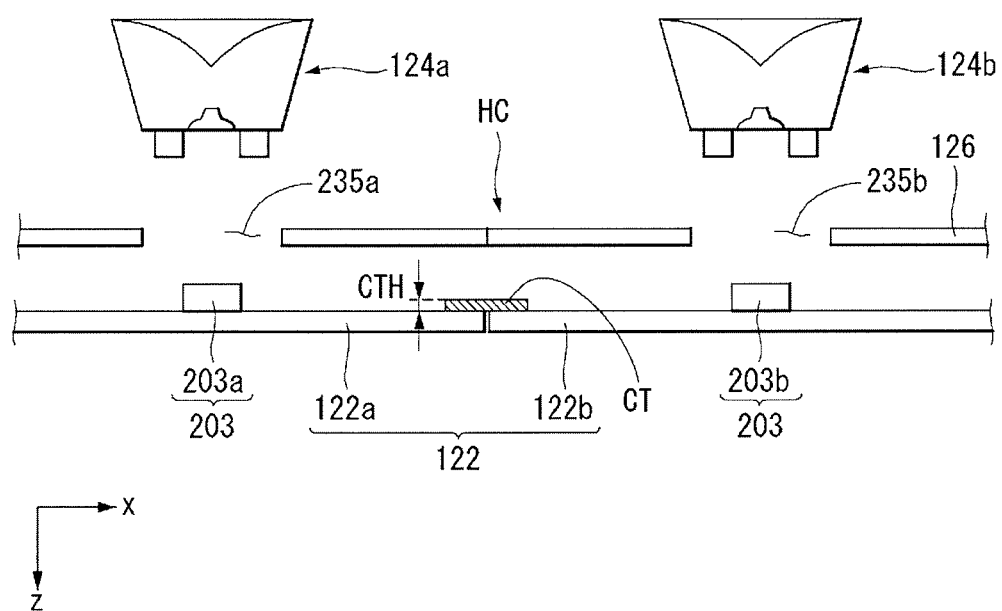

FIGS. 46 to 48 illustrate configuration related to a cutting portion of the reflecting sheet according to the embodiment of the invention.

As shown in FIGS. 46 to 48, the reflecting sheet 126 of the display device 100 according to the embodiment of the invention may include a cutting portion HC uniformly reflecting light.

As shown in FIG. 46, a lens hole 235 may include a first lens hole 235a and a second lens hole 235b.

As shown in (a) of FIG. 46, the first lens hole 235a may be a lens hole 235 including ring-shaped dots DT. A location of the first lens hole 235a including the dots DT may be different from a location of the second lens hole 235b not including the dot DT. For example, the first lens hole 235a may be positioned in the inner area of the reflecting sheet 126, and the second lens hole 235b may be positioned in the outer area of the reflecting sheet 126. The locations of the first and second lens holes 235a and 235b may be changed.

Because the first lens hole 235a is positioned in the inner area of the reflecting sheet 126, an effect capable of more uniformly controlling a luminance of the first sheet area 126a (refer to FIG. 11) of the reflecting sheet 126 may be expected. This can be clearly understood considering that light emitted from the lens hole 235 is relatively bright around the lens hole 235 and becomes darker as it is far away from the lens hole 235. The first lens hole 235a, in which the dots DT are formed, may control a brightness and/or a reflectance around the lens hole 235 and may homogenizes an entire luminance.

As shown in (b) of FIG. 46, the first lens holes 235a may be disposed in accordance with a predetermined rule. For example, the lens hole positioned in one of the left and right directions or one of the plurality of lens holes 235 may be the first lens hole 235a. The first lens holes 235a may be disposed in the zigzag pattern in the vertical direction. Namely, the first lens holes 235a may not be in parallel with one another in the vertical direction. Such a disposition may minimize a reduction in the entire brightness by the first lens hole 235a and may homogenizes the luminance.

As shown in FIG. 47, the substrate 122 may have a shape, in which a first substrate 122a and a second substrate 122b are connected. Namely, the substrate 122, on which the light source 203 is mounted in the rear of the reflecting sheet 126, may be divided into a plurality of substrates. A first light source 203a may be positioned at the first substrate 122a, and a second light source 203b may be positioned at the second substrate 122b. The first and second substrates 122a and 122b may be connected through a connector CT.

The connector CT may be positioned between the first and second substrates 122a and 122b. The connector CT may be a structure electrically and/or physically connected to the first and second substrates 122a and 122b. For example, the connector CT may be a soldering area.

The connector CT may protrude in the direction of the reflecting sheet 126 by a distance CTH further than the substrate 122.

The cutting portion HC may correspond to the connector CT. For example, the cutting portion HC may be positioned on the connector CT.

Figure 48A:
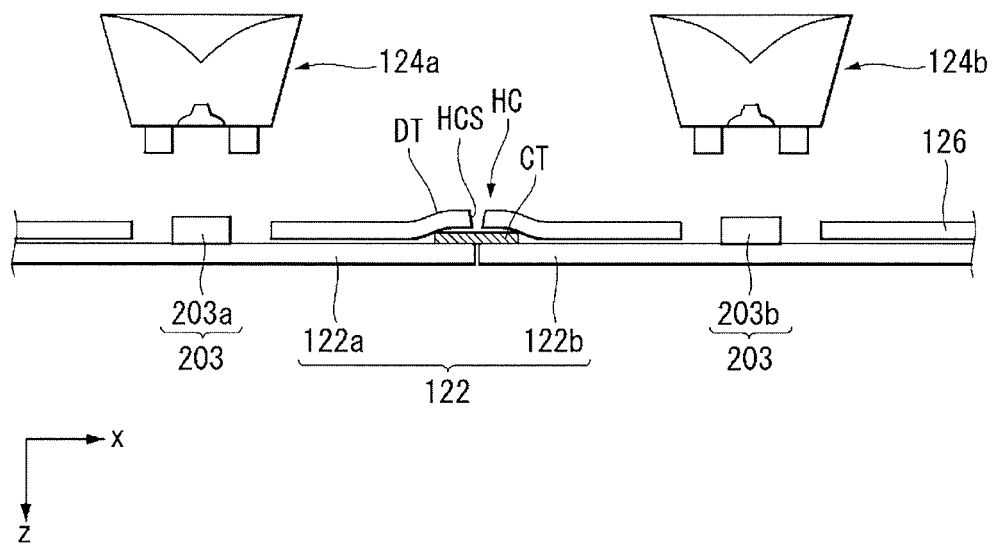

As shown in FIG. 48A, when the reflecting sheet 126 is coupled to the substrate 122, cutting surfaces HCS of the cutting portion HC may be separated from each other. Namely, a gap may be naturally generated between the cutting surfaces HCS by the connector CT, which upwardly protrudes. When the cutting surfaces HCS are coupled to the connector CT, a wrinkle of the reflecting sheet 126 resulting from the connector CT may be prevented. Thus, the non-uniformity of light resulting from the wrinkle of the reflecting sheet 126 may be prevented.

The dots DT may be formed in the cutting surface HCS. Namely, the dots DT may be formed in a corresponding area, so as to control an amount of light reflected from the cutting surface HCS, which relatively upwardly protrudes.

Figure 48B:
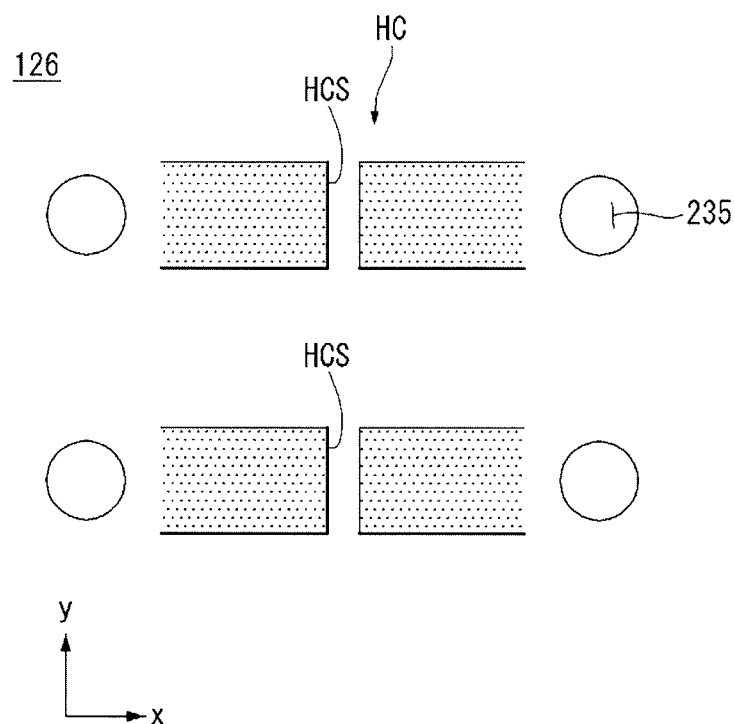

As shown in FIG. 48B, the dots DT may be formed in the cutting portion HC. The dots DT may be positioned about the cutting surface HCS of the cutting portion HC. For example, the dots DT may be positioned in the left and right cutting of the cutting portion HC. Thus, the non-uniformity of the luminance resulting from the cutting may be minimized.

Figure 49:
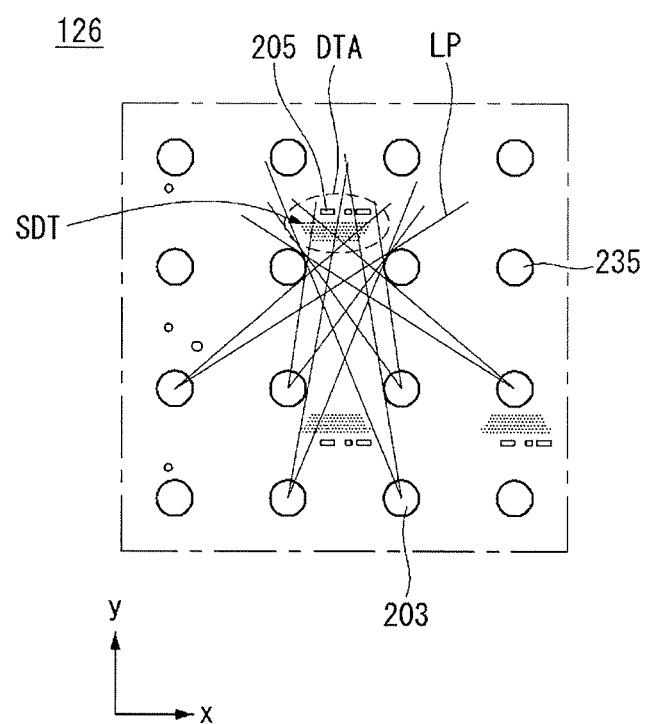
FIGS. 49 and 50 illustrate configuration related to a supporter hole of a reflecting sheet according to an example embodiment of the invention.
Figure 50:
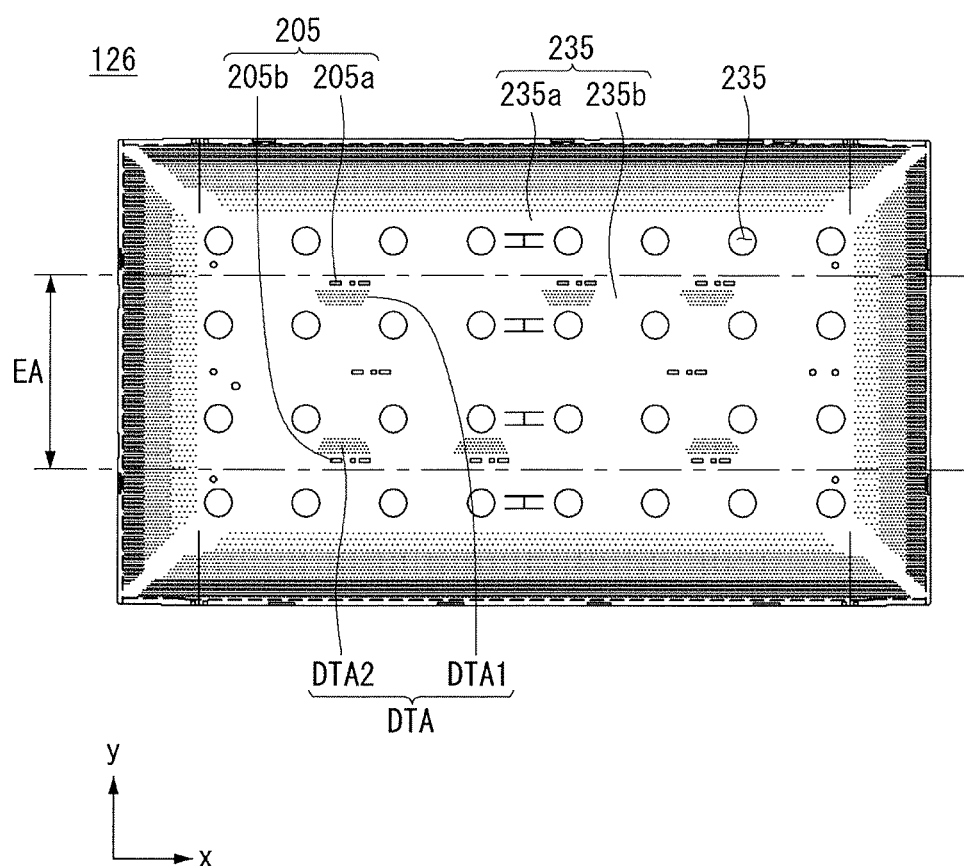

FIGS. 49 and 50 illustrate configuration related to a supporter hole of the reflecting sheet according to the embodiment of the invention.

As shown in FIGS. 49 and 50, the reflecting sheet 126 of the display device 100 according to the embodiment of the invention may uniformly reflect light through a dot area DTA formed around a supporter hole 205.

As shown in FIG. 49, a plurality of lens holes 235 may be formed on the reflecting sheet 126. Each of the light sources 203 coupled to the plurality of lens holes 235 may emit light.

The supporter hole 205 may be formed on the reflecting sheet 126. As described above, the supporter hole 205 may have a configuration for the coupling of the supporter 200 (refer to FIG. 10).

The supporter hole 205 may be positioned further inside than the lens hole 235, which is positioned on the outermost side. For example, the supporter hole 205 may be positioned between the lens holes 235.

The supporter hole 205 may be affected by the plurality of light sources 203 coupled to the plurality of lens holes 235. For example, light emitted from the plurality of light sources 203 may affect the specific supporter hole 205 considering a light path LP with respect to the specific supporter hole 205.

As described above, the supporter hole 205 may be coupled to the supporter 200 (refer to FIG. 10). The supporter 200 may be formed of plastic and/or rubber material. The supporter 200 may reflect at least a portion of light. The reflecting sheet 126 according to the embodiment of the invention may have a dot area DTA in consideration of the reflection of the supporter 200, on which light can be overlappingly concentrated. Namely, the dot area DTA may be formed around the supporter hole 205, so as to reduce an influence of the supporter 200 on the reflection of the reflecting sheet 126.

As shown in FIG. 50, the dot area DTA around the supporter hole 205 may be formed toward an inner area EA of the reflecting sheet 126. Namely, the dot area DTA may be positioned further inside than the supporter hole 205.

The plurality of dot areas DTA around the supporter holes 205 may be positioned opposite each other. For example, when first and second supporter holes 205a and 205b exist, first and second dot areas DTA1 and DTA2 may be positioned adjacent to the first and second supporter holes 205a and 205b further inside than the first and second supporter holes 205a and 205b.

The dot area DTA around the supporter hole 205 may have a semicircular shape centering around the supporter hole 205. Namely, a center area of the dot area DTA, which is relatively greatly affected by the supporter 200 (refer to FIG. 10), may be protrudingly configured.

Figure 51:
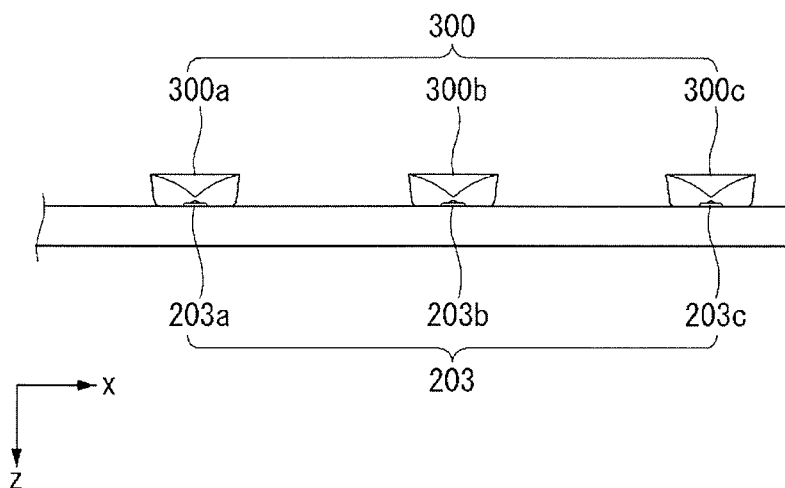
FIG. 51 shows a light assembly including a light source shown in FIG. 19.

FIG. 51 shows a light assembly including the light source shown in FIG. 19.

As shown in FIG. 51, a plurality of light assemblies 124 according to the embodiment of the invention may be disposed along the substrate 122 and separated from one another. The light assembly 124 may include a light source 203 and a lens 300 positioned on one side of the light source 203.

The light source 203 may be various sources emitting light. For example, the light source 203 may be a COB type LED as described above.

The lens 300 may be positioned on the light source 203. At least a partial area of the light source 203 may overlap the lens 300. For example, the light source 203 may be inserted into a groove inside the lens 300. Alternatively, an area of the light source 203, from which light is substantially emitted, may be inserted into the lower side of the lens 300. For example, when the lens 300 has a leg structure, a portion of the upper side of the light source 203 may be inserted into the lower side of the lens 300.

The lens 300 may reflect a portion of light emitted from the light source 203 and may refract a portion of the light. For example, the lens 300 may be a refractive lens or a reflective lens. The light emitted from the light source 203 may be uniformly and entirely spread through the reflection in a portion of the lens 300 and/or the refraction in a portion of the lens 300.

The light source 203 inserted into the lens 300 may be adhered to the lens 300. For example, the lens 300 and the light source 203 may be attached to each other using an adhesive.

The lens 300 may correspond to each light source 203. For example, first to third lenses 300a to 300c may be respectively positioned on first to third light sources 203a to 203c.

The lens 300 may control a path of light emitted from the light source 203. Namely, the lens 300 may control the light source 203 so that the light of the light source 203 is not concentrated on a specific location. In other words, the lens 300 may cause the light of the light source 203 to be uniformly diffused. The lens 300 according to the embodiment of the invention may efficiently control the path of the light of the light source 203. The lens 300 according to the embodiment of the invention may efficiently control light emitted from the side of the light source 203.

Figure 52:
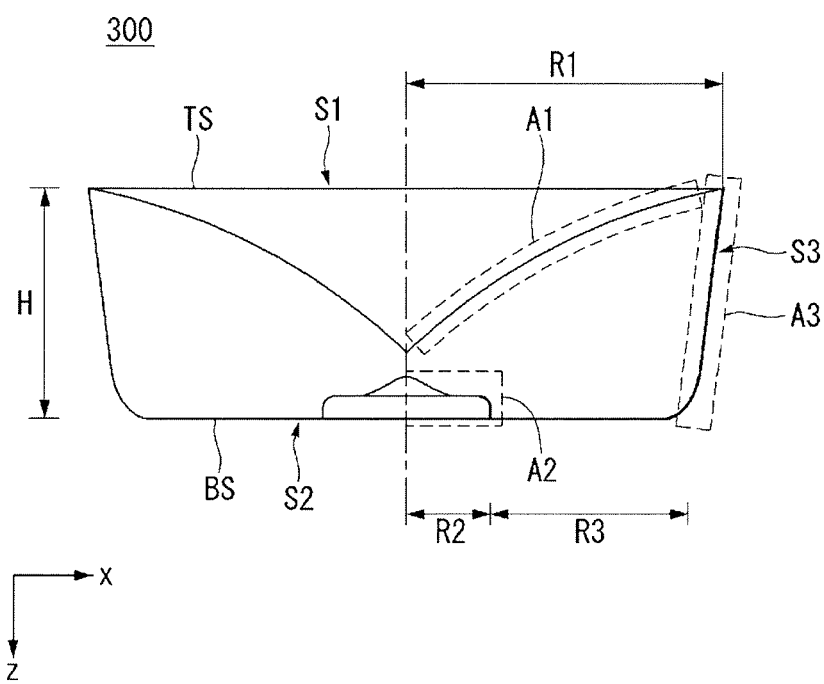
FIGS. 52 and 53 show a lens according to an example embodiment of the invention.
Figure 53:
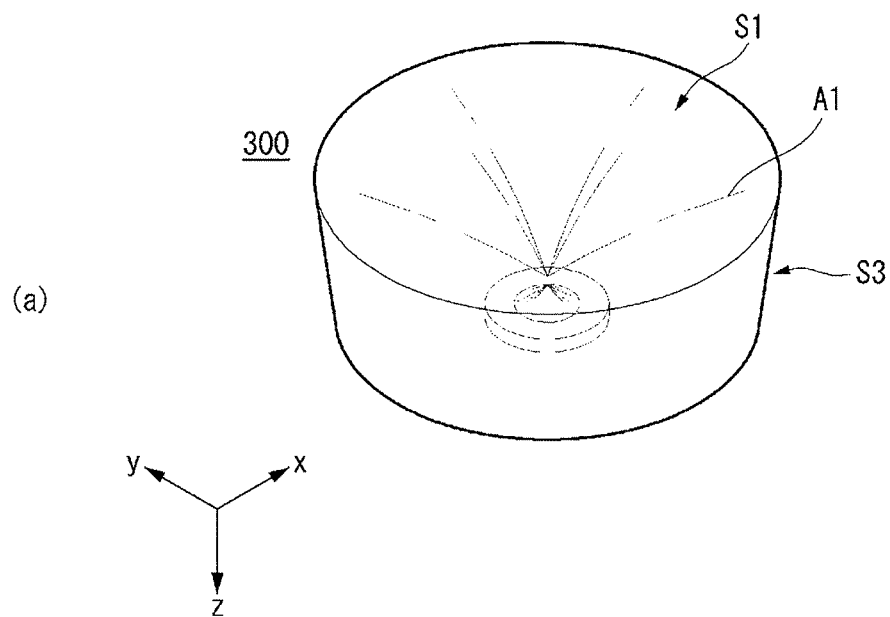
Figure 53:
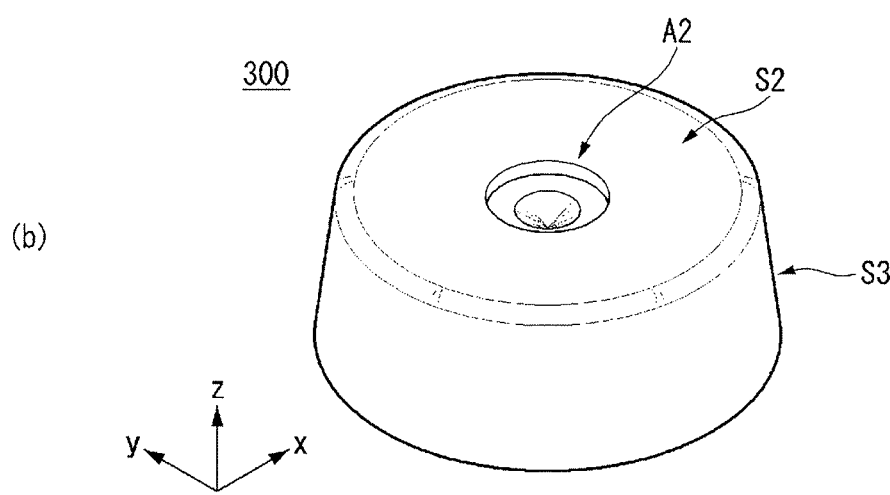

FIGS. 52 and 53 show a lens according to the embodiment of the invention.

As shown in FIGS. 52 and 53, a lens 300 according to the embodiment of the invention may have a specific shape.

The lens 300 may include a first surface S1, a second surface S2 opposite the first surface S1, and a third surface S3 connecting the first surface S1 and the second surface S2.

The first surface S1 may be an upper surface of the lens 300. At least a portion of the first surface S1 of the lens 300 according to the embodiment of the invention may be depressed. A depressed portion of the first surface S1 may have a shape curved from the center of the lens 300 to the outside of the lens 300. For example, a first concave portion A1 may be formed on the first surface S1.

An uppermost area of the first surface S1 may be a top surface TS. The first surface S1 may have a circular cross-section. Light emitted from the upper side of the light source 203 may be upwardly emitted through the first surface S1 of the lens 300.

The second surface S2 may be a lower surface of the lens 300. Namely, the second surface S2 may be a surface opposite the first surface S1 corresponding to the upper surface of the lens 300. At least a portion of the second surface S2 of the lens 300 according to the embodiment of the invention may be depressed. For example, a second concave portion A2 may be formed on the second surface S2.

A radius of the second concave portion A2 on the second surface S2 may be denoted as R2. The radius R2 of the second concave portion A2 may be 1.5 to 4 times a radius of the light source 203 coupled to the lens 300.

A lowermost area of the second surface S2 may be a bottom surface BS. The second surface S2 may have a circular cross-section. The light source 203 may be coupled to the second surface S2. As described above, a portion of the light source 203 may be inserted into the second surface S2.

A radius of the second surface S2 may be "R2+R3". A radius R1 of the first surface S1 may be 1 to 3 times the radius (R2+R3) of the second surface S2. Namely, a width of the top surface TS may be greater than a width of the bottom surface BS.

The radius (R2+R3) of the second surface S2 may be 2 to 4 times a radius R2 of the second concave portion A2.

The third surface S3 may be a surface connecting the first surface S1 and the second surface S2. Namely, the third surface S3 may be a side surface connecting the upper surface and the lower surface of the lens 300. The first surface S1 and the second surface S2 each have the circular cross section, and the third surface S3 forms an outer surface connecting the first surface S1 and the second surface S2. Therefore, the lens 300 may have an outline of a cylindrical shape having a height H. In the cylindrical shape of the lens 300, at least a portion of the first to third surfaces S1 to S3 may be changed.

Figure 54:
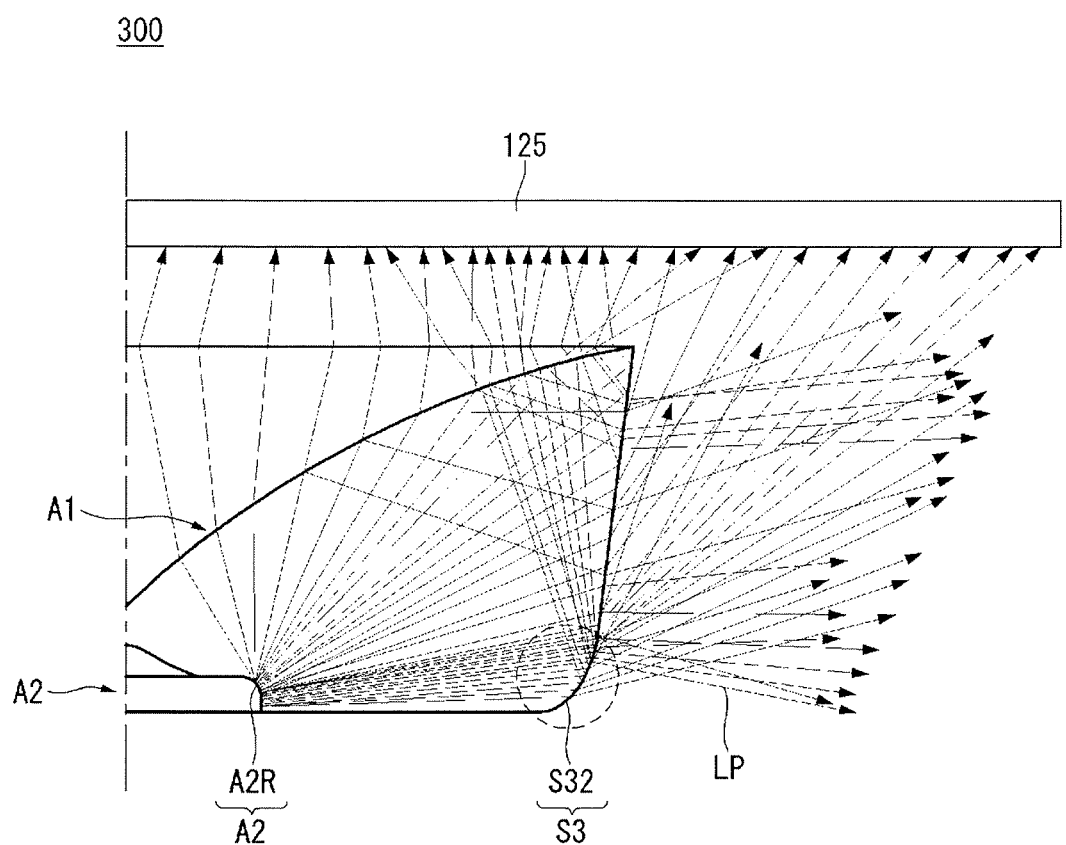
FIG. 54 shows an example of a light path of a lens shown in FIG. 52.

FIG. 54 shows an example of a light path of a lens shown in FIG. 52.

As shown in FIG. 54, the lens 300 according to the embodiment of the invention may control a path LP of light and may cause the light to be uniformly transferred to the optical sheet 125. In particular, the lens 300 according to the embodiment of the invention may change the path LP of light emitted from the side of the light source 203.

The light emitted from the side of the light source 203 may be firstly diffused from the second concave portion A2. Namely, as described above, the light path LP may be radiated due to a shape of a third area A2R of the second concave portion A2.

The light path LP distributed from the side of the second concave portion A2 may be again radiated via a curved surface S32 of the third surface S3.

At least a portion of the light path LP passing through the second concave portion A2, etc., may be refracted and/or reflected from the first concave portion A1. Thus, the light path LP may be prevented from being concentrated on a specific location. As a result, light may be uniformly distributed on the optical sheet 125.

FIGS. 55 to 60 show a lens according to another example embodiment of the invention.

As shown in FIGS. 55 to 60, the lens 300 according to the embodiment of the invention may be variously configured.

Figure 55:
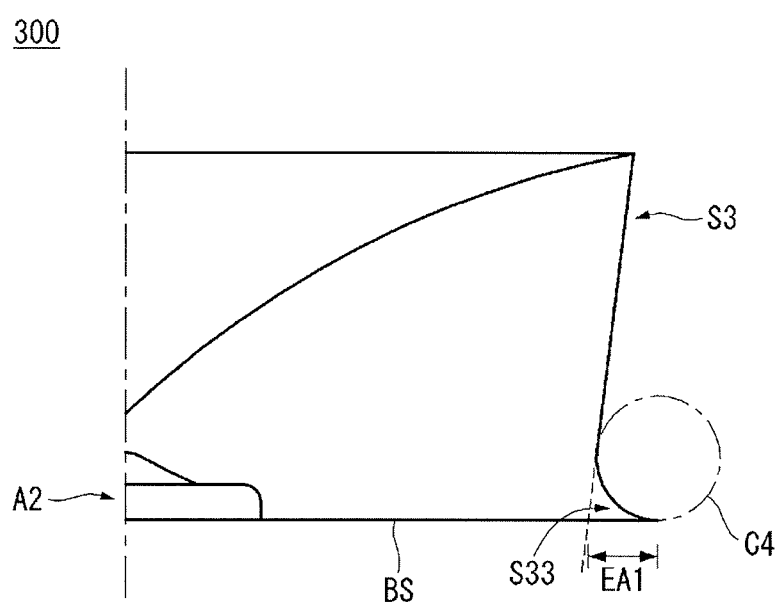
FIGS. 55 to 60 show a lens according to another example embodiment of the invention.

As shown in FIG. 55, a curved surface S33 of the third surface S3 may have a shape protruding to the outside of the lens 300. For example, the curved surface S33 may form a curved surface S32 corresponding to an imaginary fourth circle C4 adjoining an external surface of the third surface S3. The curved surface S33 may have the shape extending from the second surface S2 by a distance EA1.

Figure 56:
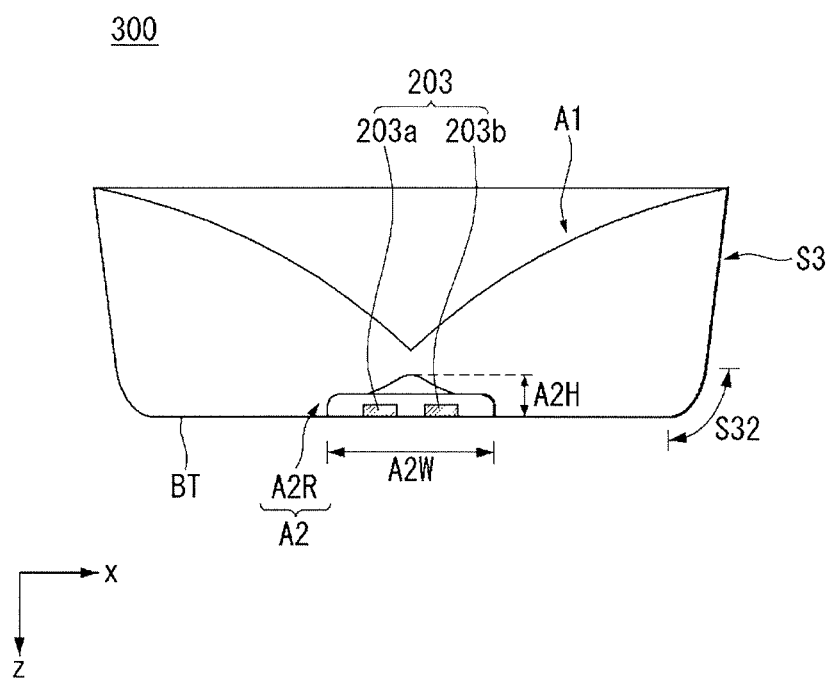

As shown in FIG. 56, the plurality of light sources 203 may correspond to one lens 300. For example, first and second light sources 203a and 203b may be positioned inside the second concave portion A2.

The light source 203 may have the relatively small size. The light source 203 may have a performance of high power. Thus, the first and second light sources 203a and 203b may correspond to one lens 300.

The second concave portion A2 may have an oval shape. For example, the second concave portion A2 may have the shape, in which a width A2W of the second concave portion A2 is greater than a height A2H of the second concave portion A2. The plurality of light sources 203a and 203b may be positioned in a space obtained by configuring the second concave portion A2 in the oval shape.

When the plurality of light sources 203 are positioned inside the second concave portion A2, the shape of the second concave portion A2 and/or the curved surface S32 of the third surface S3 may importantly operate in the embodiment of the invention. Namely, because a large amount of light may be generated from the sides of the first and second light sources 203a and 203b, it is necessary to more efficiently control the light emitted from the sides of the first and second light sources 203a and 203b. The embodiment of the invention may efficiently distribute the light emitted from the sides of the light sources through the curved third area A2R on the side of the second concave portion A2 and/or the curved surface S32 on the lower side of the third surface S3.

Figure 57:
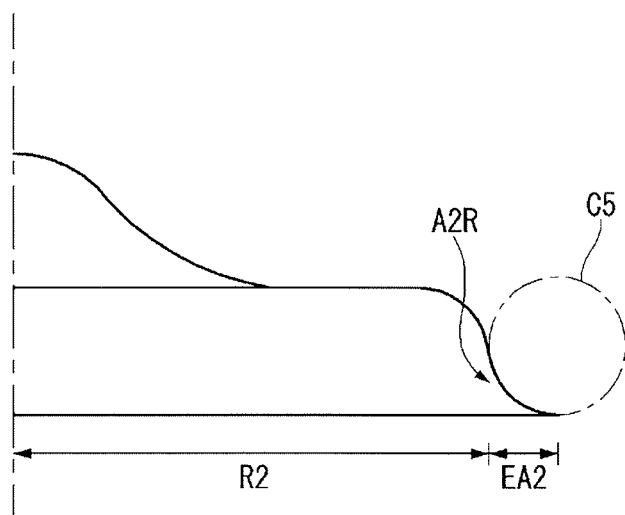

As shown in FIG. 57, the third area A2R of the second concave portion A2 may have the shape of a curved surface protruding to the outside of the lens 300. For example, the third area A2R may have the shape of the curved surface corresponding to an imaginary fifth circle C5 adjoining the third area A2R of the second concave portion A2 outside the second concave portion A2. In this instance, a length of the second concave portion A2 may extend by a distance EA2.

As shown in FIGS. 34 to 58, the embodiment of the invention may be applied to the lens 300, which may be configured in the various shapes.

Figure 58:
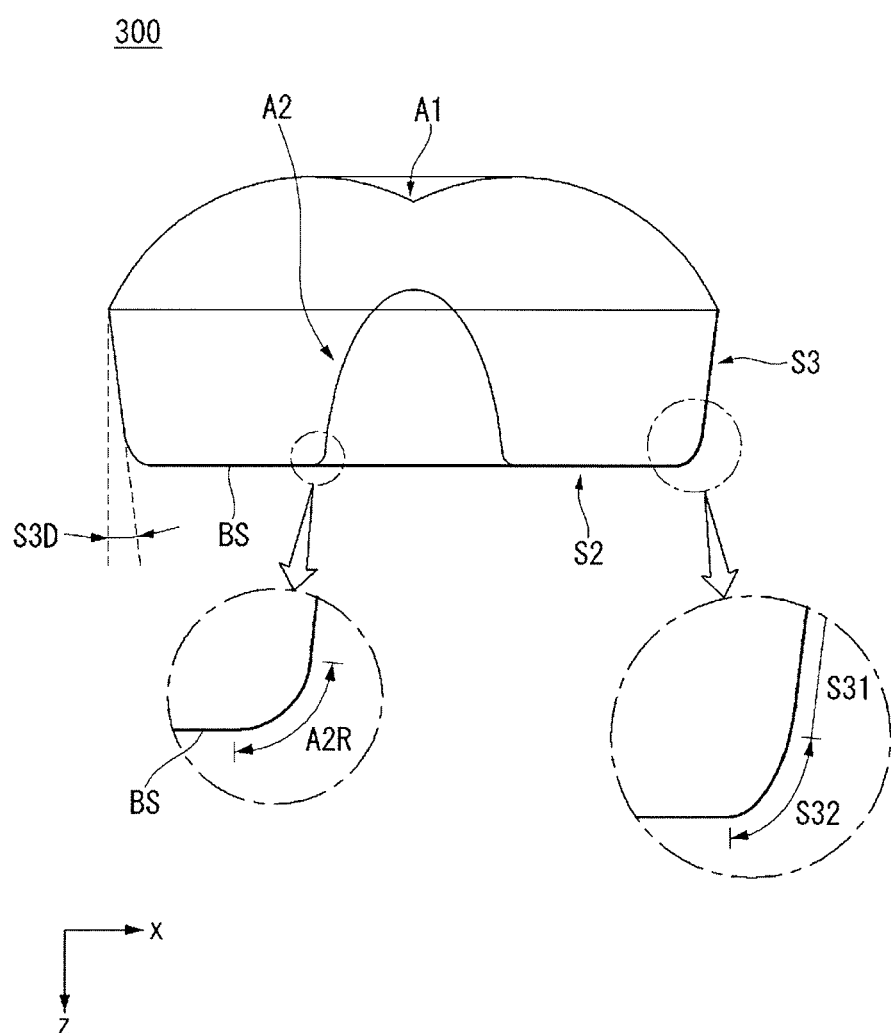

As shown in FIG. 58, the third surface S3 may have a shape inclined at a predetermined angle. For example, the third surface S3 may have the shape inclined to the inside by an angle S3D based on the vertical line.

The third surface S3 may include a straight surface S31 and a curved surface S32. The curved surface S32 may be connected to the second surface S2.

The third area A2R may be formed on the second concave portion A2. Namely, a curved surface may be formed in an area extending from the lower side of the second concave portion A2 to the bottom surface BS. The light emitted from the light source may be distributed due to the third area A2R. In particular, the third area A2R may improve the uniformity of the light emitted from the side of the light source.

Figure 59:
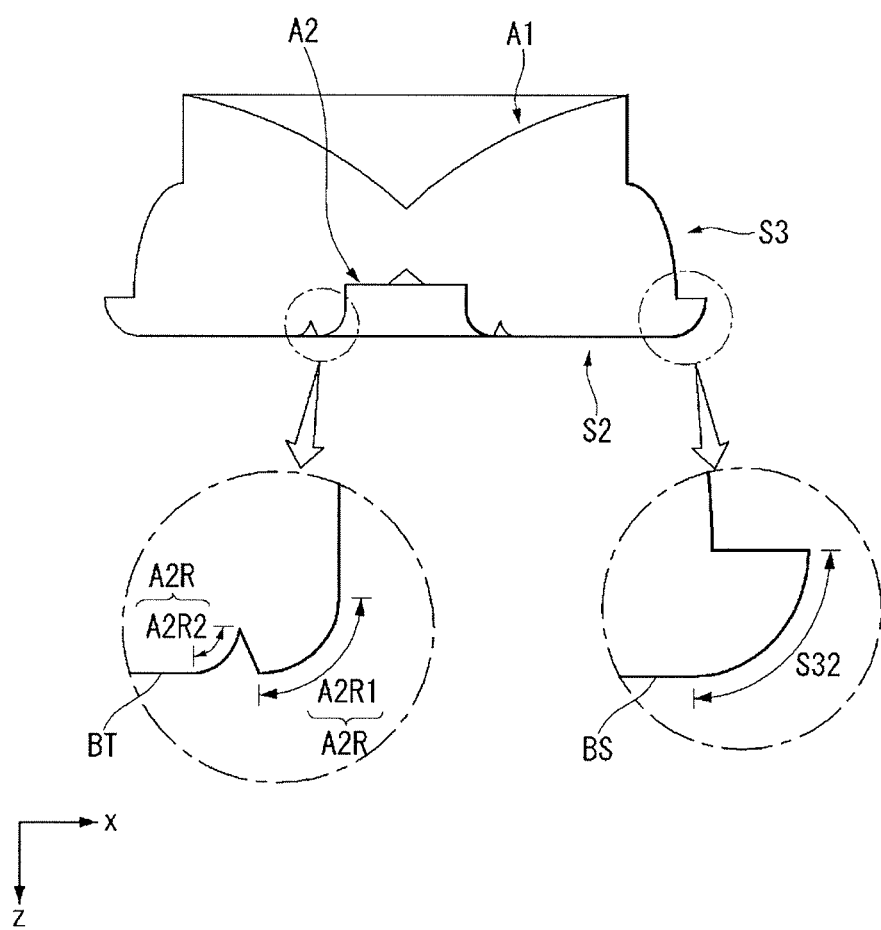

As shown in FIG. 59, a predetermined curved surface S32 may be formed in an area where the third surface S3 of the lens 300 and the bottom surface BS meet.

Third areas A2R1 and A2R2 may be formed on the second concave portion A2. Namely, a curved surface may be formed in a portion of an area where the second concave portion A2 and the bottom surface BS meet. The third areas A2R1 and A2R2 may include a 3a area A2R1 and a 3b area A2R2. Namely, a plurality of curved surfaces may be formed in a plurality of areas where the second concave portion A2 and the bottom surface BS meet.

Figure 60:
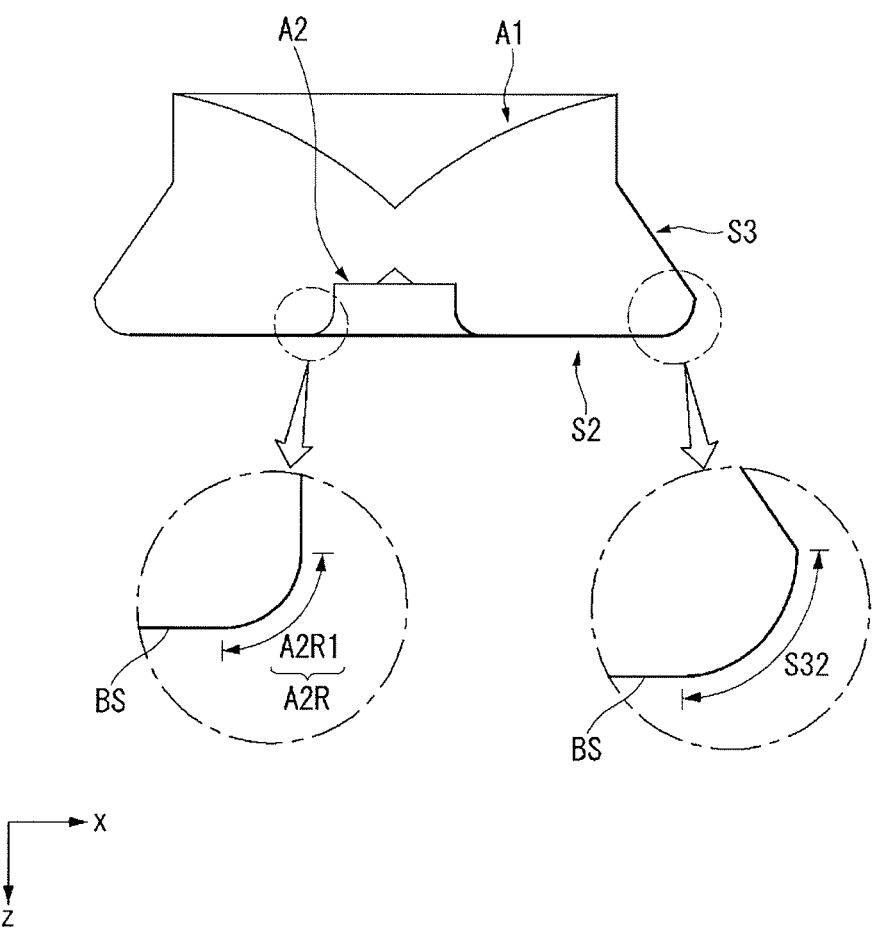

As shown in FIG. 60, a curved surface S32 may be formed in an area where the third surface S3 of the lens 300 and the bottom surface BS meet. The third area A2R of the curved surface may be formed on the second concave portion A2.

Figure 61:
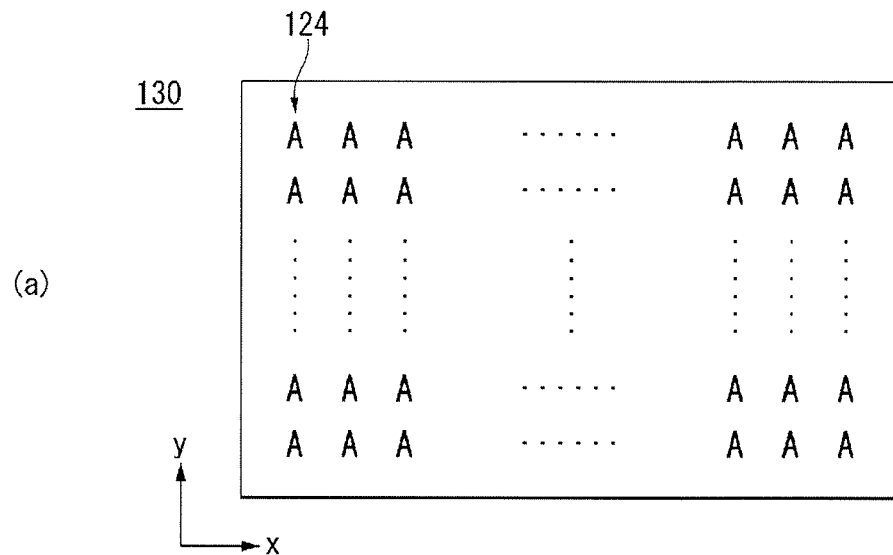
FIGS. 61 and 62 show a disposition of a light assembly according to another example embodiment of the invention.
Figure 61:
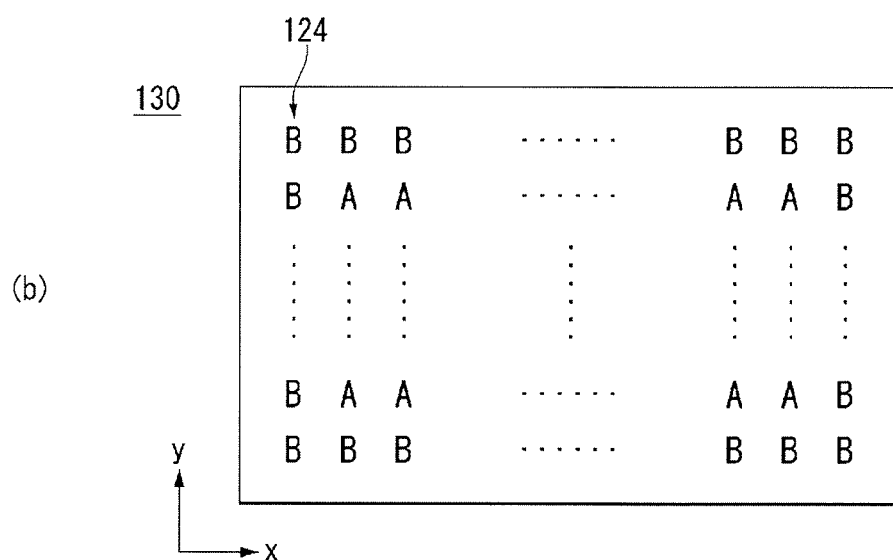
Figure 62:
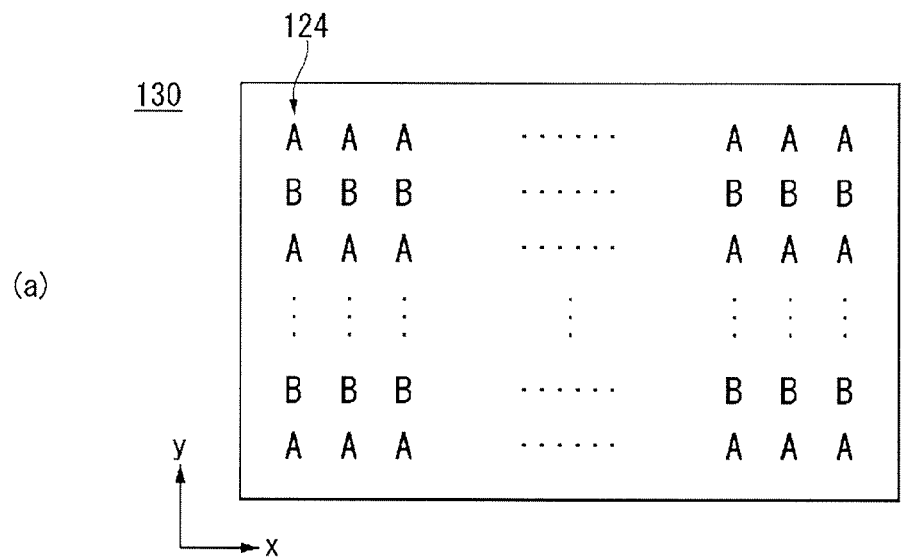
Figure 62:
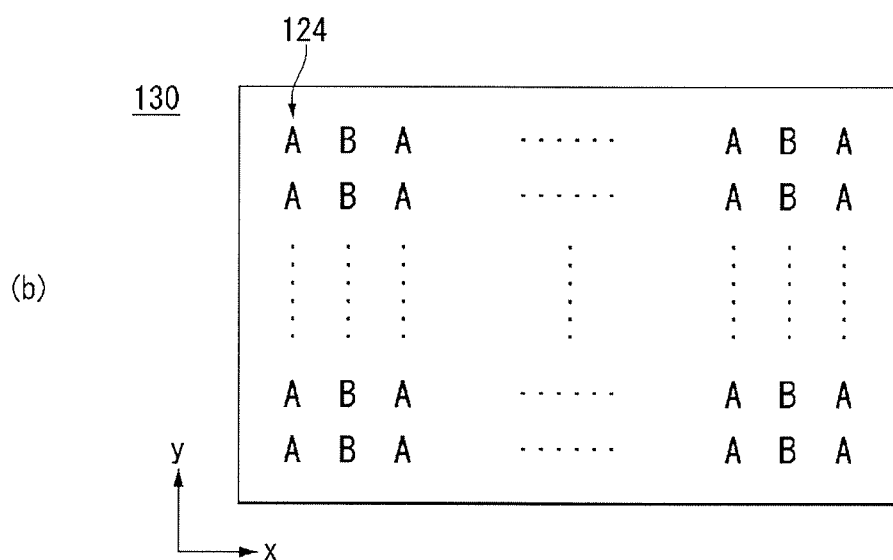

FIGS. 61 and 62 show a disposition of a light assembly according to another example embodiment of the invention.

As shown in FIGS. 61 and 62, the light assembly 124 may be positioned on the frame 130. The light assembly 124 may be configured in various shapes depending on a location. The light assembly 124 may include at least one of the lenses 300 having the above-described shapes. Thus, a contrast or a hot spot resulting from the lens 300 may be prevented from being generated.

As shown in (a) of FIG. 61, the light assembly 124 may be positioned on the frame 130. In FIGS. 61 and 62, alphabets "A" and "B" indicate the light assembly 124. Namely, the light assemblies 124 may be arranged in the horizontal and vertical directions.

The light assemblies 124 shown in (a) of FIG. 61 may the "A" type light assemblies 124. For example, the light assembly 124 including the lens 300 of the specific shape may be positioned.

As shown in (b) of FIG. 61, the "A "type light assemblies 124 and the "B" type light assemblies 124 may be arranged. For example, the light assemblies 124 including the lenses 300 of two types may be arranged. In this instance, the "B" type light assemblies 124 may be arranged on the outermost side of an array of the light assemblies 124, and the "A "type light assemblies 124 may be arranged in an inner area of the array.

The light assemblies 124 different from the light assemblies 124 arranged in the inner area of the array may be arranged on the outermost side of the array. Thus, the light assembly 124 positioned on the outermost side of the array may include the lens 300 different from the light assembly 124 positioned in the inner area of the array, so as to uniformly distribute light.

As shown in (a) and (b) of FIG. 62, the light assemblies 124 of at least two types may be alternately arranged. For example, the light assemblies 124 each including the "A "type lens 300 and the light assemblies 124 each including the "B" type lens 300 may be alternately arranged in the horizontal direction or the vertical direction.

The embodiments and/or the configurations of the invention may be combined with each other. For example, a configuration "A" described in one embodiment of the invention and the drawings and a configuration "B" described in another embodiment of the invention and the drawings may be combined with each other. Namely, although the combination between the configurations is not directly described, the combination is possible except in the instance where it is described that the combination is impossible. This is certain considering that the embodiment of the invention relates to the display device.

Any reference in this specification to "one embodiment," "an embodiment," "exemplary embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed:

1. A display device comprising:
    a display panel;
    a frame at a rear of the display panel;
    a light source on a substrate between the display panel and the frame, the light source providing light for the display panel; and
    a reflecting sheet between the display panel and the frame, the reflecting sheet having a rectangular shape with a first long side, a second long side opposite the first long side, a first short side adjacent to the first long side and the second long side, and a second short side opposite the first short side,
    wherein the reflecting sheet includes:
    a first sheet part forming a central area of the reflecting sheet;
    a second sheet part forming a side area of the reflecting sheet around the first sheet part, the second sheet part including dot areas; and
    a hole next to a border line between the first sheet part and the second sheet part,
    wherein at least one of the dot areas in the second sheet part is formed along the first short side or the second short side,
    wherein the at least one of the dot areas including a first dot area next to the hole in a parallel direction of the first long side or the second long side and a second dot area next to the first dot area in a parallel direction of the first short side or the second short side, and
    wherein a density of dots in the first dot area is different from a density of dots in the second dot area.

2. The display device of claim 1, wherein the density of the dots in the first dot area is smaller than the density of the dots in the second dot area.

3. The display device of claim 1, wherein a size of the dots in the first dot area is smaller than a size of the dots in the second dot area, and
    wherein each of the dot areas is defined by all of the same size dots next to each other.

4. The display device of claim 1, wherein the first dot area includes a plurality of first dot areas, and
    wherein a density of the plurality of first dot areas gradually changes in the parallel direction of the first long side or the second long side.

5. The display device of claim 4, wherein the density of the plurality of first dot areas gradually increases in the parallel direction of the first long side or the second long side.

6. The display device of claim 5, wherein the plurality of first dot areas includes an inner first dot area and an outer first dot area,
    wherein the inner first dot area is closer to the border line than the outer first dot area, and
    wherein a density of dots in the outer first dot area is greater than a density of dots in the inner first dot area.

7. The display device of claim 5, wherein the plurality of first dot areas includes an inner first dot area and an outer first dot area,
    wherein the inner first dot area is closer to the border line than the outer first dot area,
    wherein a size of dots in the outer first dot area is greater than a size of dots in the inner first dot area, and wherein each of the dot areas is defined by all of the same size dots next to each other.

8. The display device of claim 6, wherein the plurality of first dot areas further includes a middle first dot area between the inner first dot area and the outer first dot area, and wherein a density of dots in the middle first dot area is greater than the density of dots in the inner first dot area and the density of dots in the middle first dot area is smaller than the density of dots in the outer first dot area.

9. The display device of claim 8, wherein a size of dots in the middle first dot area is greater than a size of dots in the inner first dot area and the size of dots in the middle first dot area is smaller than a size of dots in the outer first dot area, and wherein each of the dot areas is defined by all of the same size dots next to each other.

10. The display device of claim 1, wherein the second dot area includes a plurality of second dot areas, and wherein a density of the plurality of second dot areas gradually changes in the parallel direction of the first long side or the second long side.

11. The display device of claim 10, wherein the density of the plurality of second dot areas gradually increases in the parallel direction of the first long side or the second long side.

12. The display device of claim 10, wherein the plurality of second dot areas includes an inner second dot area and an outer second dot area, wherein the inner second dot area is closer to the border line than the outer second dot area, and wherein a density of dots in the outer second dot area is greater than a density of dots in the inner second dot area.

13. The display device of claim 12, wherein the plurality of second dot areas further includes a middle second dot area between the inner second dot area and the outer second dot area, and wherein a density of dots in the middle second dot area is greater than the density of dots in the inner second dot area and the density of dots in the middle second dot area is smaller than the density of dots in the outer second dot area.

14. The display device of claim 13, wherein a size of dots in the middle second dot area is greater than a size of dots in the inner second dot area and the size of dots in the middle second dot area is smaller than the size of dots in the outer second dot area, and wherein each of the dot areas is defined by all of the same size dots next to each other.

15. The display device of claim 1, wherein the substrate is aligned with the hole of the reflecting sheet.

16. The display device of claim 1, further comprising a fixing pin coupled to the frame, wherein the fixing pin fixes the reflecting sheet to the frame.

17. The display device of claim 1, wherein the reflecting sheet further comprises a plurality of circled dot areas in the first sheet part, wherein each of the plurality of circled dot areas includes a plurality of rows with circled dots.

18. The display device of claim 17, wherein a color of the plurality of circled dot areas is darker than a color of the reflecting sheet.

19. The display device of claim 1, wherein the reflecting sheet further comprises a plurality of fan shaped dot areas in the first sheet part, wherein each of the plurality of fan shaped dot areas faces the first long side or the second long side of the reflecting sheet part.

20. The display device of claim 19, wherein the plurality of fan shaped dot areas is disposed between the substrate and the first long side or the substrate and the second long side of the reflecting sheet.

* * * * *